US011372744B1

(12) United States Patent
Colwell et al.

(10) Patent No.: US 11,372,744 B1
(45) Date of Patent: Jun. 28, 2022

(54) SYSTEM FOR IDENTIFYING ISSUES DURING TESTING OF APPLICATIONS

(71) Applicant: HEADSPIN, INC., Palo Alto, CA (US)

(72) Inventors: Brien Colwell, Redwood City, CA (US); Manish Lachwani, Los Altos, CA (US); Marius Nita, San Mateo, CA (US)

(73) Assignee: HEADSPIN, INC., Palo Alto, CA (US)

( * ) Notice: Subject to any disclaimer, the term of this patent is extended or adjusted under 35 U.S.C. 154(b) by 0 days.

(21) Appl. No.: 16/694,886

(22) Filed: Nov. 25, 2019

Related U.S. Application Data

(63) Continuation-in-part of application No. 15/941,674, filed on Mar. 30, 2018, now abandoned.

(60) Provisional application No. 62/480,246, filed on Mar. 31, 2017.

(51) Int. Cl.
*G06F 11/36* (2006.01)

(52) U.S. Cl.
CPC ........ *G06F 11/366* (2013.01); *G06F 11/3636* (2013.01); *G06F 11/3664* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 8,175,538 B1 | 5/2012 | Chen et al. | |
| 8,621,091 B1 | 12/2013 | Akalin et al. | |
| 9,122,800 B1 * | 9/2015 | Huddar | G06F 11/3037 |
| 9,170,922 B1 * | 10/2015 | Lachwani | G06F 11/3664 |
| 9,356,883 B1 | 5/2016 | Borthakur | |
| 9,516,053 B1 * | 12/2016 | Muddu | H04L 63/1416 |
| 9,660,895 B1 | 5/2017 | Bennett | |
| 9,681,318 B1 * | 6/2017 | Lachwani | H04W 4/24 |
| 9,749,888 B1 | 8/2017 | Colwell et al. | |
| 2001/0049263 A1 | 12/2001 | Zhang | |
| 2003/0126509 A1 * | 7/2003 | Kaler | G06F 11/3072 714/39 |
| 2004/0060056 A1 * | 3/2004 | Wellons | H04L 29/06 719/317 |
| 2005/0114706 A1 | 5/2005 | DeStefano et al. | |
| 2006/0195894 A1 * | 8/2006 | Nita | G06F 11/3664 726/11 |

(Continued)

*Primary Examiner* — Daxin Wu
(74) *Attorney, Agent, or Firm* — Lindauer Law, PLLC

(57) ABSTRACT

Mobile devices worldwide execute applications that utilize data services, with issues involving the transfer of data via networks impacting the operation and user experience of those applications. Data is acquired from a mobile computing device executing an application and processed to determine occurrence of a group of related activities performed when executing the application. Parameters of the activities are analyzed, and those parameters associated with poor performance are presented in a user interface. The interface provides impact information about the effect of the activities on operation of the application and may include recommended actions to mitigate the poor performance. A user may interact with data within the interface to trigger a workflow to analyze indicated portions of the data. Subsequent results of this analysis may be returned to the user via the user interface or may be implemented as analytic rules for subsequent data processing.

20 Claims, 28 Drawing Sheets

(56) References Cited

U.S. PATENT DOCUMENTS

| | | |
|---|---|---|
| 2006/0293777 A1 | 12/2006 | Breitgand et al. |
| 2007/0055476 A1 | 3/2007 | Whisnant et al. |
| 2007/0094356 A1 | 4/2007 | Sethi et al. |
| 2007/0121674 A1* | 5/2007 | Chen ............... G06Q 10/04 370/468 |
| 2010/0094990 A1 | 4/2010 | Ben-Yehuda et al. |
| 2011/0090939 A1 | 4/2011 | Diener et al. |
| 2011/0151864 A1 | 6/2011 | Byun et al. |
| 2011/0296388 A1* | 12/2011 | Rohde ............... G06F 8/433 717/131 |
| 2012/0158908 A1 | 6/2012 | Luna et al. |
| 2013/0074048 A1* | 3/2013 | Osawa ............... G06F 8/30 717/127 |
| 2013/0080135 A1* | 3/2013 | Cooper ............... G06F 30/367 703/14 |
| 2013/0179568 A1* | 7/2013 | Huang ............... H04L 43/04 709/224 |
| 2014/0040628 A1* | 2/2014 | Fort ............... H04L 63/0869 713/182 |
| 2014/0113625 A1 | 4/2014 | Gruber et al. |
| 2014/0298093 A1* | 10/2014 | Cook ............... G06F 11/36 714/27 |
| 2014/0359139 A1 | 12/2014 | Efrati et al. |
| 2015/0208258 A1 | 7/2015 | Brenzel et al. |
| 2015/0312127 A1* | 10/2015 | Leemet ............... H04L 41/5032 709/224 |
| 2015/0312422 A1* | 10/2015 | Leemet ............... G06Q 20/384 455/406 |
| 2015/0319048 A1 | 11/2015 | Griff et al. |
| 2015/0370304 A1 | 12/2015 | Salah et al. |
| 2016/0133231 A1 | 5/2016 | Liu et al. |
| 2016/0205720 A1 | 7/2016 | Mandanapu |
| 2016/0254967 A1 | 9/2016 | Brown et al. |
| 2016/0267930 A1 | 9/2016 | Chu et al. |
| 2016/0342499 A1* | 11/2016 | Cheng ............... G06F 11/3664 |
| 2016/0350211 A1* | 12/2016 | Cecchetti ............... G06F 11/3696 |
| 2017/0063910 A1* | 3/2017 | Muddu ............... G06F 3/04847 |
| 2017/0269681 A1* | 9/2017 | Andersson ............... G06F 3/011 |
| 2018/0121328 A1* | 5/2018 | Tsantilis ............... G06F 11/3668 |

* cited by examiner

SYSTEM FOR IDENTIFYING ISSUES DURING TESTING OF APPLICATIONS

PRIORITY

This application is a continuation-in-part of and claims priority to U.S. patent application Ser. No. 15/941,674 filed on Mar. 30, 2018 and entitled "Interactive Application Testing System Using Remote Resources", which claims priority to U.S. Provisional Patent Application Ser. No. 62/480,246 filed on Mar. 31, 2017, titled "Interactive Application Testing System Using Remote Resources". Application Ser. No. 15/941,674 and application 62/480,246 are both incorporated by reference herein in their entirety.

INCORPORATION BY REFERENCE

U.S. patent application Ser. No. 14/850,798 filed Sep. 10, 2015 and titled "System for Application Test" is incorporated by reference herein in its entirety.

U.S. patent application Ser. No. 14/976,480 filed Dec. 21, 2015 and titled "System for Network Characteristic Assessment" is incorporated by reference herein in its entirety.

U.S. Provisional Patent Application Ser. No. 62/298,820 filed Feb. 23, 2016 and titled "Adaptive Application Behavior Based on Assessed Network Characteristics" is incorporated by reference herein in its entirety.

U.S. Provisional Patent Application Ser. No. 62/357,008 filed Jun. 30, 2016 and titled "System for Assisting in Assessment and Mitigation of Data Network Operations" is incorporated by reference herein in its entirety.

U.S. Provisional Patent Application Ser. No. 62/544,631 filed Aug. 11, 2017 and titled "System For Remote Control of a USB Connected Device" is incorporated by reference herein in its entirety.

U.S. Provisional Patent Application Ser. No. 62/544,644 filed Aug. 11, 2017 and titled "System For Acquiring Image Data from a USB Connected Device" is incorporated by reference herein in its entirety.

U.S. Provisional Patent Application Ser. No. 62/641,920 filed Mar. 12, 2018 and titled "Multiple Device Test Device" is incorporated by reference herein in its entirety.

BACKGROUND

Mobile devices executing applications that utilize networks to transfer data during operation may experience slowdowns, failures, or otherwise produce adverse user experiences as a result of network conditions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
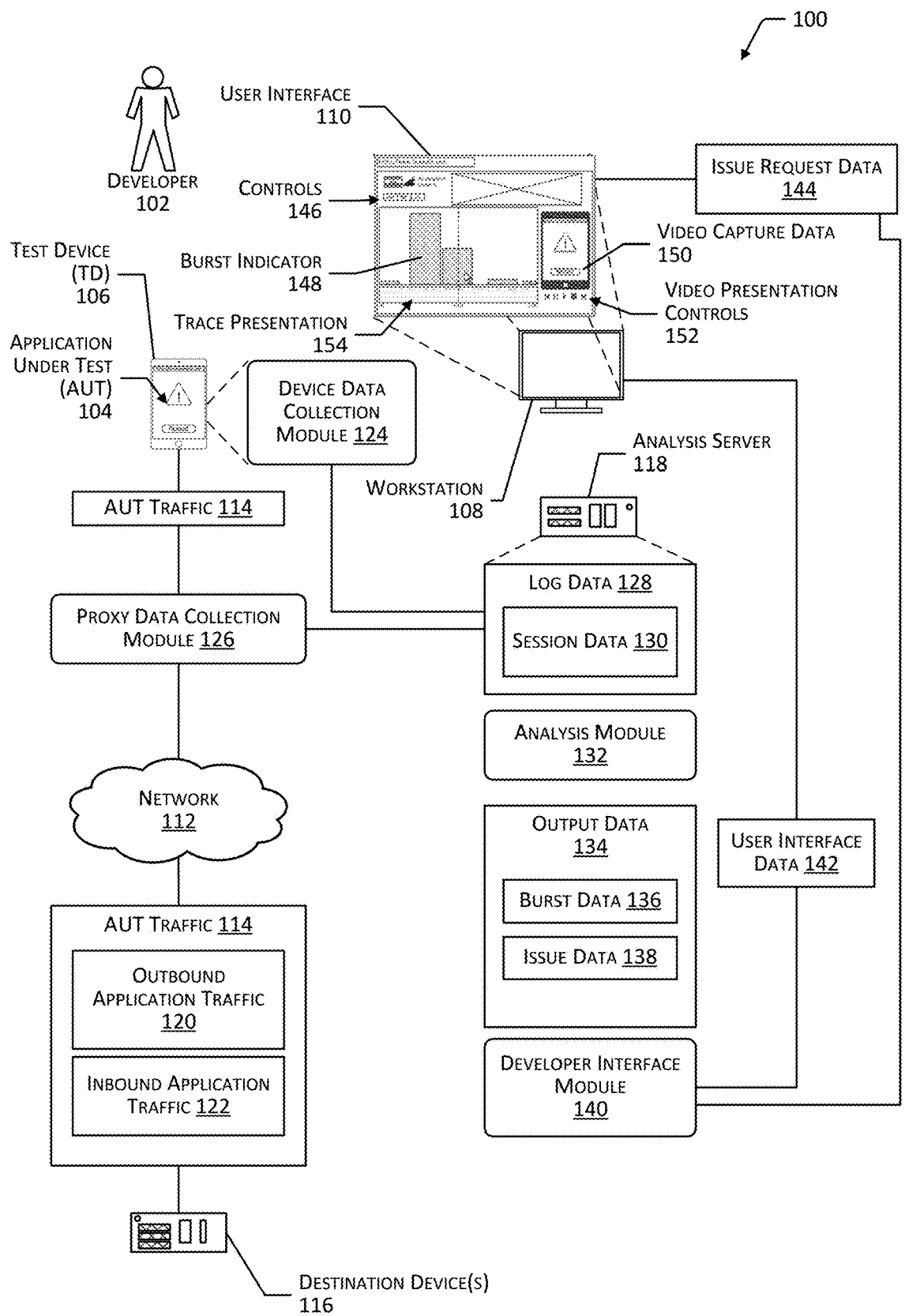
FIG. 1 depicts a system for providing a user interface for determining and presenting information about performance of an application under test, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Computing devices may execute applications to provide various functions, one or more of which may include accessing other devices using various networks. Computing devices may include, but are not limited to, servers, personal computing devices, portable computing devices such as smartphones, laptops, tablet computers, embedded devices, or wearable computing devices, automotive or aircraft-based computing devices, appliances, set-top boxes, other network-enabled devices, and so forth. Functions provided by applications may include retrieval of data, presentation of data to a user, processing of data, and so forth. Networks used by computing devices to access other devices may include, for example, a wireless wide area network (WWAN), such as a wireless cellular data network (WCDN).

Some applications may communicate with one or more external devices, such as a server, using a network. For example, a navigation application may use a network to send location information, indicative of a position of a mobile device, to an application server and receive map data to present on a display of the mobile device. If this communication is affected by errors, latency, or other issues, this may result in the application failing to perform the desired function, error messages, improper or inefficient operation, and so forth. For example, a long latency or delay in receiving the map data may cause the application on the mobile device to pause, present an error to the user, and so forth. These problems may result in an adverse user experience and may cause a user to discontinue use of the application. In other cases, errors or other types of issues associated with an application may not be immediately perceived by the user. For example, an application accessing a network or attempting to access a network may drain a battery of a mobile device by resending data due to communication problems with the network, or due to inefficient operation of the device or application. In many cases, the causes of latency, errors, inefficient operation, and so forth may not be readily apparent.

Performance of the network used by the computing device executing the application may vary due to many factors. For example, such factors may include the geographic location (geolocation) of the computing device, the network access point used to send and receive data, congestion at a network access point, congestion at an interconnect that connects a WCDN to another network, such as the Internet, capabilities of the network access point, and so forth. Continuing the example, during a morning commute or other peak time for use of a network, many users may be streaming video content to mobile devices, resulting in network congestion. In another example, a telecommunication company may have some network access points that support 3G data transmission and are relatively more congested, while other network access points are able to support 4G data transmission and are relatively less congested.

Traditionally, analysis of information regarding communication by an application requires significant intervention by a user, such as a developer of the application. For example, captured traffic between an application and a remote device that communicate using a network, sometimes called a packet capture waterfall, may provide a large amount of raw data that may be cumbersome or incomprehensible for a developer. Continuing the example, using such raw data, it may be difficult to determine if various activities in a stream of communication traffic between an application under test and other servers are related to one another. It may also be difficult to determine which portions of captured traffic are associated with latency, errors, inefficient operation of the application, and so forth. Traditional systems for processing and presenting information about the performance of an application may be complex and difficult to use, and may be insufficient to assist a user in determining methods by which operation of an application could be improved.

Described in this disclosure are techniques for processing and presenting information including, and associated with, the exchange of data ("data traffic" or "traffic") between an application under test ("AUT") and one or more other computing devices ("destination device(s)"). The data may be processed to identify groups of related activities and issues regarding performance of the activities that may affect the time, computational resources, and user experiences associated with the activities. This information may be presented in a comprehensive user interface, in some implementations, alongside video capture data or other types of output from a device executing the AUT, to enable particular times at which the output was affected to be correlated with particular activities that occurred at that time and possible issues regarding performance of those activities.

Log data associated with execution of the application during testing may be obtained and stored. Log data may include information regarding operation of the device or application, information regarding the exchange of data, networks used, characteristics of the network, communication metrics, and so forth. In some implementations, log data may include session data obtained from a proxy device that intercepts the traffic between the AUT and the destination device(s). In other implementations, the log data may include video capture data representative of images that were or would be presented on a display of the computing device executing the AUT. The log data may also include information about the condition of the device, such as memory usage, processor usage, user input events, and so forth.

The log data may be processed to determine output data, which may include burst data and issue data. Burst data may include data regarding a "burst" of activities. Burst data may further be processed to determine issue data, as described below. A burst includes two or more activities represented in the log data that are determined to be causally related. Activities may be causally related when one activity triggers another activity or is otherwise associated with another activity. Activities may be related depending on the temporal relationship between the activities. For example, if multiple activities occur during the same time period or within a threshold length of time from one another. Example activities may include the transfer of data on the network, receipt of user input, output generated by the application, and so forth. Some activities may be determined to be related based on a type or other characteristic associated with the activities. For example, a set of messages may be further arranged into a single message group that includes a connect message, a data request, and a response. During further processing, the single message group that represents multiple activities may be presented as a single burst of activities to facilitate comprehension and coherency of the data. In some implementations, the determination of the causal relationship may include a determination that two or more activities are not regular repeating activities. For example, a regular repeating activity that occurs close in time to another activity that is not a regular repeating activity may not indicate a relationship between the two activities. However, two regular repeating activities or two activities that are not regular repeating activities, that occur close in time, may be more likely to be related.

The log data may be included in a user interface that is presented to a user, such as an application developer ("developer"). The user interface may present information regarding the burst data and regarding issue data determined based on the log data or burst data. For example, a chart may be provided that depicts burst indicators, each burst indicator representative of a particular burst of activities. In one implementation, a burst indicator may be presented as a rectangle having a width along a horizontal axis that is based on a union of times of the activities in the burst and a height along a vertical axis that is a sum of the data transferred by the activities of the burst. In another implementation, each burst indicator may be presented as a rectangle with a width along a horizontal axis that is based on the real time elapsed during performance of the activities and a height along a vertical axis that represents a union of the impact times associated with performance of the activities or issues determined to have affected the activities. Burst indicators may be arranged in time sequence, such that burst indicators representing bursts that occur later in time may appear to the right of burst indicators representing earlier bursts. The information presented in the user interface may be synchronized to a timeline. Other shapes, dimensions, and arrangements for burst indicators may also be used within the present disclosure.

The user interface may also present video capture data. The video capture data may be representative of images that were, or would be, presented on a display of the test device executing the AUT. For example, output for presentation on the screen or display of a test device comprising a smartphone may be captured as a video file. In some cases, the output may be presented on the smartphone, while in other cases, the output may be captured without presenting the output on the smartphone. A time indicator may be presented in the user interface that indicates the portion of the log data that corresponds to the image of the video capture data. For example, during playback of the video capture data, the time indicator may move from left to right, passing through the burst indicators that are presented in the user interface. As such, the user interface may present a particular portion of the video capture data alongside a time indicator that intersects a burst indicator, such that the particular burst of activities that occurred when the video output was generated for presentation may be readily identified. Presentation of this information may enable a user to identify particular activities for which inefficient or improper operation, poor network conditions, or other issues may exist by identifying portions of video output that appear erroneous and determining the burst of activities that occurred during generation of the video output.

The log data and the burst data may be further processed to generate issue data. "Issue data" may be indicative of an aspect of the log data that exhibits one or more metrics that exceed a predetermined threshold. For example, session data obtained from use of a proxy device that intercepts traffic from the AUT may be used to determine issue data. In some implementations, the issue data may be indicative of a data transfer issue that may be surfaced to a developer for review and that may be addressed by revisions to the software code of the AUT. For example, an issue may be determined when the time associated with data transfer of a particular file exceeds a threshold amount of time. Analysis rule data may be stored that includes one or more rules for assessing activities. For example, the analysis rule data may be used to determine issue data from the log data. One or more thresholds for the rules may be indicated in analysis threshold data. For example, an analysis rule may compare the time associated with an activity, such as transferring an image file, to a threshold time value. Continuing the example, session data may be processed to determine that an image transfer was completed in 600 milliseconds, while a threshold time value may be 400 milliseconds. The session data may be processed using the analysis rules and a threshold time value to generate issue data indicative of transfer time for the image activity exceeding the threshold time value.

In some implementations, the system may present a user interface including one or more burst indicators representative of burst data and including one or more controls indicative of an identified issue within the session data. The issue data may be accessed in the user interface by selecting a particular burst indicator or by selecting one of the controls. For example, a user click or touch event associated with a particular burst indicator may result in presentation, in the user interface, of underlying session data associated with that particular burst of activities. In another example, a user click or touch event associated with the particular burst indicator or with one of the controls may result in presentation of issue data corresponding to the particular burst indicator or the control. The issue data may include an issue description indicative of the nature of the issue. For example, an issue description may include an indication of a transfer time exceeding a threshold time, an indication of video quality being below a threshold quality, and so forth. In some implementations, the issue data may also include a suggested action to mitigate the issue. For example, an issue description may include information such as "Issue at 1:13:03 Excessive Image Load Time. Consider downsampling the source image". In another example, the issue data may include time correlations between activities determined to be causally related.

Impact data may also be presented in the user interface. Impact data may indicate the amount of time or other computational resources associated with a particular issue. For example, impact data may be used to determine the amount of time or computational resources that may be saved if an issue is mitigated. In some implementations, the impact data may include a total time for an issue, from initiation of an operation to completion of the operation. In another example, the impact data may include amount of time above a specified threshold value. For example, the impact data may indicate that a total image load time was 2.23 seconds, which is 1.23 seconds longer than a specified 1.00 second threshold time.

In some implementations, explanation data may be included with the issue data. The explanation data may provide additional information about the issue. The explanation data may include one or more of rich text, hyperlinks, and so forth, that provides explanations, code examples, and so forth regarding the determined issue. For example, the explanation data may include text that describes a recommended threshold time for loading an image, text explaining why downsampling is advantageous, and one or more links to examples about downsampling.

In some situations, a developer or other user may identify one or more aspects of operation of the AUT that are not deemed to be acceptable, but for which no issue data has been identified. The user interface may include an issue request control that, when activated, results in further analysis of at least a portion of the log data. For example, in response to user input from a developer, an issue request may be generated that includes log data associated with a burst indicator or other portion of the presented data that was selected at the time of activation of the issue request control. The issue request may be processed by one or more additional systems, such as a machine learning system, one or more human operators, and so forth, to generate new analysis rules or thresholds or to modify existing analysis rules or thresholds. Once the analysis rules or thresholds have been added or modified, the log data may be re-processed to generate issue data. In some cases, the generated analysis rules may be applied to subsequently received session data from a proxy device to generate issue data.

During operation, a user may access the user interface to observe the performance of the application as recorded in the video capture data while also observing the bursts or issues occurring at particular times. In some implementations, the user interface may present at least a portion of the source code associated with a particular issue. For example, an integrated development environment ("IDE") may be used to allow a developer to quickly and effectively address issues in the source code of the AUT, such as by changing the source code in response to an issue using the user interface.

In some implementations, to test an application, an AUT may be selected for testing and installed from a URL. For example, a developer may use the user interface to select or input a URL associated with an installation of an application, such as a URL to the Apple App Store or Google Play Store. The developer may then use the user interface to select one or more of a particular geolocation, particular network, particular type of proxy access device, and so forth. Once selected, the system may utilize the URL to install the application on a particular proxy access device. For example, a developer may wish to test an AUT using a proxy access device located at a remote geolocation to test performance of the AUT using different networks. The developer may select a proxy access device located at the desired geolocation to cause the AUT to be installed on the proxy access device.

Once installed, the user interface may present a start session control. When activated, the user interface may provide remote control functionality of the proxy access device, allowing the developer to see what is presented on the display of the proxy access device, and interact therewith. Upon activating the start session control, capture of the session data and other information associated with the session may begin. The AUT is then launched, with the captured session data including traffic associated with the launch. As such, a developer may use remote control functionality of the user interface to launch and test the AUT. A stop session control may be used to cease data capture. In some implementations the application may be closed prior to or in conjunction with stopping data capture. Once the application is closed and data capture is complete, the application may be uninstalled or otherwise removed from the proxy access device.

In some implementations, during capture of the session data, the system may generate ancillary data. For example, information in the session data such as domain names may be detected, and subsequent ancillary data acquired. Continuing the example, information such as domain name service (DNS) records including CNAME records, AAAA records, Internet Protocol (IP) version data, and so forth may be retrieved for the domain names in the session data. In some implementations the ancillary data may be acquired using equivalent proxy access devices. Equivalent proxy access devices may be at the same network, device, carrier, and so forth as the proxy access device executing the AUT. For example, while testing the application on the first proxy access device, a second proxy access device at the same geolocation may utilize the same carrier and protocol to retrieve DNS records.

By using implementations described in this disclosure, a user may quickly and easily assess the performance of an AUT and improve the performance thereof, especially with respect to activities that involve the transfer of data on a network. Additionally, a user may quickly and easily test a variety of different applications, navigate between different applications, and gather a variety of useful data. The data may be used to assess performance of particular AUTs, determine information about providers such as content delivery networks, and so forth. For example, based on information from a plurality of different tests, information about the relative market share of content delivery networks may be determined. Other information may also be acquired and measured, such as the usage of content types, content metadata (such as image compression), software development kits, ad networks, services, and deployment of technologies such as IPv6. Additionally, the data may be analyzed to determine issue data, which may identify issues that could otherwise have remained unnoticed, include suggestions for improving performance of the AUT, determining the impact of mitigating the issues, and so forth. A user interface that presents related "bursts" of activities in association with one another and enables a user to select individual bursts to navigate to log data and issue data for those activities may be used to organize, present, and address various issues in an efficient and comprehensible manner.

FIG. 1 depicts an implementation of a system 100 for determining information about performance of an application under test (AUT) 104 and providing a user interface for determining and presenting such information, according to one implementation. The system 100 may be used by a user, such as a developer 102, to capture session data corresponding to the operation of the AUT 104.

The developer 102 may include an individual, a group of individuals, or an entity that is tasked with creating a new application, maintaining an existing application, modifying an existing application, and so forth. The AUT 104 may be executed on a computing device such as one or more test devices (TD) 106, workstations 108, and so forth. For example, the TD 106 and workstation(s) 108 may include, without limitation, servers, personal computing devices, portable computing devices such as smartphones, laptops, tablet computers, embedded devices, or wearable computing devices, automotive or aircraft-based computing devices, appliances, set-top boxes, other network-enabled devices, and so forth. The AUT 104 may be an application that is at any stage in a development or maintenance lifecycle. For example, the AUT 104 may include an alpha (or prerelease) version of software or may include a previously-released production version that is undergoing further testing.

The workstation 108 may include an integrated development environment (IDE) to facilitate the creating and editing of program code, debugging, compiling, and so forth. In some implementations, the workstation 108 may include an emulator or simulator that is designed to execute the AUT 104 as though the AUT 104 were executing on other hardware, using a different operating system, and so forth.

Testing of the AUT 104 may be used to determine issues associated with use of the AUT 104. For example, an issue may include an intended functionality of the AUT 104 that is not operating properly, use of resources that exceed a threshold amount, a time to complete an activity that exceeds a threshold length of time, and so forth. Determining an issue may enable subsequent steps to be taken to mitigate the issue. For example, a developer 102 may change the program code of the AUT 104 to mitigate an issue that is identified as a result of testing the AUT 104. One or more of the techniques described below may be used to determine at least a portion of the issues associated with operation of the AUT 104. For example, a user interface 110 may be presented using the workstation 108 or another computing device. The user interface 110 may provide information about the operation of the AUT 104 during testing. Information presented in the user interface 110 may be used to identify issues with operation of the AUT 104 and in some cases mitigate one or more identified issues.

One or more of the TD 106 or the workstation 108 may be connected to a network 112. The network 112 may, in turn, be connected to or be part of a larger network. For example, the network 112 may be a local area network (LAN) that is connected to the Internet. The connection used by the TD 106 or the workstation 108 may include, but is not limited to, a wired Ethernet connection, a wireless local area network (WLAN) connection such as Wi-Fi, and so forth. For example, the TD 106 may connect to a local Wi-Fi access point that is connected via an Ethernet cable to a router. The router, in turn, may be connected to a cable modem that provides connectivity to the Internet.

During operation, the AUT 104 may access to an external resource, such as a destination device 116. For example, the AUT 104 may include a social networking application that sends data generated by a user and retrieves information from a server for presentation. While FIG. 1 depicts a single destination device 116, an AUT 104 may generate and exchange AUT traffic 114 with multiple destination devices 116 during operation.

Traditionally, the AUT traffic 114 transmitted by the TD 106 would be sent to the network 112 and then to the destination device 116. However, in some implementations a proxy device may be used to transfer the AUT traffic 114 to and from a proxy access device that is located at a different geolocation. Use of a proxy access device may allow for testing of the AUT 104 as though the AUT 104 were operating at a different geolocation and using a desired network 112 at the different geolocation. For example, the proxy device may be used to test an AUT 104 that is executing on the TD 106 in San Jose, Calif. as though the TD 106 was located in Bangalore, India.

To provide the functionality described herein, a software development kit (SDK) may be incorporated into the AUT 104. For example, at compile time, the SDK may be included into the compiled AUT 104. In other implementations, techniques other than a SDK may be used to provide the functionality described herein. For example, computer code that provides the functionality of at least a portion of the SDK may be incorporated into the code base of the AUT 104. In other implementations, the SDK may be omitted from the AUT 104.

The AUT 104 may be in communication with an analysis server 118. The analysis server 118 may generate information that is used to present the user interface 110. The analysis server 118 may receive at least a portion of the AUT traffic 114 for analysis. AUT traffic 114 may include outbound application traffic 120 and inbound application traffic 122. The outbound application traffic 120 may include data that is sent from the AUT 104 to the destination device 116 while the inbound application traffic 122 may include data that is sent from the destination device 116 to the AUT 104.

During operation, the AUT 104 may be configured to direct outbound application traffic 120 to a proxy host device that is associated with a selected proxy access device. The proxy host device may in turn transfer the outbound application traffic 120 from the TD 106 to the proxy access device, which may then send the outbound application traffic 120 to a second network 112(2). The second network 112(2) may then send the outbound application traffic 120 to the destination device 116. Inbound application traffic 122 from the destination device 116 may follow the reverse path to arrive at the TD 106. Directing AUT traffic 114 in this manner may enable communication using the second network 112(2) to be tested by using a proxy access device that accesses the second network 112(2). As a result, an AUT 104 that is executing on a TD 106 at a first geolocation may be tested as through it is executing at the geolocation of the proxy access device.

The analysis server 118 may use one or more device data collection modules 124 or proxy data collection modules 126 to acquire log data 128. The AUT 104 may include or may be in communication with the device data collection module 124 which may be executed at least in part on the TD 106. For example, the AUT 104 may include a SDK that includes the device data collection module 124. In other implementations, the AUT 104 may execute device data collection modules 124 as standalone applications, as part of the operating system, and so forth. The proxy data collection module 126 may intercept at least a portion of the AUT traffic 114 and provide information based at least in part on the AUT traffic 114 as log data 128 to the analysis server 118. For example, the proxy data collection module 126 may execute on the TD 106 or may be executing on another device such as a proxy host device, router, and so forth.

The log data 128 may include session data 130. Session data 130 may include "breadcrumb" data, information associated with operation of the AUT 104, operation of any proxy host devices, proxy access devices, packet capture of data transferred to the destination device(s) 116 during operation, and so forth. The session data 130 may include information about one or more activities that occurred during testing of the AUT 104. For example, activities may include data transfers between the TD 106 and a destination device 116. The breadcrumb data may include, for a particular instant or interval of time, one or more of: a current page on a website, a type of network with which the proxy access device communicates, a quantity of data received, a quantity of data transmitted, latency for communication with the destination device 116, data throughput, received signal strength, transmit power, cost associated with data transfer on the second network 112(2), and so forth. For example, the breadcrumb data may indicate that the AUT 104 was connected at timestamp 201606092312030097 to webpage http://www.example.com/main.html using a 3G network connection with a received signal strength of 14 dBm, a transmit power of 7 dBm, data throughput of 400 Kbps, and so forth. The session data 130 may therefore be produced based on operation of the AUT 104 on a network 112 using a communication interface, such as a cellular modem, at a particular geolocation. The resulting session data 130 may therefore represent "real world" communication between devices, including the complexities and nuances associated therewith.

The log data 128 may include other information, such as video capture data representative of images that were, or would be, presented on a display of the test device 106 executing the AUT 104. For example, output for display on the screen of a test device 106, such as a smartphone, may be captured as a video file that represents the content that was, or would be, displayed while the AUT 104 is being tested. In another example, the log data 128 may include information indicative of user input events that occurred during the testing, such as a mouse click, a touch on a touchscreen, a key input, a verbal input, a gesture, and so forth.

The analysis server 118 may obtain the session data 130. In some implementations, the device data collection module 124, the proxy data collection module 126, or other modules or devices may stream the session data 130 to the analysis server 118 during testing of the AUT 104. In other implementations, the analysis server 118 may poll the collection modules to obtain the log data 128.

Instead of or in addition to the session data 130, one or more deployed devices may provide deployed log data to the analysis server 118. The deployed devices may include, but are not limited to, the same types of computing devices described with regard to the TD 106 or workstation 108. A deployed device may execute the AUT 104 that incorporates the device data collection module 124 to provide log data 128 from the deployed device during operation. For example, a user of the deployed device may agree to allow for the collection of the log data 128 on the deployed device. While the user is using the AUT 104, log data 128 may then be collected. As a result, the log data 128 may include information obtained as a result of actual users using the AUT 104. Geolocation data for the AUT 104 may be obtained from a positioning device such as a global position system ("GPS") receiver, from a service such as Wi-Fi hotspot geolocation lookup, from a network provider based on signal strength or time delay at several network access points, and so forth.

The analysis server 118 may include an analysis module 132 that is configured to process at least a portion of the log data 128. The processing of the log data 128 may produce output data 134. The output data 134 may include one or more of burst data 136, issue data 138, or other types of data. The burst data 136 may include information associated with multiple activities that are determined to be causally related to one another. Burst data 136 is described in more detail with regard to FIG. 2. Issue data 138 may include information regarding issues (e.g., suboptimal functioning of the AUT 104), such as one or more particular activities that have been selected or otherwise determined to be of interest to the developer 102. For example, an issue may include a particular activity, such as transfer of data, that is determined to have a metric value that exceeds a threshold, such as the time to transfer a video file exceeding a threshold time. Continuing the example, a threshold value may specify a maximum amount of time for a data transfer activity, and the issue data 138 may indicate a specific data transfer activity that exceeded this maximum time. In some implementations, the issue data 138 may be generated based on the log data 128 associated with a particular grouping of burst data 136. For example, session data 130 relating to a group of related activities, designated by the burst data 136, may be processed to generate issue data 138 for the related activities. Issue data 138 is described in more detail with regard to FIG. 3.

The analysis server 118, or another device in communication with the analysis server 118, may include a developer interface module 140. The developer interface module 140 may provide interface functionality to the developer 102, an application used by the developer 102, or to other users or applications. The developer interface module 140 may generate user interface data 142 that may be used to present the user interface 110 on the workstation 108. The user interface data 142 may comprise one or more of executable code, markup language, scripts, and so forth that are used to generate the user interface 110. For example, the developer interface module 140 may access the output data 134 and generate one or more webpages that may be presented within a web browser executing on the workstation 108 to present the user interface 110 to the developer 102.

The user interface 110 may include one or more controls 146 accessible by the developer 102 to view data and to interact with one or more devices, such as the TD 106. The user interface 110 may further include one or more burst indicators 148. The burst indicator 148 may represent a group of related activities (e.g., a "burst" of activities) and may be presented as a rectangle with a width along a horizontal axis that may be based on a union of times of the activities in the burst while the height along a vertical axis may be a sum of the data transferred by the activities of the burst. In another implementation, the burst indicator 148 may be presented as a rectangle with a width along a horizontal axis that may be based on the real time elapsed when performing the activities while the height along a vertical axis may represent a union of the impact times for the activities or for issues affecting the activities. Burst indicators 148 may be arranged within the interface 110 in time sequence, such that burst indicators 148 that represent later groups of activities appear to the right of burst indicators 148 that represent earlier groups of activities.

The user interface 110 may also present video capture data 150, which may include image data or video data that was presented or was prepared for presentation on the display of the TD 106 that is executing the AUT 104. The user interface 110 may include video presentation controls 152, which may be used to control presentation of the video capture data 150 or otherwise interact with the user interface 110.

The user interface 110 may also include a trace presentation 154, which may include one or more graphs that depict changes in designated characteristics over time. For example, the trace presentation 154 may present information indicative of utilization of the processor of the TD 106, usage of memory of the TD 106, a quantity of outbound application traffic 120, a quantity of inbound application traffic 122, a number of concurrent connections, and so forth. Continuing the example, the trace presentation 154 may include a curve or line graph representing a value for one or more characteristics over time, with the position of the trace presentation 154 for earlier time periods appearing to the left of the position of the trace presentation 154 for later time periods.

In some situations, the analysis module 132 may not detect an issue that is of interest to the developer 102. The user interface 110 may include one or more issue request controls that, when activated, may cause generation of issue request data 144. The issue request data 144 may include information that is indicative of particular burst data 136 or other portions of the log data 128 that may be indicated when activating the issue request controls. For example, the issue request data 144 may include data indicative of a particular set of burst data 136. In other implementations, the issue request data 144 may include information obtained from the developer 102 or other individual, an IDE, and so forth. For example, the issue request data 144 may include data from the developer 102 such as a comment that "the application is bouncing between several different servers for some reason". In another example, the issue request data 144 may include information indicative of the burst data 136 as well as a portion of the source code of the application obtained from an IDE.

The issue request data 144 may be used to generate a request for further processing of the portion of the log data 128 that is indicated by the issue request data 144. The request may trigger the further processing by one or more of an automated system or human support operators. For example, the issue request data 144 may trigger workflow that involves scrutiny by one or more human support operators of at least the particular portion of the log data 128 specified by the issue request data 144. The one or more human support operators may generate new analysis rules or modify existing analysis rules in an attempt to generate issue data 138. In another example, the issue request data 144 may trigger a workflow that involves additional processing by an automated system, such as using one or more machine learning techniques, artificial neural networks, machine classifier algorithms, statistical analysis, and so forth to determine if the log data 128 is indicative of one or more activities affected by issues that may be of interest to the developer 102. In some implementations, output from the human support operators may be used to train or evaluate the automated system.

In some implementations, the user interface 110 may allow the developer 102 to select different proxy access devices to allow testing of the AUT 104 using different networks 112 at different geolocations, and so forth. Selection of different proxy access devices is described with regard to FIG. 10. In other implementations, this functionality may be provided by an application programming interface (API) that the AUT 104 may use.

Figure 2:
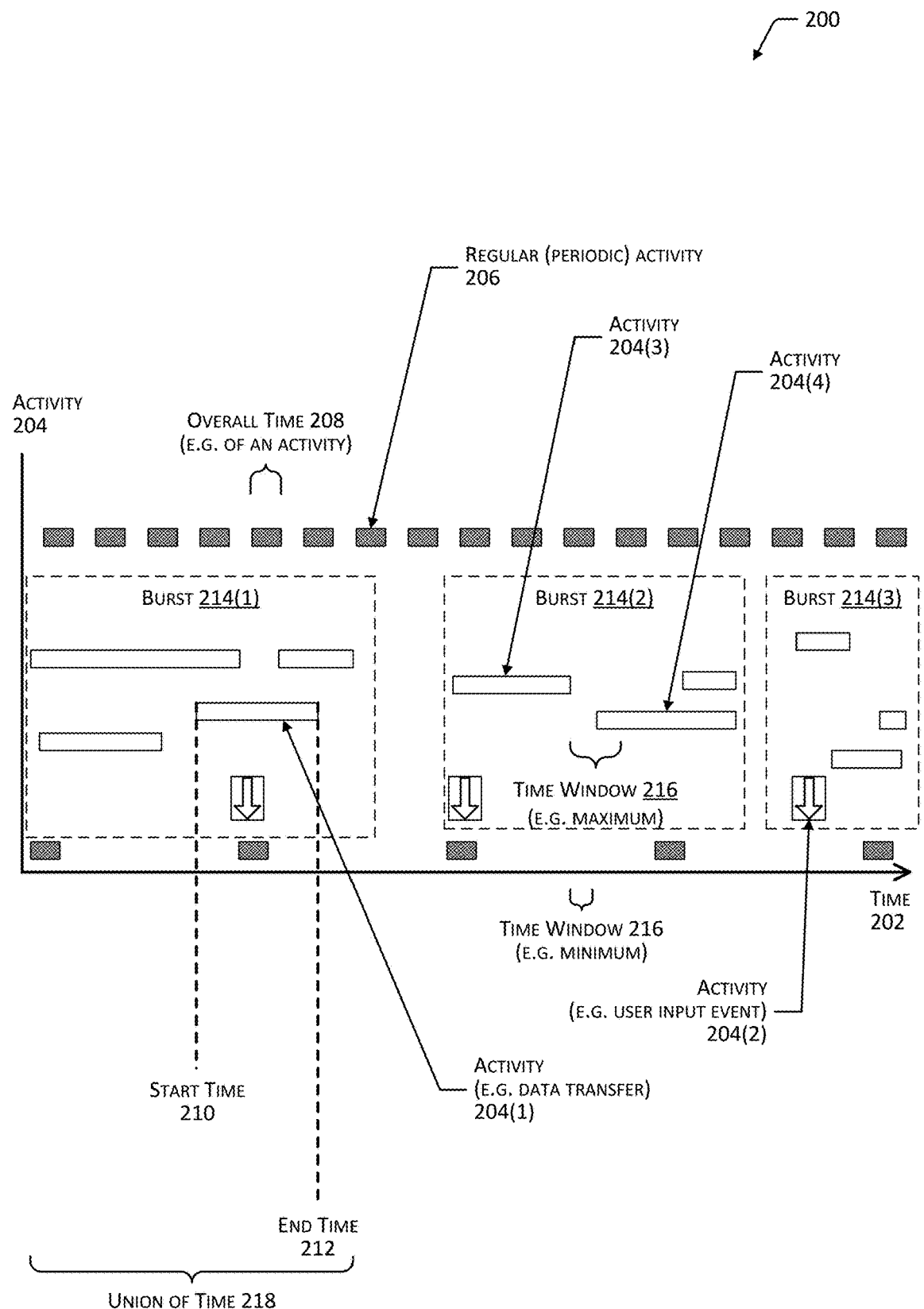
FIG. 2 illustrates the determination of "bursts" that include activities determined to be causally related that are undertaken by the application under test, according to one implementation.

FIG. 2 illustrates multiple examples 200 of the determination of bursts, which include multiple activities undertaken by the AUT 104 that are causally related, according to one implementation. In FIG. 2, time 202 is indicated along the horizontal axis, increasing from left to right. Along a vertical axis, one or more activities 204 are presented. Activities 204 associated with the same executing process, destination device 116, type of activity, and so forth may be presented in a common horizontal arrangement. For example, activities 204 depicted in the same row may involve data transfer associated with a particular uniform resource locator (URL) for a particular destination device 116.

As described previously, activities 204 may include transactions or operations involving the transfer of data on the network 112, interactions with hardware or software associated with data transfer, and so forth. For example, the activities 204 may include the transfer of data across a WCDN, activating a radio used to access the WCDN, consumption of power to transmit and receive data, and so forth. The activities 204 may include operations that are occurring on the TD 106, or on another device such as a proxy device, proxy access device, and so forth.

Some activities 204 may occur on a regular basis. For example, regular activity 206 (e.g., periodic activity) such as heartbeat data, diagnostic data, keepalive packets, and so forth may periodically be transmitted to one or more devices. An activity 204 may be determined to be a regular activity 206 if the frequency of occurrence of the regular activity 206 is greater than a threshold value or if the regular activity 206 is repeated at a continuous time interval, within a threshold deviation of the time interval. As shown in FIG. 2, regular activity 206 is depicted using shaded rectangles. For example, a threshold may specify that the frequency of occurrence for a regular activity 206 must be at least once every 200 milliseconds for the activity 204 to be determined to be a nonrandom regular activity 206. In some implementations, information about the activity 204 may also be processed to determine if the activity 204 is a regular activity 206. For example, if the activity 204 includes a data transfer that is identical, within a threshold amount, to a previous data transfer to the same destination device 116, the activity 204 may be determined to be a regular activity 206. In other implementations, a combination of both the frequency of occurrence, as well as one or more metrics associated with the activity 204, such as quantity of data transferred, may be used to determine if an activity 204 is a regular activity 206. For example, regular exchanges of diagnostic data may have a slight variation in the size of payload being transferred, and may be transferred on a schedule that is regular, but does not exhibit the exact same times between subsequent transfers. This diagnostic data may be detected by determining the similarity of data transfer sizes, common destination device 116, and the timing of the transfers being within a threshold value of a periodic schedule.

Other activities 204 may occur at random or otherwise variable times, exhibiting a frequency of occurrence that is below a threshold value. For example, the activity 204(1) may include a request for data sent from the AUT 104 to the destination device 116. Also depicted is activity 204(2), which may include a user input event. For example, the device data collection module 124 may obtain log data 128 that represents the occurrence of user input events associated with the AUT 104 and timestamp data for these events. This information may be useful in cases where a user input event may trigger data transfer on the network 112 by the AUT 104.

Each activity 204 exhibits an overall time 208 during which the activity is performed. For example, the overall time 208 may comprise a time extending from a start time 210 of the activity 204 to an end time 212 of the activity 204.

The analysis module 132 may generate burst data 136 representative of one or more bursts 214 of activities. A burst 214 may include two or more activities 204 that are determined to be causally associated with one another. In some situations, the analysis module 132 may not have access to the internal workings of the AUT 104. For example, the analysis module 132 may not receive data indicating the particular lines of program code that are executed and how the code relates to particular activities 204. In such cases, the analysis module 132 may generate the burst data 136 by performing one or more of the following analyses on the activities 204 included in the log data 128.

A burst 214 may exclude activities 204 that are deemed to occur in a nonrandom or periodic fashion. For example, the bursts 214 shown in FIG. 2 do not include the regular activity 206. In other implementations, the regular activity 206 may be included in one or more of the bursts 214.

A burst 214 may include one or more activities 204 that exhibit a temporal relationship, such as an overlap in their overall times 208. For example, burst 214(1) includes four activities having overall times 208 that overlap one another at least partially. In some situations, the burst 214 may include a concatenation of overlapping overall times 208.

In other implementations, a burst 214 may include one or more activities 204 having a temporal relationship that does not include an overlap in terms of their overall times 208, but that instead occur within a designated time window 216 of one another. For example, as shown in FIG. 2, activity 204(3) exhibits an end time 212 that is within a time window 216 of the start time 210 of the activity 204(4).

The time window 216 may include a specified or default interval of time. In one implementation, a burst 214 may be designated as including different activities 204 that have a start time 210 or an end time 212 that are within the time window 216 of other activities 204. As a result, the activities 204(3) and 204(4) may be determined to be members of the same burst 214(2). In some implementations, the time window 216 may apply to activities 204 of a single type, such as communication transactions communicating with a particular destination device 116. In other implementations, the time window 216 may span activities 204 of different types, such as a transmission of data to a first destination device 116(1) and receipt of data from a second destination device 116(2). In still other implementations, different time windows 216 may be used to determine relationships between different types of activities 204.

In some implementations, the time window 216 may include minima and maxima. For example, the time window 216 may be determined at least in part based on a round-trip time between the AUT 104 and a proxy device, proxy access device, and so forth. For example, the time window 216 may include a minima of 75 ms that corresponds to a minimum round-trip time and a maxima of 150 ms that corresponds to a maximum round-trip time. By utilizing such minima and maxima, the burst 214 excludes activities 204 that could not be causally related to one another because there is insufficient time for data to have been sent to the destination device 116 and then received. Continuing the example, two activities 204 that occur within 10 ms of one another may not be causally related because that would be insufficient time for a cause such as a request to be sent to the destination device 116 and for a response to be generated and sent to the TD 106.

In some implementations the time window 216 may vary dynamically based on changing conditions. For example, the network 112 between the TD 106 and a proxy access device may be periodically tested to determine minima and maxima round-trip times. These minima and maxima may then be used to generate values for a minimum time window 216 and a maximum time window 216.

In some implementations, a union of time 218 may be determined for one or more of the activities 204 within a burst 214. The union of time 218 may include an interval of time that extends from a first start time 210 of a first activity 204 within a burst 214 until a last end time 212 of a last activity 204 within the burst 214. The union of time 218 may include a function such as that used in mathematical set theory.

Other information may also be used to associate activities 204. For example, in some implementations the packets in AUT traffic 114 may be inspected to determine if two activities 204 are associated with one another, such as being part of a hypertext transfer protocol (HTTP) request and response. In some situations, a plurality of activities such as particular packets transferred may be associated into message groups. For example, a message group may include a connect message, a data request, and a response. The elements of the message group may be included in a single burst 214. In other implementations, different bursts 214 may include different elements of the single message group, but the association provided by the message group may be maintained to facilitate further analysis.

During operation of the system, the analysis module 132 may determine a burst 214 using one or more of the criteria described above. For example, a burst 214 may include activities 204 that have overlapping overall times 208, that are within the time window 216 of one another, share particular characteristics, and so forth.

Figure 3:
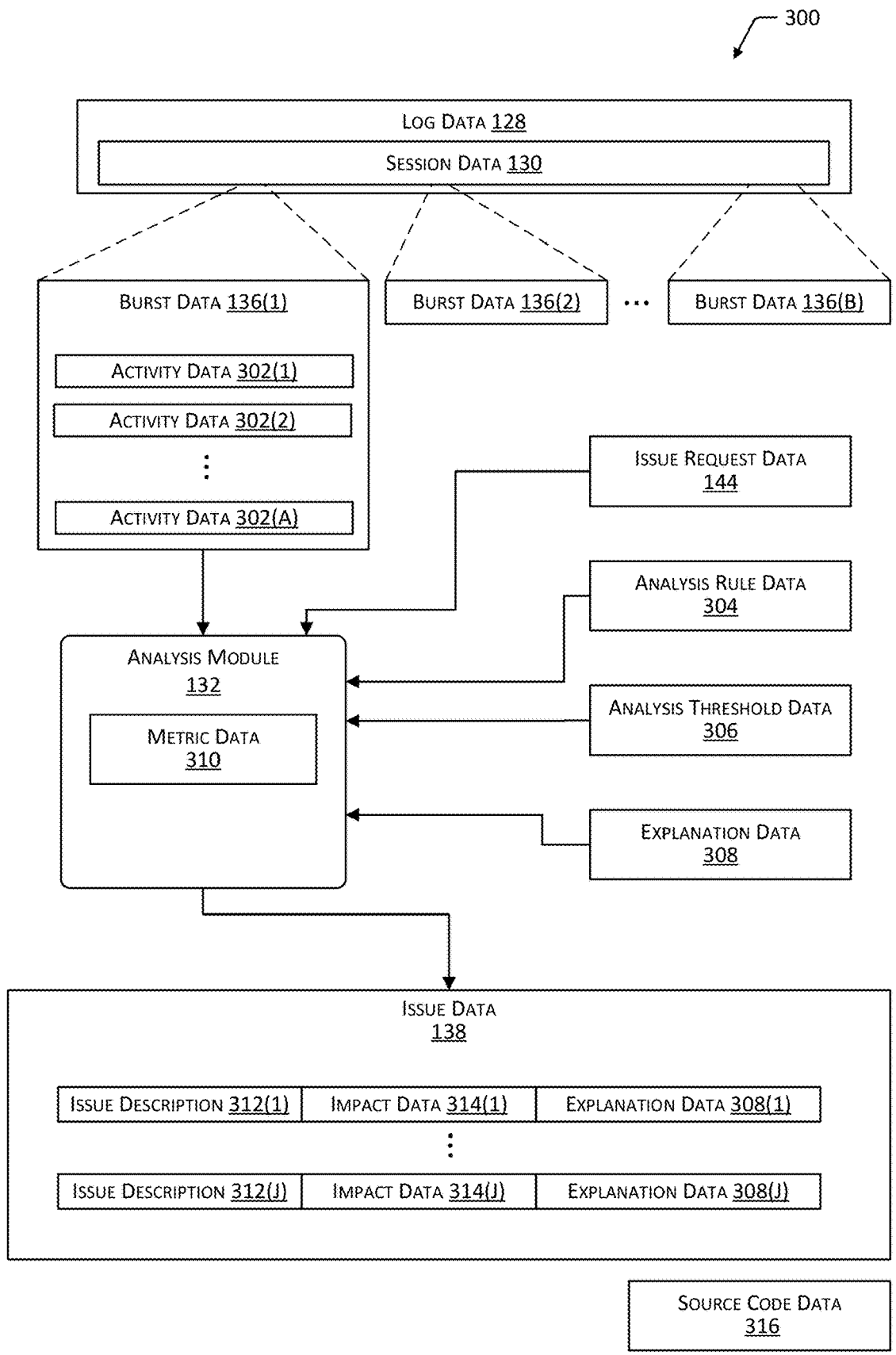
FIG. 3 is a flow diagram illustrating a method for processing of burst data to generate issue data, according to one implementation.

FIG. 3 is a flow diagram 300 that illustrates processing of burst data 136 to generate issue data 138, according to one implementation. As described previously, log data 128 may include session data 130, such as activities 204 involving transfer of data between the AUT 104 and one or more destination devices 116. While the following examples are described with respect to session data 130, it is understood that the following analysis may also be applied to other information contained in the log data 128 instead of or in addition to the session data 130.

As described above with regard to FIG. 2, the burst data 136 includes information about one or more activities 204 that are determined to be causally related. FIG. 3 depicts information about the activities 204 as activity data 302. Burst data 136 may include a set of activity data 302. For example, the activity data 302 may include information such as a start time 210 and end time 212 of an activity 204, a destination device 116 associated with the activity 204, a quantity of data transferred, and so forth. An activity 204 may include a user input, an application task or action (such as a download operation), other actions, or any combination thereof.

The analysis module 132 may utilize, as inputs, the burst data 136 and one or more of the issue request data 144, analysis rule data 304, analysis threshold data 306, or explanation data 308. The analysis module 132 may receive the burst data 136 as an input or may generate the burst data 136 from the activity data 302 or other metric data 310. For example, the metric data 310 may include a measurement of the overall time 208 of an activity 204, union of times 218 of activities 204, quantity of data transferred for an activity 204, and so forth.

The analysis rule data 304 may include one or more rules that are indicative of previously determined situations in which metric data 310 or other information obtained from activity data 302 exceeds one or more threshold values specified by the analysis threshold data 306. For example, an analysis rule may include an expression that compares metric data 310 to a threshold value. In one implementation, analysis rules may be expressed using the Python programming language, or another programming or markup language.

The analysis threshold data 306 may be specified by the developer 102, administrators of the analysis server 118, automated processes, other users or processes, and so forth. For example, an automated process may generate a statistical analysis of previously acquired log data 128 to determine an average time for transfer of image data. This average time value may be used as an initial threshold value and stored as analysis threshold data 306. The average time value may then be used for comparison of activities 204 that involve the transfer of image data, based on one or more analysis rules.

In some implementations, the threshold values used to generate the issue data 138 may be based at least in part on input from the developer 102 or another source of user input. For example, a user accessing the user interface 110 may create or change one or more of the threshold values specified by the analysis threshold data 306.

The explanation data 308 may include information about one or more issues. In some implementations, explanation data 308 may include rich text, hyperlinks, and so forth that provides explanations, code examples, and so forth with regard to particular issues. For example, the explanation data 308 may include text that indicates a recommended threshold maximum time for image load, advantages or reasons for use of downsampling, links to examples on how to downsample, and so forth. In implementations where an issue involves a variance relative to a threshold value, the explanation data 308 may include information indicative of how to reduce the variance.

In some cases, operation of the analysis module 132 may be responsive to the issue request data 144. For example, issue request data 144 may trigger the analysis module 132 to perform additional analysis on the burst data 136. The additional analysis may include processing by another automated system, a request for input from human operators, or a combination thereof. In some cases, the additional analysis may result in creation or modification of the analysis rule data 304 or analysis threshold data 306. For example, if a developer 102 determines that an issue of interest was not detected, the developer 102 may crate issue request data 144 that indicates particular log data 128, session data 130, or burst data 136 that the developer 102 believes may correspond to an issue. Changes to the analysis rule data 304 or analysis threshold data 306 may result in the additional analysis determining that the indicated portion of the log data 128, session data 130, or burst data 136 corresponds to an issue.

In some implementations the analysis module 132 may perform a deep inspection of the AUT traffic 114. For example, the analysis module 132 may determine that an image file is being transferred using a first image format and first data compression level. Continuing the example, the analysis module 132 may test the image file or otherwise analyze the image file to determine if a second image file format or second data compression level would result in improved performance, reducing a data transfer time.

The issue data 138 generated by the analysis module 132 may include one or more of an issue description 312, impact data 314, explanation data 308, and so forth. The issue description 312 may include information that is indicative of the nature of the issue. For example, the issue description 312 may include the text "Excessive Image Load Time". The impact data 314 may include information indicative of the effect of the issue on performance. For example, the impact data 314 may include information that indicates an amount of delay by one or more activities 204 that exceeds a threshold value. Continuing the example, the impact data 314 may indicate that an image load time exceeded a threshold value by 2.23 seconds. The issue data 138 may also include explanation data 308, as described above, that is associated with the issue. The impact data 314 may thus provide information about some aspect of the AUT 104 that has performed at a level that indicates decreased functionality, an error, or a non-optimized condition, while the explanation data 308 may provide additional detail to guide a developer 102 toward a resolution of the issue. In some implementations, a system may interface with or incorporate elements of an integrated development environment ("IDE") used for development or maintenance of the AUT 104. In these implementations, issue data 138 may be associated with the particular portion of source code data 316. The source code data 316 may include at least a portion of source code, markup language, script, or other instructions that are used to process data when executed by a processor. In some implementations, the source code data 316 may need to be compiled prior to execution by the processor. The IDE may be used, in some cases, the modify the source code for the AUT 104, such as in response to an issue.

Figure 4:
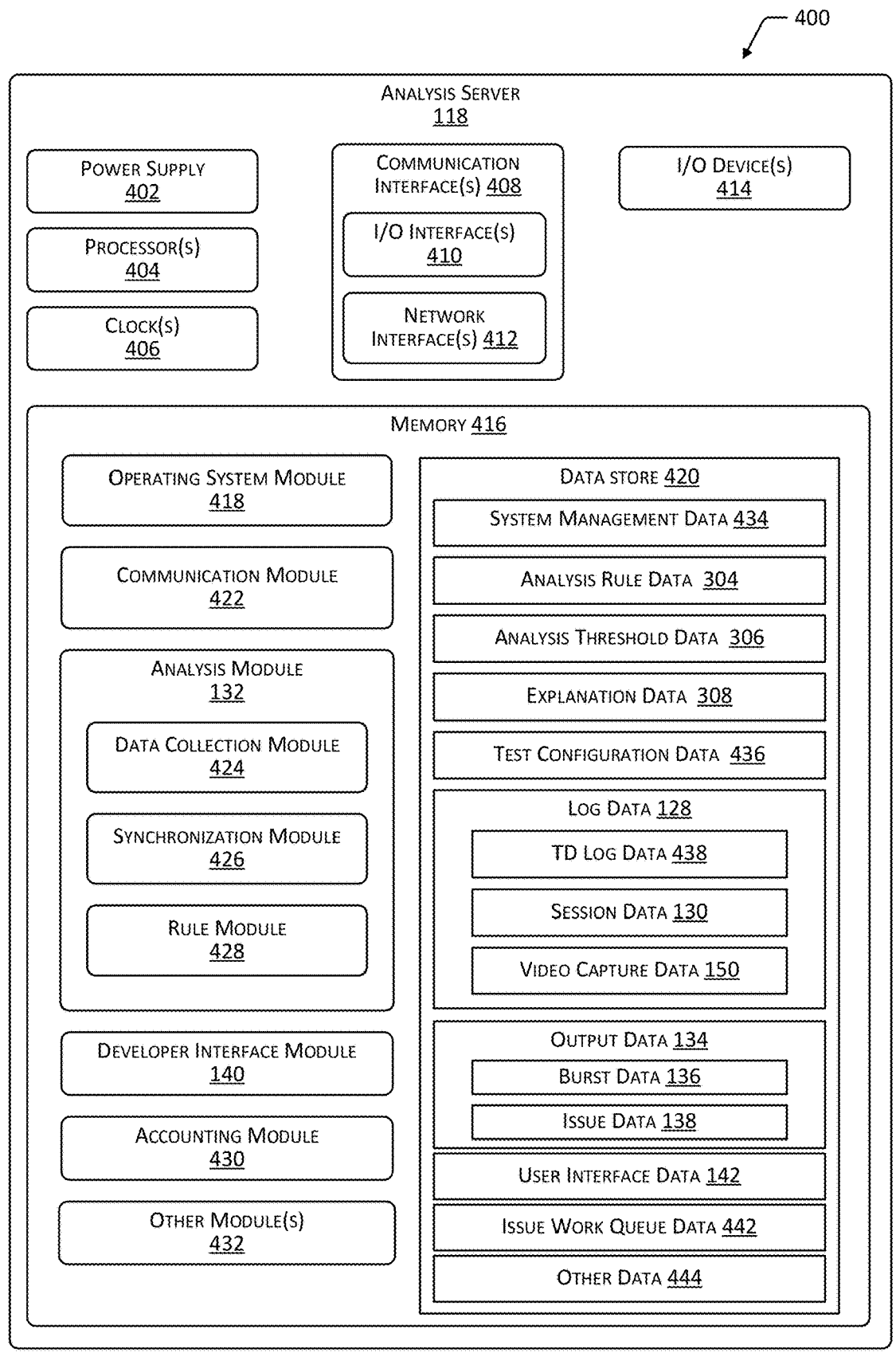
FIG. 4 illustrates a block diagram of an analysis server configured to provide a user interface with information based on the burst data and the issue data, according to one implementation.

FIG. 4 illustrates a block diagram 400 illustrating one implementation of the analysis server 118. The analysis server 118 may be configured to provide the user interface 110 with information based on the burst data 136, the issue data 138, and so forth.

One or more power supplies 402 may be configured to provide electrical power suitable for operating the components of the analysis server 118. In some implementations, the power supply 402 may include a rechargeable battery, fuel cell, photovoltaic cell, power conditioning circuitry, and so forth.

The analysis server 118 may include one or more hardware processor(s) 404 (processors) configured to execute one or more stored instructions. The processor(s) 404 may include one or more cores. One or more clocks 406 may provide information indicative of date, time, ticks, and so forth. For example, the processor(s) 404 may use data from the clock 406 to generate a timestamp, trigger a preprogrammed action, and so forth.

The analysis server 118 may include one or more communication interfaces 408, such as input/output (I/O) interfaces 410, network interfaces 412, and so forth. The communication interfaces 408 may enable the analysis server 118, or components of the analysis server 118, to communicate with other devices or components of the analysis server 118. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include any manner of input device or output device associated with the analysis server 118. For example, I/O devices 414 may include touch sensors, keyboards, mouse devices, microphones, image sensors (e.g., cameras), scanners, displays, speakers, haptic devices, printers, positioning devices, and so forth. The positioning device may comprise one or more of a satellite radionavigation system, inertial navigation system, terrestrial radionavigation system, or other device configured to generate data indicative of the geolocation. For example, the satellite radionavigation system may comprise a Global Positioning System ("GPS") receiver, the terrestrial radionavigation system may utilize information from network access points, and so forth. In some implementations, the I/O devices 414 may be physically incorporated with the analysis server 118 or may be externally placed.

The network interfaces 412 may be configured to provide communications between the analysis server 118 and other devices, such as the I/O devices 414, routers, access points, and so forth. The network interfaces 412 may include devices configured to couple to one or more networks 112 including local area networks (LANs), WLANs, wide area networks (WANs), WWANs, and so forth. For example, the network interfaces 412 may include devices compatible with Ethernet, Wi-Fi, Bluetooth, ZigBee, Z-Wave, 3G, 4G, LTE, and so forth.

The analysis server 118 may include one or more busses or other internal communications hardware or software that allows for the transfer of data between the various modules and components of the analysis server 118.

As shown in FIG. 4, the analysis server 118 may include one or more memories 416. The memory 416 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 416 may provide storage of computer-readable instructions, data structures, program modules, and other data for the operation of the analysis server 118. A few example modules are shown stored in the memory 416, although the same functionality may alternatively be implemented in hardware, firmware, or as a system on a chip (SoC).

The memory 416 may include one or more operating system (OS) modules 418. The OS module 418 may be configured to manage hardware resource devices such as the I/O interfaces 410, the network interfaces 412, the I/O devices 414, and to provide various services to applications or modules executing on the processors 404. The OS module 418 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; the Mac OS or iOS promulgated by Apple Inc. of Cupertino, Calif., USA; or other operating systems.

A data store 420 and one or more of the following modules may also be stored in the memory 416. The modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other computing devices, network attached storage devices, and so forth.

A communication module 422 may be configured to establish communications with one or more other devices using one or more of the communication interfaces 408. Communications may be authenticated, encrypted, and so forth. For example, the communication module 422 may utilize digital certificates to authenticate the identity of devices involved in the communication. The communication module 422 may be configured to establish a virtual private network (VPN) connection or tunnel with the proxy host device.

The analysis module 132 may also be stored in the memory 416 and may perform one or more of the functions as described above. The analysis module 132 may include or may be in communication with one or more of a data collection module 424, synchronization module 426, or rule module 428. The data collection module 424 may be configured to obtain the log data 128 or portions thereof for one or more of the device data collection module 124, the proxy data collection module 126, or other devices or modules within the system. The synchronization module 426 may be configured to coordinate or synchronize the log data 128 into a common reference frame, such as by time. For example, the synchronization module 426 may acquire the session data 130, which may include timestamps for transfers of data, and may synchronize the session data 130 with the video capture data 150. The synchronization module 426 may be configured to determine a common reference time between the different forms and sources of log data 128 to allow for the association of a particular activity 204 or portion thereof with a particular portion of the video capture data 150, or other types of data.

The rule module 428 may be configured to generate rules for inclusion in the analysis rule data 304. For example, the rule module 428 may utilize one or more automated techniques to generate an analysis rule. In another example, the rule module 428 may receive new rules, or modifications to existing rules via user input. The rule module 428 may also be configured to process log data 128 or portions thereof using the analysis rule data 304, the analysis threshold data 306, and so forth as described above with regard to FIG. 3. For example, the rule module 428 may be used to generate the issue data 138.

In some implementations, the analysis module 132 may be configured to generate information indicative of one or more network characteristics. Network characteristics may include information associated with the transfer of data using the network 112. The network characteristics may include, but are not limited to, bandwidth, latency, number of packets sent, packet loss, transmit power, received signal strength, jitter, and so forth.

The memory 416 may also include the developer interface module 140, described with regard to FIG. 1. In some implementations, at least a portion of the functionality of the developer interface module 140 may be performed by another computing device, such as a web server.

An accounting module 430 may be configured to determine and assess charges associated with the use of the system 100, provide remuneration to operators of proxy access devices, assess charges for the development of rules, assess charges for consulting on the operation of the AUT 104, and so forth. For example, the accounting module 430 may be configured to assess charges to an account associated with the developer 102 when one or more human operators are requested to determine new rules to detect one or more issues. The accounting module 430 may also provide other functions, such as assessing charges associated with the use of a particular proxy access device at a particular geolocation for a certain amount of time, quantity of data transferred, and so forth.

Other modules 432 may also be present in the memory 416. In some implementations, one or more of the modules may be stored at least in part in the memory 416 of other devices, may be executed at least in part on the other devices, and so forth. For example, a network analysis module may be configured to generate data indicative of one or more network characteristics associated with the AUT traffic 114. In another example, a coordination module may be configured to access system management data 434.

The system management data 434 may include status data, such as proxy host device (PHD) status data, the proxy access device (PAD) status data, and so forth. A PHD may include a workstation or server that coordinates the operation of one or more PADs. The PADs may include cellular telephones or other devices that may connect to the WCDN, WLAN, or other network 112 that is of interest for testing the AUT 104. The PHD status data may include information such as a network address, operational status, information indicative of installed software, version of installed software, current utilization of computational resources, and so forth. The PAD status data may comprise information such as make and model of the PAD, OS version of the PAD, connection status to the second network 112(2), whether the PAD is currently in use by another AUT 104, and so forth.

The system management data 434 may also include developer account data. The developer account data may include information such as individual account logins and passwords, billing information, usage information, and so forth.

The system management data 434 may also include device configuration data. Device configuration data may include instructions, applications, modules, and so forth, that may be used to configure one or more of the PHD or the PAD. For example, the device configuration data may include one or more scripts that may be executed by the PHD to send instructions to one or more PADs. These instructions may configure a PAD to transfer data between the PHD and the second network 112(2).

The data store 420 may also store test configuration data 436 associated with the testing of the AUT 104. For example, test configuration data 436 may specify a second geolocation, which may be selected by the developer 102, that will be used for network testing, a network address of the PHD, credentials to access the PHD, costs associated with access to the PAD, information about the PHD or PAD, and so forth. In some implementations, at least a portion of AUT traffic 114 may be stored in the data store 420.

In some implementations, the analysis server 118 may generate at least a portion of the test configuration data 436. The generation of the test configuration data 436 may be based at least in part on information provided by the developer 102 or other user input. For example, a developer 102 may use the developer interface module 140 to specify parameters such as different types of tests parameters, alarm limits, or test thresholds, modify one or more values of the analysis threshold data 306, and so forth. Based on these parameters, the test configuration data 436 may be generated. In some implementations, test configuration data 436 may be modified by the developer 102 or may be generated entirely by the developer 102 or another device or entity.

The log data 128 may include test device (TD) log data 438. For example, the TD log data 438 may comprise information indicative of state of the radio, memory usage, processor usage, temperature, power consumption, and so forth of the test device 106 during testing. The log data 128 may also include the session data 130. In some implementations, the log data 128 may include video capture data 150. As described previously, the video capture data 150 may include image data or video data that was presented or prepared for presentation on a display device that is associated with testing. For example, video capture data 150 may include a motion picture experts group (MPEG 4) video file of images generated by a graphic system of the test device 106.

The data store 420 may store one or more of the analysis rule data 304, the analysis threshold data 306, the explanation data 308, log data 128, the output data 134, the user interface data 142, and so forth.

The data store 420 may be also store issue work queue data 442. The issue work queue data 442 may include information generated responsive to the issue request data 144. For example, the issue work queue data 442 may include one or more requests for analysis of a particular burst 214 or other portion of the log data 128.

Other data 444 within the data store 420 may include information such as layout templates to generate the user interface data 142, individual developer 102 preferences, and so forth.

In some implementations, one or more of the modules may be stored at least in part in the memory of other devices, may be executed at least in part on the other devices, and so forth. For example, one or more functions associated with the accounting module 430 may execute on another server.

Other computing devices described in this disclosure may have similar hardware and software components described with regard to the analysis server 118. For example, the workstation 108, TD 106, proxy access devices, destination devices 116, and so forth may also include one or more processors 404, operating system modules 418, and so forth.

Figure 5:
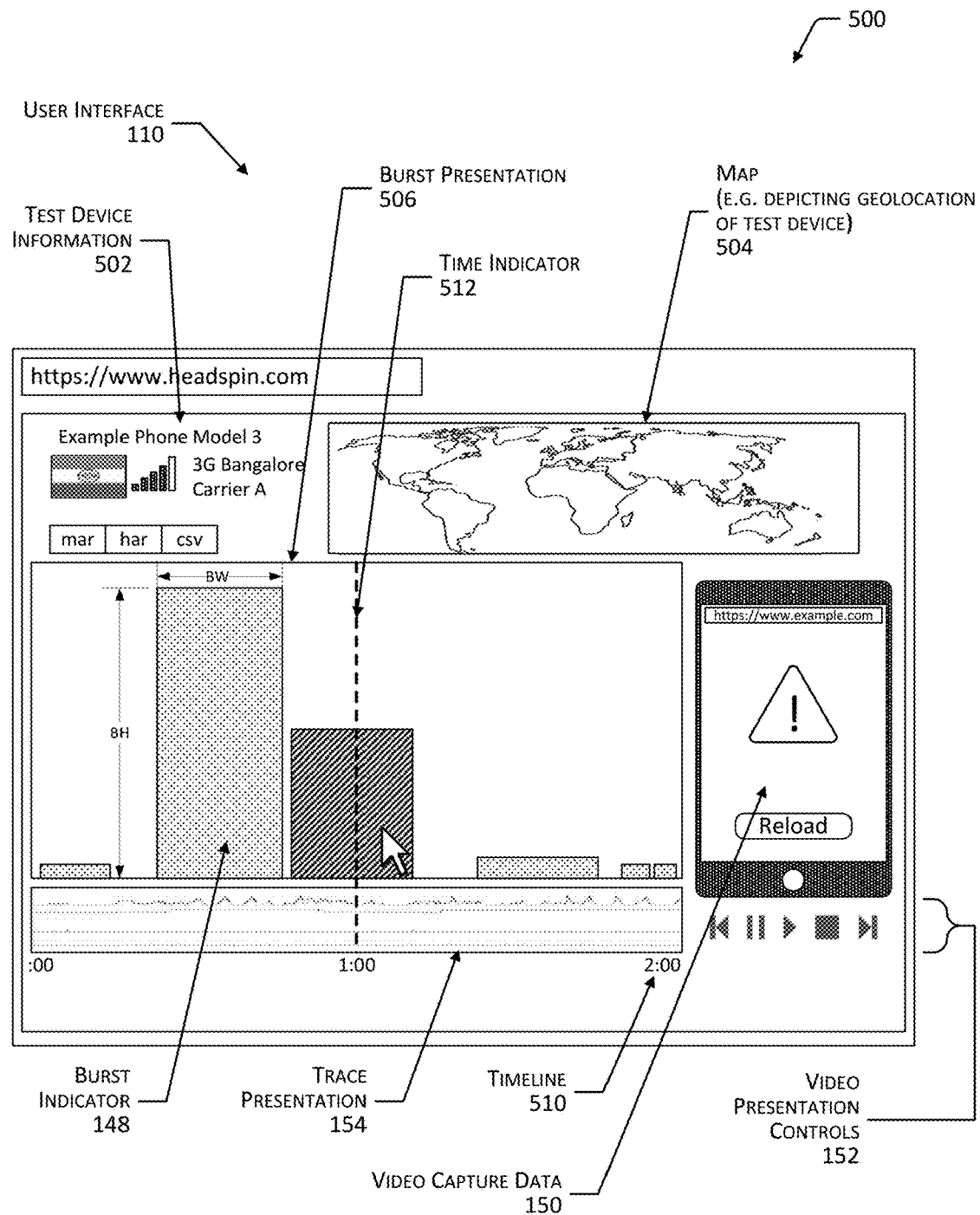
FIG. 5 illustrates a user interface depicting information based on the burst data, according to one implementation.

FIG. 5 illustrates an example 500 of a user interface 110 depicting information based on burst data 136, according to one implementation. The information may be determined by the TD 106, the analysis sever 118, or another device.

In this and the following examples of the user interface 110, the user interface 110 is depicted as being presented within a web browser or using a web rendering engine. In other implementations, the user interface 110 may be presented using a dedicated application, a non-web browser, and so forth.

The user interface 110 presents test device information 502, such as information indicative of the type of test device 106 that is involved in testing the AUT 104. For example, FIG. 5 depicts the test device information 502 including an indication of the geolocation and network 112 that is being used to provide access to the WCDN during testing.

The user interface 110 may also include a map 504. The map 504 may include an image indicating the geolocation of one or more of the test device 106 or a proxy access device being used to access the WCDN.

The user interface 110 may also include one or more of a burst presentation 506, a trace presentation 154, or a timeline 510. The burst presentation 506 may provide information based at least in part on the burst data 136, or the issue data 138 associated with that burst data 136. For example, the burst presentation 506 may include one or more burst indicators 148. FIG. 5 depicts each burst indicator 148 as a rectangle with a width "BW" along a horizontal axis that is based on a union of times of the activities represented by the burst indicator 148, and a height "BH" along a vertical axis that represents a sum of the data transferred by the activities represented by the burst indicator 148. In another implementation, the width BW may represent the elapsed time during which the activities represented by the burst indicator 148 were performed, while the height BH may indicate a union of the impact times associated with the activities or with issues affecting the activities. In some implementations, the impact time may include lengths of time by which particular activities represented by the burst indicator 148 exceeded a threshold value. For example, the height BH may represent the amount of time that exceeded the respective threshold values for particular activities. The burst indicator 148 may enable a developer 102 or other individual to quickly visualize which bursts 214 of activities are associated with large quantities of time, large quantities of data transfer, and so forth. In other implementations, the burst indicator 148 may have dimensions based on other characteristics of the represented activities. For example, the height BH may be based at least in part on values of one or more network characteristics associated with one or more activities 204.

The trace presentation 154 may include one or more graphs or other types of visual representations that depict changes in designated characteristics over time. For example, the trace presentation 154 may present information indicative of utilization of the processor of the TD 106, usage of memory of the TD 106, the quantity of outbound application traffic 120, quantity of inbound application traffic 122, number of concurrent connections, and so forth.

The user interface 110 may also present video capture data 150. As described previously, the video capture data 150 may include image data or video data that was displayed or intended for display on the TD 106 during testing of the AUT 104. In some implementations, the video capture data 150 may include a recording of the image data or video data that was presented or prepared for presentation.

The timeline 510 may provide information indicative of a point in time for which the user interface 110 is displaying information. For example, the timeline 510 of FIG. 5 shows a beginning time of 0 seconds and an ending time of 2:00, that may encompass at least a portion of the duration of the time during which testing of the AUT 104 was taking place.

Presentation of the data within the user interface 110 may be synchronized. A time indicator 512 may provide a visual indication, along the timeline 510, of a current point in time that is being represented in the user interface 110. For example, as shown in FIG. 5, the time indicator 512 includes a dashed vertical line that is centered at approximately 1:00 on the timeline 510. Continuing this example, the image presented by the video capture data 150 may include an image or frame of video data that was presented or intended for presentation on the TD 106 at the time indicated by the time indicator 512. Additionally, the burst indicator 148 intersected by the time indicator 512 may indicate the particular group of activities that corresponds to the indicated time, and the values of the trace presentation 154 that intersect the time indicator 512 may indicate the values for various determined characteristics that occurred at the indicated time.

The user interface 110 may include one or more video presentation controls 152. The video presentation controls 152 may allow a user to control presentation of the video capture data 150 such as by rewinding, pausing, playing, stopping playback, accelerating playback, and so forth.

In some implementations, other inputs may be used to change or select the particular time for which information is presented within the user interface 110. For example, a mouse or touch control may be used to drag the time indicator 512 to a desired point along the timeline 510 or to select a point for the time indicator 512. Once the time indicator 512 is positioned, playback of the video capture data 150 and the other corresponding information within the user interface 110 may resume from the point in time that corresponds to the time indicator 512. Gesture input such as pinching to zoom out or moving two fingers to zoom in on a portion of the timeline 510 may also be used.

In other implementations, one or more of the user interface elements depicted in FIG. 5 may be omitted, or may be positioned in other arrangements. For example, the map 504 may be omitted.

Figure 6:
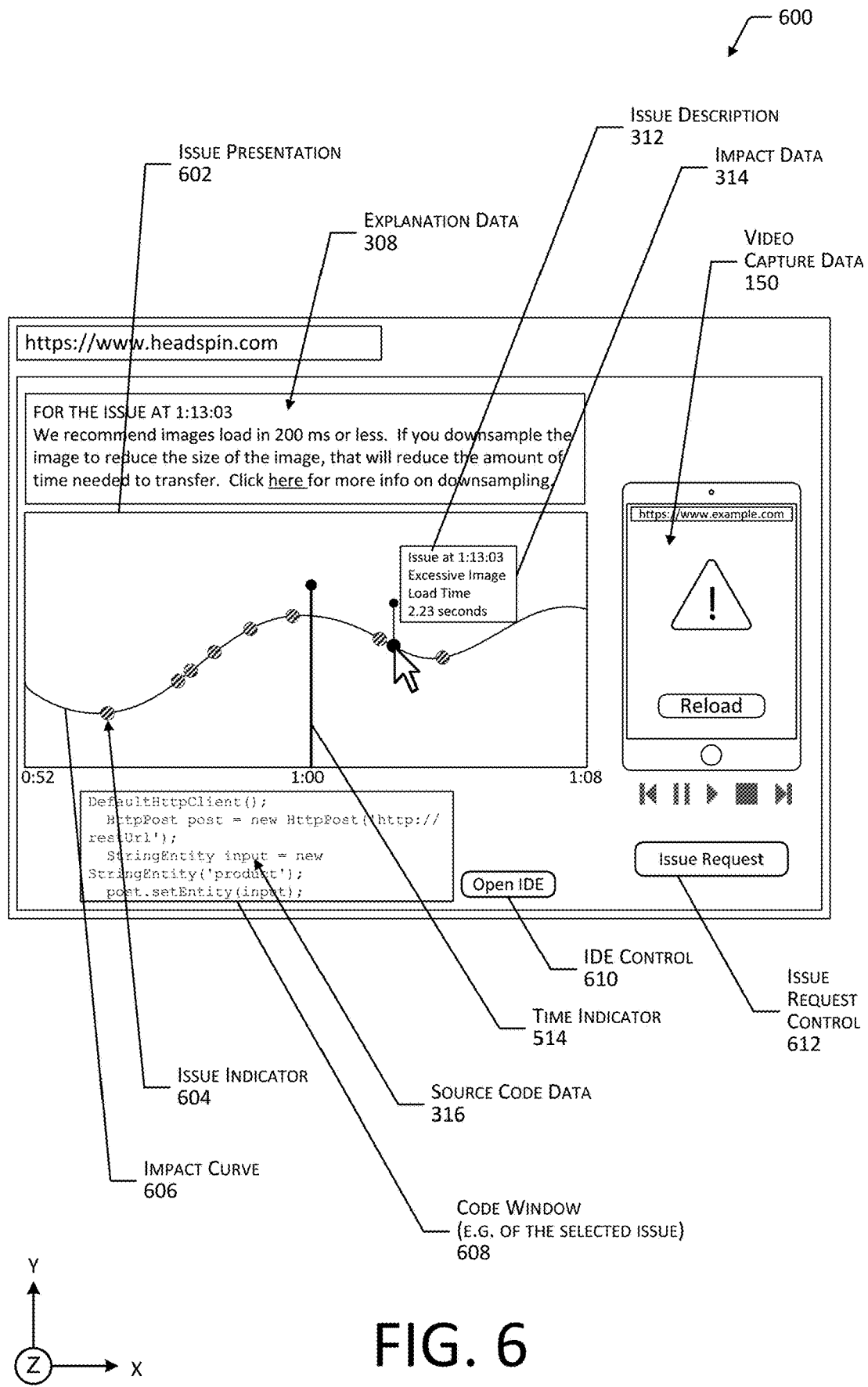
FIG. 6 illustrates a user interface depicting information based on the issue data associated with a burst, according to one implementation.

FIG. 6 illustrates another example 600 of a user interface 110, according to one implementation. The user interface 110 of FIG. 6 presents information based on issue data 138 associated with a burst 214. To access the issue data 138 shown in FIG. 6, a user may provide user input to the user interface 110 of FIG. 5 to select a particular burst indicator 148 (indicated by the cursor arrow of FIG. 5). The information presented in the user interface 110 of FIG. 6 may include additional information based on the burst data 136 associated with the selected burst indicator 148. As such, the user interface 110 of FIG. 6 includes a timeline 510 that represents the times ranging from 0:52 to 1:08, showing a view that is "zoomed in" relative to the timeline 510 of FIG. 5.

An issue presentation 602 section within the user interface 110 may provide information about one or more of the issues within the burst 214 associated with the selected burst indicator 148. One or more issue indicators 604 may provide visual indicia indicative of an occurrence of an issue at a particular time on the timeline 510. The placement of the issue indicator 604 with respect to the horizontal axis may be based on the time at which the issue was determined to occur. For example, the issue indicator 604 may be placed using information such as a timestamp present in the issue data 138 associated with a particular issue. The placement of the issue indicator 604 with respect to the vertical axis may be based on one or more of the metric data 310 or other attributes associated with the issue, such as a relative importance of the particular issue, an impact time associated with the issue, or a quantity of data transferred between the AUT 104 and another device. In some implementations, the user interface 110 may include controls to change the information that is used for the vertical axis of the issue presentation 602 section.

A time indicator 512 and video capture data 150 may also be presented in the user interface 110. The position of the time indicator 512 relative to the timeline 510 may be synchronized with the presentation of the video capture data 150, similar to that described with regard to FIG. 5.

In some implementations, an impact curve 606 may be generated based in part on the log data 128 or issue data 138. The impact curve 606 may include a curve that has been fitted to the issue indicators 604. Presentation of the impact curve 606 may serve to improve comprehension of the changes in the performance of the AUT 104 over time during testing. For example, the impact curve 606 may indicate the amount of data transmitted, the amount of time or computational resources used, or other metric data, over time.

In some implementations, the user interface 110 may be configured to receive user input, such as indicated in FIG. 6 by a cursor arrow. User input may result in additional information being presented. For example, in response to user input selecting an issue indicator 604 or impact curve, an issue description 312 and impact data 314 associated with the issue may be presented. In some implementations, Explanation data 308 associated with the issue that has been selected may also be presented.

In some implementations, a code window 608 in the user interface 110 may present a least a portion of the program code associated with the selected issue. For example, FIG. 6 depicts a portion of the source code data 316 associated with an image transfer activity presented contemporaneously with the issue data 138. In some implementations, where the system is part of an integrated development environment (IDE), the code window 608 may receive user input to add, remove or edit code, such as to attempt to mitigate the associated issue. An IDE control 610 may be presented in some implementations that allows for an IDE to be opened and presented to a user. For example, activation of the IDE control 610 may open an IDE application, which may provide an interface that may be accessed by the developer 102. In some cases, the source code data 316 that is associated with the issue may be presented within the IDE.

In some situations, the developer 102 or another user or entity may determine that operation of the AUT 104 during testing did not meet certain expectations, criteria, or test parameters. For example, the analysis rule data 304 may not include a rule that generates issue data 138 associated with an issue detected by the developer 102. In such a case, the developer 102 may activate an issue request control 612 in the user interface 110. The issue request control 612 may be configured to generate the issue request data 144, as described previously. Once generated, the issue request data 144 may be processed to initiate a workflow to trigger further analysis of burst data 136 or other information in the log data 128. The issue request data 144 may be processed to determine one or more analysis rules that may be added or modified, then used to determine issue data 138 for subsequently collected session data 130.

In some implementations, responsive to activation of the issue request control 612, the user interface 110 may present a waterfall display. The waterfall display may present the session data 130 or other information associated with the point in time associated with the issue request data 144.

In other implementations, in lieu of or in addition to the issue request control 612, a user may interact with the impact curve 606 to select particular session data 130 for further analysis. For example, a user may select a region of the impact curve 606 using a touch or mouse input. In some implementations, in response to selecting a region of the impact curve 606, the user interface 110 may present a popup or other data entry feature accessible to request further analysis.

Figure 7:
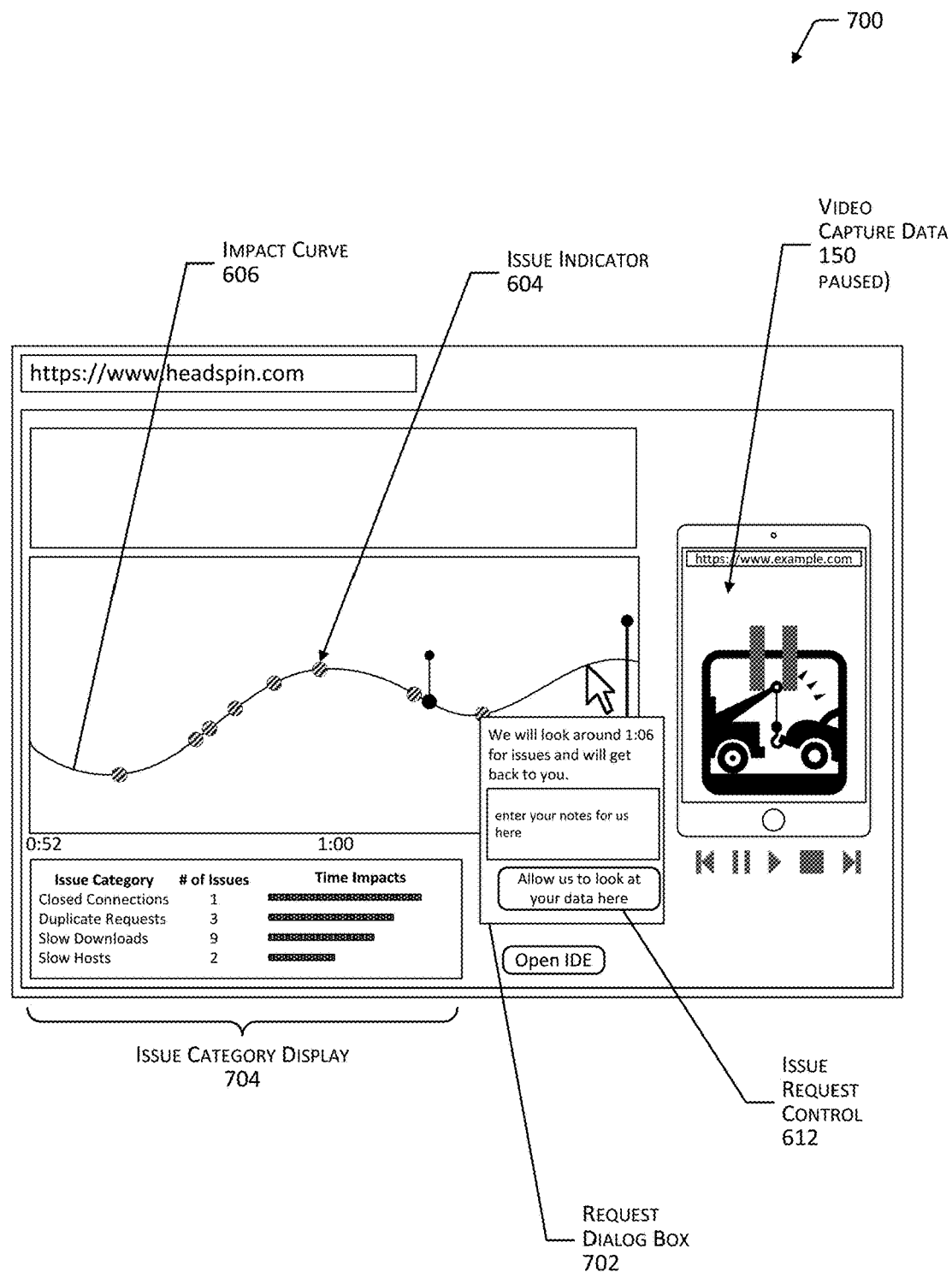
FIG. 7 illustrates the user interface of FIG. 6 for entry of an issue, according to one implementation.

FIG. 7 illustrates an example 700 of a user interface 110 that may be presented after user selection of a point on an impact curve 606 that is not associated with an issue indicator 604. For example, a developer 102 or other user may select a particular point on the impact curve 606 where no issue indicator 604 is presented if the particular portion of the impact curve 606 is of interest to the developer 102. For example, the video presented in the video capture data 150 at a particular time may visually appear erroneous while no issue was determined. The selection may be responsive to a user input, such as a mouse click, touch input, and so forth. Responsive to this user input, issue request data 144 may be generated.

In some implementations, responsive to the user input, playback of the video capture data 150 may be paused. A request dialog box 702 or other interface to obtain input may be presented to allow for the acquisition of information from a user. The request dialog box 702 may include a text input feature to receive text. A user may interact with the request dialog box 702 to specify data related to an issue request. Upon activating the issue request control 612, the user input or data indicative of the user input may be included in the issue request data 144. The issue request data 144 may initiate a workflow that presents the information associated with the particular point in time selected when the issue request control 612 was activated to one or more human operators or to an automated system for further analysis. The human operators or automated system may then analyze the portion of the output data 134 that is associated with the particular point or with the particular portion of the session data 130 or impact curve 606 associated with the issue request. The results of the analysis may then be used to update the user interface 110 or generate a new user interface 110 for presentation.

The user interface 110 of FIG. 7 also presents an issue category display 704. The issue category display 704 may present an indication of one or more issues that are associated with various issue categories. A number of instances for a category of issue data 138 may also be presented. The issue category display 704 may additionally include information indicative of a time impact for a category of issue data 138. For example, the time impact may be presented as a bar graph that is indicative of a union of the total time for each issue within a category. For example, the time impact may be indicated as a bar having a length corresponding to a length of time by which performance of a set of activities associated with the issues exceeded corresponding threshold values.

In some implementations, a developer 102 or other user may generate a user input event, such as a touch or mouse click selecting a particular issue indicator 604 on the impact curve 606, or a particular issue category in the issue category display 704, to select a particular issue or a particular category. Responsive to this user input event, a waterfall display (such as the waterfall display 1702 in FIG. 17) may be presented that provides additional information about the selected issue or category. The impact of the selected issue may be presented as described below with regard to the contribution area 802 (described in FIG. 8) on the impact curve 606, by changing the color of the elements associated with the issue in the waterfall display, and so forth.

Figure 8:
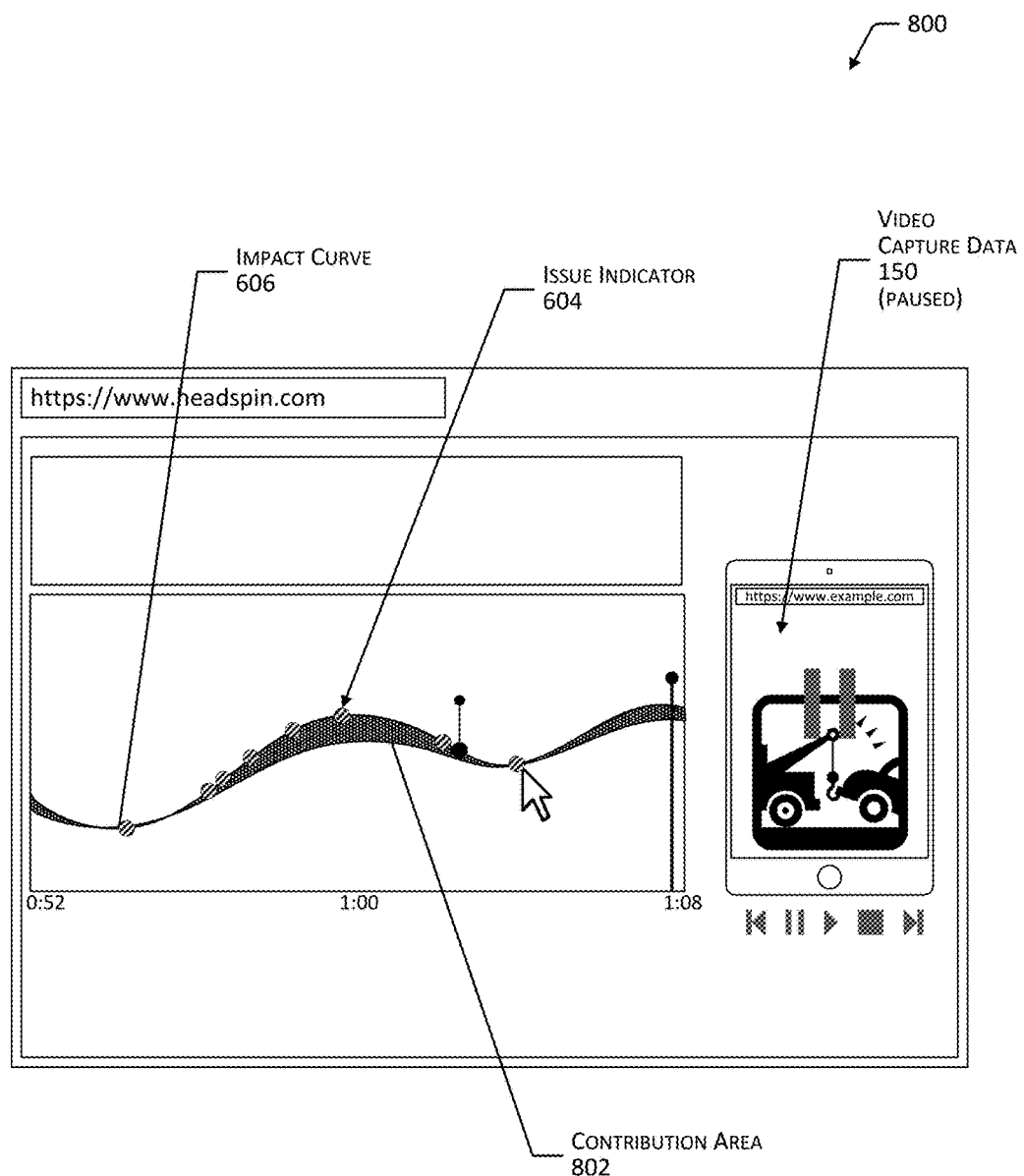
FIG. 8 illustrates additional information presented in an impact curve for an issue, according to one implementation.

FIG. 8 illustrates another example 800 of a user interface 110 depicting information based on the issue data 138, according to one implementation. In the user interface 110 of FIG. 8, the impact curve 606 for an issue 138 is presented, as described previously with regard to FIG. 6. A contribution area 802 is also depicted. The contribution area 802 provides information associated with a particular occurrence of an issue or category of issue and the impact of that particular issue or category of issue. The contribution area 802 may be represented as an area that extends below the impact curve 606. For example, FIG. 8 depicts the contribution area 802 as a shaded area that indicates the amount of time that one or more instances of the particular category of issue exceeded a threshold value. Continuing the example, the category of issue may include a "slow download" issue, and multiple instances of slow downloads may be represented by a contribution area 802. In another implementation, the contribution area 802 may be shown for a single instance of an issue that occurs at different times. For example, the shaded area shown in FIG. 8 may be associated with a single instance such as a slow download that exceeds the threshold value at multiple different times.

In some implementations, user input that indicates the impact curve 606, one of the issue indicators 604, or the contribution area 802 may be received. In response to selecting one of the issue indicators 604, the user interface 110 may present issue data 138 associated with the selected feature, which may include a single instance or multiple instances of an issue.

For example, a user may use a mouse device to click on the user interface 110 near a portion of the impact curve 606 and drag the pointer to another location to trace a rectangle that extends across the impact curve 606. The user interface 110 may then present a popup within which the user may enter data related to an issue data request for further analysis. In some implementations, such a request may be converted into a set of analysis rules for evaluating session data 130 to identify issue data 138.

Figure 9:
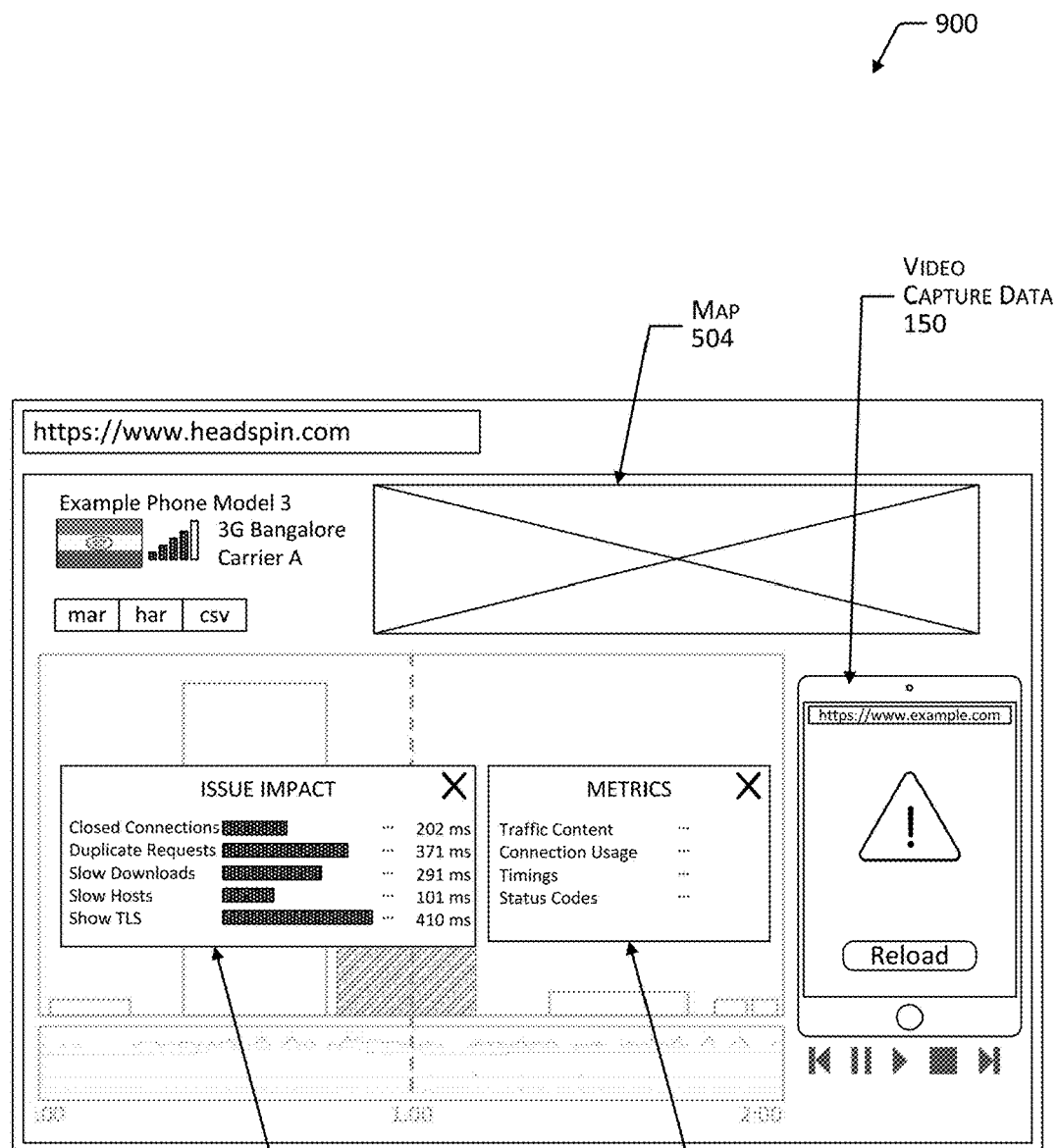
FIG. 9 illustrates a user interface depicting information based on the issue data, according to one implementation.

FIG. 9 illustrates an example 900 of a user interface 110 presenting information based on the issue data 138, according to one implementation. In the user interface 110 of FIG. 9, selection of a particular burst indicator 148, as shown in FIG. 5, may cause presentation of the example user interface 110. The user interface 110 of FIG. 9 includes an issue presentation 902 section that presents issue data 138 corresponding to the selected burst indicator 148 and a metric presentation 904 section that presents metric values associated with the selected burst indicator 148.

The issue presentation 902 section may include information such as a list of the issues represented by the issue data 138 associated with the burst data 136. The issue presentation 902 section may represent the issues using bar graphs or other visualizations. In some implementations, a user may select a particular item from the information presented in the issue presentation 902 section to view additional detail associated with the selected issue. The metric presentation 904 section may include information about various network characteristics or other information obtained from the log data 128. For example, the metric presentation 904 section may present a quantity of traffic, a quantity of computational resources, a quantity of time, status codes associated with performance of an activity, and so forth. In some implementations, a user may select a particular metric from the metric presentation 904 section to view additional detail associated with the selected metric.

Figure 10:
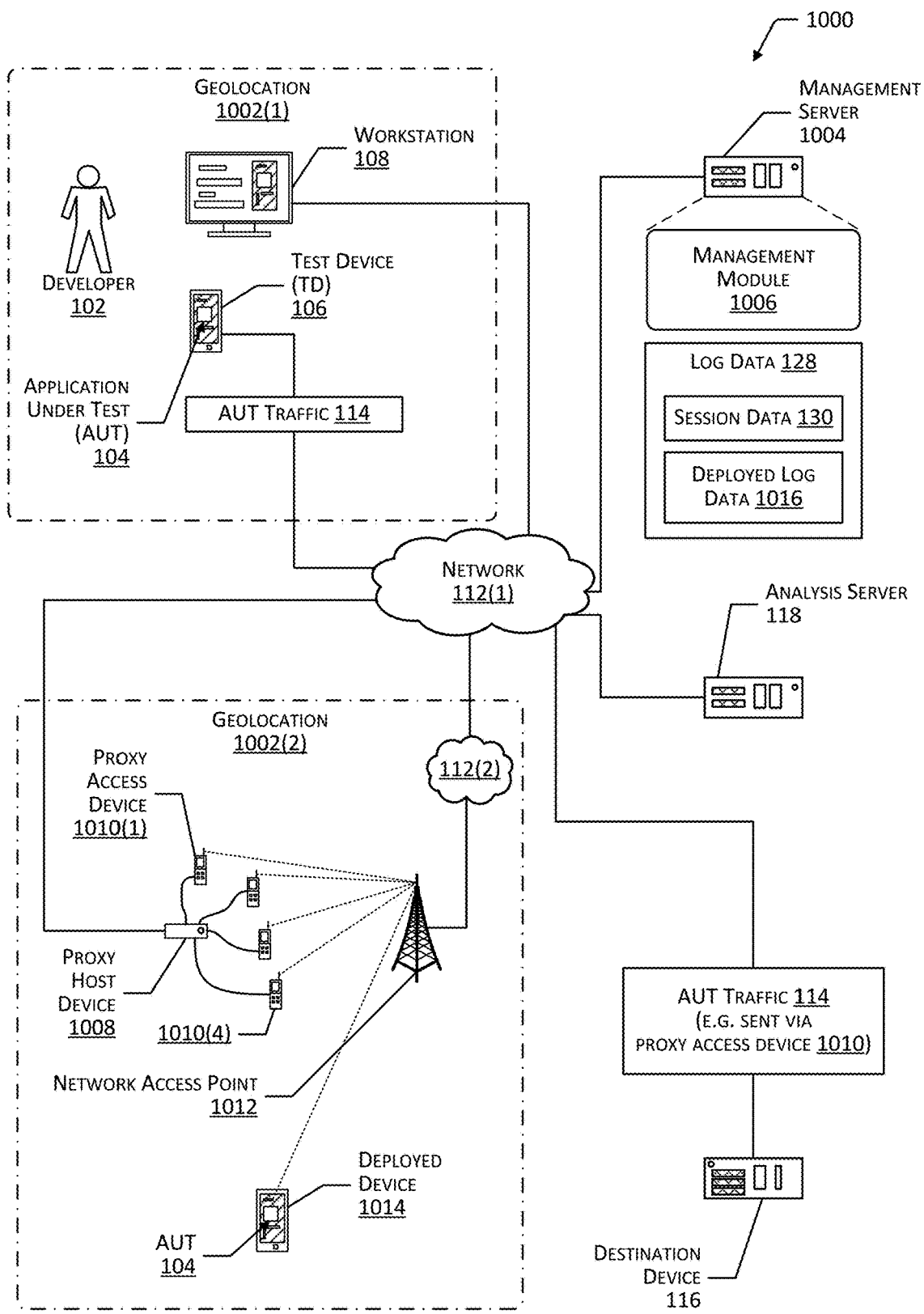
FIG. 10 illustrates a system configured to use proxy access devices and proxy host devices to allow for testing of an application under test on networks located at different geolocations, according to one implementation.

FIG. 10 illustrates an implementation of a system 1000 configured to use proxy access devices and proxy host devices to allow for testing of the AUT 104 on networks 112 located at different geolocations. A developer 102, or another user or entity, may determine data from one or more AUTs 104 executing on different devices and located at different geolocations 1002. A geolocation 1002 may include a geographic location, such as a particular room, building, city, state, country, and so forth. For example, a geolocation 1002 may be specified by a set of coordinates with regard to latitude and longitude on the surface of the Earth.

One or more of the developer 102, the TD 106, or the workstation 108 may be located at a first geolocation 1002 (1). One or more of the TD 106 or the workstation 108 may be connected to a first network 112(1). The first network 112(1) may, in turn, be connected to or be part of a larger network. For example, the first network 112(1) may include the Internet or may communicate with the Internet. The connection used by the TD 106 or the workstation 108 may include, but is not limited to, a wired Ethernet connection, a wireless local area network (WLAN) connection such as Wi-Fi, and so forth. For example, the first geolocation 1002(1) may include an office where a developer 102 is working. The TD 106 may connect to a local Wi-Fi access point that is connected via an Ethernet cable to a router. The router, in turn, may be connected to a cable modem that provides connectivity to the Internet.

The TD 106 may execute the AUT 104. The AUT 104 may generate AUT traffic 114 that is exchanged with one or more destination devices 116 during operation. The AUT 104 may exchange AUT traffic 114 with a single destination device 116 or multiple different destination devices 116 during operation. In some implementations, the AUT traffic 114 generated by the TD 106 at the first geolocation 1002(1) may be sent to the first network 112(1) and then to the destination device 116. In other implementations, the AUT traffic 114 generated by the TD 106 at the first geolocation 1002(1) may be sent through a backbone network or through one or more other communication paths.

To provide the functionality described herein, a software development kit (SDK) may be incorporated into the AUT 104. In other implementations, techniques other than a SDK may be used to provide the functionality described herein. The SDK may be configured to provide an interface to a display of the test device 106, workstation 108, or other computing device that enables the AUT traffic 114 to be redirected. For example, the SDK may include instructions to establish communication with a management server 1004 and interact with a management module 1006 of the management server 1006.

The management server 1004 may utilize the management module 1006 to coordinate the activities of one or more proxy host devices 1008 or proxy access devices 1010. The management server 1004 may also store log data 128, including session data 130, and deployed log data 1016 from deployed devices.

The proxy host device 1008 may be coupled to the first network 112(1) and also to one or more of the proxy access devices 1010. For example, a proxy host device 1008 may include a server, tablet computer, a desktop computer, or another type of computing device to which multiple proxy access devices 1010 are tethered. Any number of proxy access devices 1010 may communicate with the proxy host device 1008.

The proxy access devices 1010, in turn, may be coupled to a network access point 1012. The network access point 1012 may provide connectivity to a second network 112(2). For example, the proxy access devices 1010 may include commodity cellphones, the network access points 1012 may include cell phone towers, and the second network 112(2) may include a WWAN, such as a wireless cellular data network (WCDN). The second network 112(2) may in turn be connected to the first network 112(1). For example, the WCDN, operated by a telecommunication company, may interconnect or have a peering agreement with an Internet backbone provider. As a result, a user of the second network 112(2) may be able to access resources on the first network 112(1), and vice versa.

The proxy access devices 1010 may be located at a second geolocation 1002(2) that is different from the geolocation 1002(1) of the TD 106. For example, the proxy host device 1008 and attached proxy access devices 1010 may be installed at a second geolocation 1002(2) that is in another city, state, country, and so forth.

As part of a testing process, the developer 102 may interact with the user interface 110 to access the management module 1006 of the management server 1004. From the user interface 110, the developer 102 may select one or more of a particular geolocation 1002 or particular proxy access device 1010 to use during testing. The management module 1006 may maintain information about the proxy access devices 1010, such as geolocation 1002, availability, cost, type of proxy access device 1010, and so forth.

The management module 1006 may coordinate establishment of a first connection between the AUT 104 and a proxy access device 1010 that was selected. For example, based on user input by the developer 102 or another user, the management module 1006 may determine a proxy host device 1008 that corresponds to the user input and retrieve information such as digital certificates, cryptographic credentials, network address, and so forth. In one implementation, the management module 1006 may prepare the proxy host device 1008 for communication with the AUT 104. In another implementation, the management module 1006 may provide configuration data to the AUT 104, which in turn may couple to the proxy host device 1008 and may send the configuration data.

During testing, the AUT traffic 114 may be routed through the first network 112(1) to the proxy host device 1008, through the proxy access device 1010, to the second network 112(2), and then to the first network 112(1) to ultimately arrive at the destination device 116. The AUT traffic 114 may include outbound application traffic 120 and inbound application traffic 122. During operation, the AUT 104 directs the outbound application traffic 120 to the proxy host device 1008 associated with the selected proxy access device 1010. The proxy host device 1008 in turn transfers the outbound application traffic 120 to the proxy access device 1010, which then sends the outbound application traffic 120 to the second network 112(2). The second network 112(2) may then send the outbound application traffic 120 to the destination device 116. Inbound application traffic 122 from the destination device 116 may follow the reverse path.

The management server 1004 may collect log data 128 associated with operation of the system. The log data 128 may include session data 130 associated with operation of the AUT 104. In some implementations, the proxy host device 1008 may be configured to generate the session data 130. The resulting session data 130 may represent interactions between the proxy access device 1010, TD 106, or other computing device with the networks 112. The management server 1004 may obtain the session data 130. For example, the proxy host device 1008 may stream the session data 130 to the management server 1004 during testing of the AUT 104. In another example, the management server 1004 may poll one or more proxy host devices 1008 periodically to retrieve the session data 130.

In other implementations, one or more deployed devices 1014 may provide deployed log data 1016 to the management server 1004 in place of or in addition to the session data 130. The deployed device 1014 may execute the AUT 104, and in some cases may incorporate a SDK. The SDK on a deployed device 1014 may be configured to collect deployed log data 1016 during operation of the AUT 104 on the deployed device 1014. The deployed log data 1016 may comprise information indicative of, at a particular time, one or more of: the geolocation 1002 of the deployed device 1014, breadcrumb data, and other information associated with the AUT traffic 114 or the operation of the deployed device 1014. For example, a user of the deployed device 1014 may agree to allow for the collection of the deployed log data 1016 on the deployed device 1014. While the user is using the AUT 104, deployed log data 1016 is collected. As a result, the deployed log data 1016 may include information that is obtained from actual users using the AUT 104 under real-world conditions. The geolocation 1002 of a deployed device 1014 may be obtained from a positioning device such as a GPS receiver, from a service such as Wi-Fi hotspot geolocation lookup, from a network provider based on signal strength or time delay at several network access points 1012, and so forth.

The deployed log data 1016 may be transmitted in real time or at specified intervals to the management server 1004 or another device. For example, the AUT 104 on the deployed device 1014 may be configured to send the deployed log data 1016 in real time or near real time (e.g., within a threshold maximum amount of time from the time at which the deployed log data 1016 is generated). For example, the deployed log data 1016 may be deemed to be "real-time" data if collected and transmitted within 100 milliseconds (ms). Prompt transmission of the deployed log data 1016 may enable the analysis server 118 to quickly generate data indicative of an issue associated with the AUT 104. As a result, the developer 102 or another user may be able to quickly attempt to mitigate issues, thus improving the user experience, optimizing use of the network(s) 112, and so forth.

During testing, the developer 102 or another user may contemporaneously acquire session data 130 and deployed log data 1016. For example, the developer 102 may use the TD 106 to execute the AUT 104 and test different geolocations 1002 while a number of users are using the deployed devices 1014. The analysis server 118 may obtain information, such as the log data 128, from the management server 1004. In another implementation, the analysis server 118 and the management server 1004 may access log data 128 that is stored by another system, such as a dedicated storage server.

Figure 11:
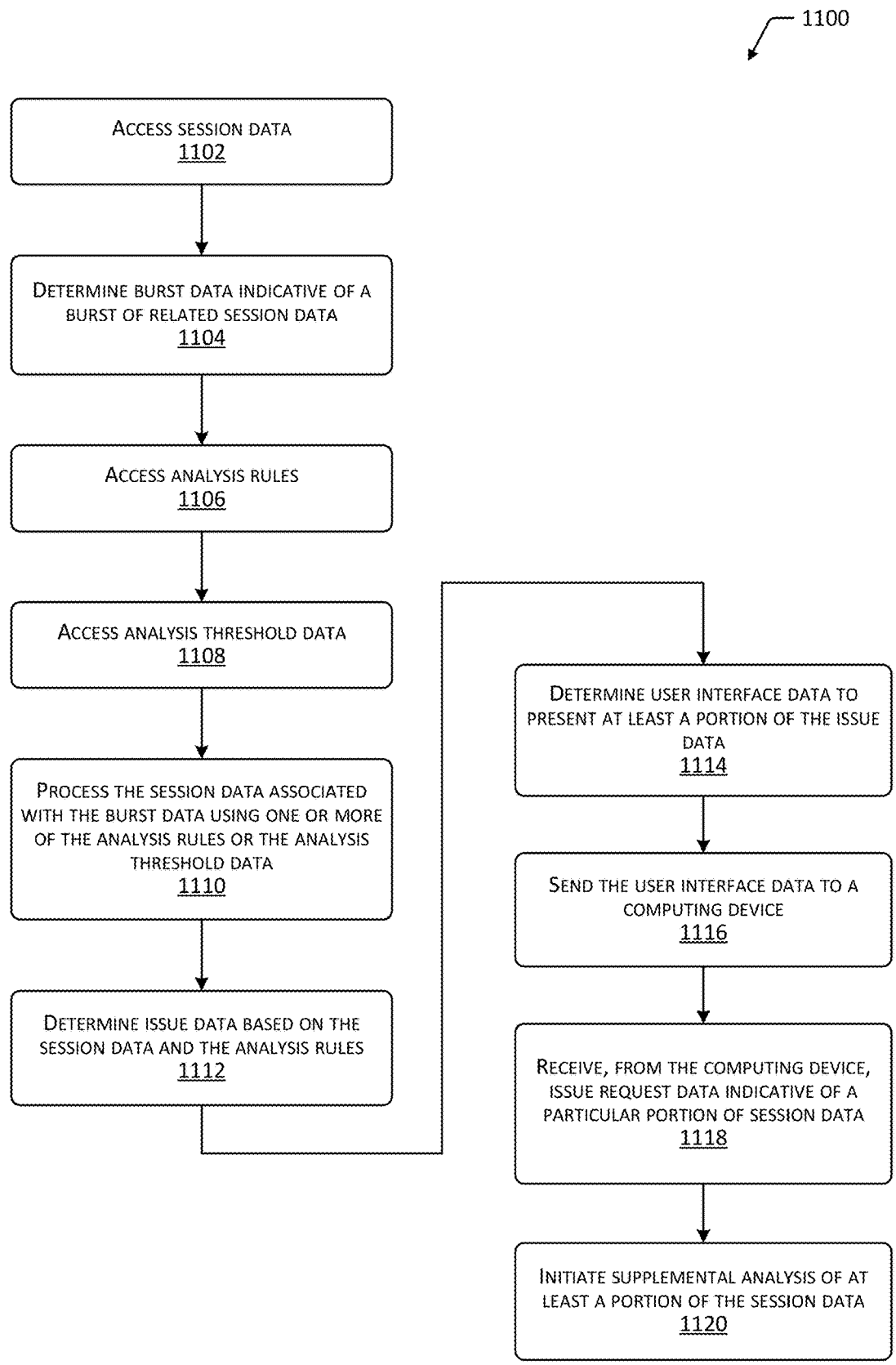
FIG. 11 is a flow diagram illustrating a process for determining output data and providing a user interface, according to one implementation.

FIG. 11 is a flow diagram 1100 of a process for determining output data 134 and providing a user interface 110 presenting the output data 134, according to one implementation. The process may be implemented at least in part by one or more of the analysis server 118, the test device 106, the workstation 108, the management server 1004, or other computing devices.

At 1102, session data 130 (or other log data 128) representing information about one or more activities 204 associated with an application under test (AUT) 104 is accessed. For example, an analysis module 132 may access log data 128 stored in memory 416.

In some implementations, the session data 130 may include one or more of video capture data 150 (e.g., images or video generated by the AUT 104 during testing), hardware metrics obtained from a computing device (such as the TD 106) executing the AUT 104, operating system metrics obtained from a computing device executing the AUT 104, data exchanged between the AUT 104 and one or more destination devices 116, and so forth.

At 1104, burst data 136 indicative of a burst 214 that includes one or more of activities 204 in the session data 130 that are causally associated to one another is determined. For example, the techniques described with regard to FIG. 2 may be applied to a group of activities 204, to associate particular activities 204 with bursts 214 of related activities 204.

In one implementation, the determination of the burst data 136 may include determining a first activity 204 occurring in the session data 130 with a frequency that is less than a first threshold value, which may indicate that the first activity 204 is a non-random activity. A second activity 204 may be determined that also occurs in the session data 130 with a frequency that is less than a second threshold value. In some implementations the first threshold value and the second threshold value may be the same. In other implementations, the first threshold value and the second threshold value may differ.

Burst data 136 may then be determined by determining one or more of: a first timestamp of the first activity 204 is within a threshold time window 216 of a second timestamp of the second activity 204, or a first overall time 208 of the first activity 204 overlaps with a second overall time 208 of the second activity 204. If either or both of these determinations are true, burst data 136 may be generated that includes an indication of the first activity 204 and the second activity 204.

In some implementations, the time window 216 may be determined based on a round-trip time to transmit data between the TD 106 and a proxy device, such as the proxy access device 1010. The session data 130 may be obtained at least in part by the proxy access device 1010, or another device such as the proxy host device 1008. The threshold time window 216 may be based at least in part on the round-trip time, such as by determining the threshold time window 216 to include a time interval that is greater than or equal to the round-trip time.

At 1106, analysis rule data 304 indicative of one or more rules associated with at least a portion of the one or more activities 204 is accessed. For example, the analysis rule data 304 may associate particular rules with a particular type of activity 204, such as data transfer to a remote destination device 116. In such a case, the rules associated with data transfer may be retrieved from memory 416.

At 1108 analysis threshold data 306 indicative of one or more threshold values associated with the one or more analysis rules is accessed. Continuing the example above, the thresholds associated with the rules determined at 1106 may be retrieved from memory 416.

At 1110 the session data 130 associated with the burst data 136 is processed using one or more of the analysis rules or the analysis threshold data 306 to generate issue data 138. As described previously, the issue data 138 may include information indicative of one or more aspects of operation of the AUT 104 that are to be assessed for possible improvement.

For example, performance of an activity 204 that exceeds a threshold amount of time, a threshold amount of bandwidth, a threshold number of concurrent connections, and so forth may be identified. In response to the issue data 138, a developer 102, other user, or automated system may take action to mitigate the indicated issue, which may then improve performance of the AUT 104, improve performance of the network 112, improve performance of the TD 106, and so forth.

At 1112, issue data 138 is determined. For example, the issue data 138 may be generated as described above with regard to FIG. 3. In one implementation, the issue data 138 may include impact data 314 that is indicative of a variance between one or more metrics of the activity 204 and the analysis threshold data 306. For example, the issue data 138 may include session data 130 indicating an amount of time to transfer data from the AUT 104 to another device that is greater than a threshold value for the data transfer time.

At 1114, user interface data 142 that presents at least a portion of one or more of the burst data 136 or the issue data 138 is determined. The burst data 136 may be represented by one or more burst indicators 148, as well as other data. In some cases, the issue data 138 may include data identified based on portions of the session data 130 that were indicated by user input, responsive to which analysis rules were modified or generated.

At 1116, the user interface data 142 is sent to a computing device. For example, the user interface data 142 may be sent using the network 112 to the workstation 108. The user interface data 142 may include information that can be used by the workstation 108 to cause presentation of the user interface 110, such as within an Internet browser application, and to present data within the user interface 110.

At 1118, issue request data 144 is received from the computing device. For example, the workstation 108 may send the issue request data 144 to the developer interface module 140. The issue request data 144 may be indicative of a particular portion of the log data 128, such as a particular section of session data 130 that is associated with a particular burst 214.

At 1120, based at least in part on the issue request data 144, supplemental analysis of at least a portion of the session data 130 or other log data 128 is initiated. For example, the developer interface module 140 may generate second user interface data 142 presenting at least the particular portion of the session data 130. The second user interface data 142 may be provided to one or more computing devices associated with human users responsible for generating analysis rules. In other implementations, the issue request data 144 may be provide to an automated system, such as a machine learning system. The human users or the automated system may analyze the log data 128 and return to the system supplemental analysis rule data. For example, the supplemental analysis rule data may include new rules, modifications to existing rules, and so forth. The developer interface module 140 may receive the supplemental analysis rule data and the analysis rule data 304 may be modified based on the supplemental analysis rule data. Subsequently, the log data 128, or the portion thereof associated with the issue request data 144, may then be reprocessed using the modified analysis rule data to possibly generate issue data 138.

Figure 12:
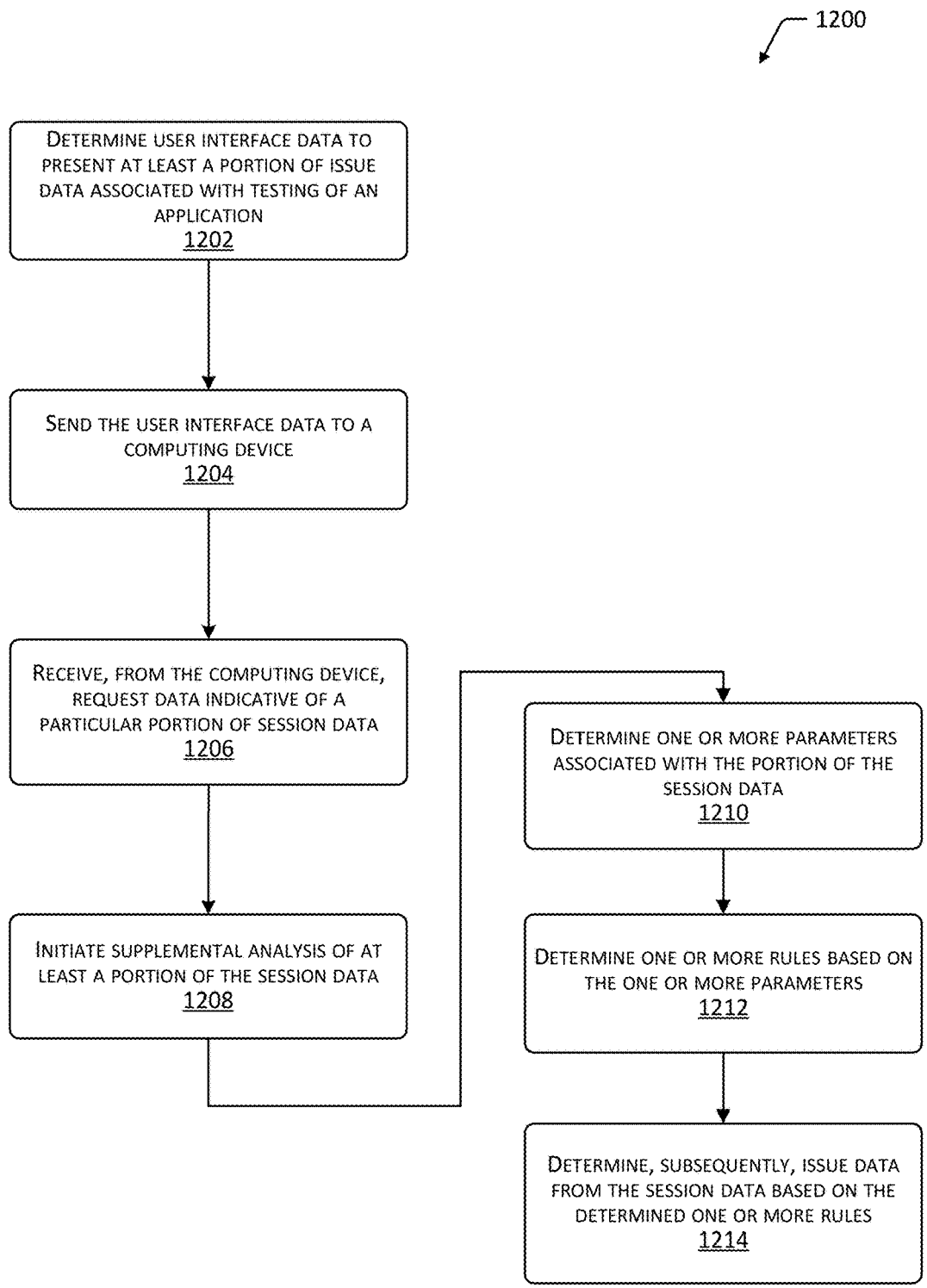
FIG. 12 is a flow diagram illustrating a process for determining output data based on user-specified issue request data, according to one implementation.

FIG. 12 is a flow diagram 1200 illustrating a process for determining output data 134 based on user-specified issue request data, according to one implementation. The process may be implemented at least in part by one or more of the analysis server 118, the test device 106, the workstation 108, the management server 1004, or other computing devices.

At 1202, at least a portion of user interface data 142 associated with a user interface 110 is used to present at least a portion of the issue data 138 associated with testing of an AUT 104. The issue data 138 may be determined by analysis of session data 130 from the exchange of data between the AUT 104 and one or more other computing devices.

At 1204, the system may send the user interface data 142 to a computing device. The computing device may be a workstation 108 or other type of computing device associated with a developer 102 or another user. The user interface data 142 may include data for presentation as well as one or more controls that may receive user input from the user. For example, the user interface data 142 may be used to generate a user interface 110 that presents one or more of log data 128, session data 130, burst data 136, or issue data 138.

At 1206, the system may receive, from the computing device, request data indicative of a particular portion of the session data 130 or other data presented in the user interface 110. The request data may be determined based on a user's interactions with the one or more controls within the user interface 110. The request data may include a time range or other indication of a particular portion of session data 130 for analysis. For example, a developer 102 or other user may interact with one or more controls to select a portion of the session data 130 presented in the user interface 110 and to indicate a relative importance of the selected portion. For example, the particular portion of session data 130 may be determined based on a start time 210 and end time 212 within a time series.

At 1208, the system may initiate a supplemental analysis of at least a portion of the session data 130. For example, a developer interface module 140 may generate additional user interface data 142 for presenting the analyzed portion of the session data 130. The additional user interface data 142 may be provided to one or more computing devices associated with human operators responsible for generating analysis rules. In other implementations, the indicated session data 130 or the additional user interface data 142 may be provided to an automated system for analysis.

At 1210, one or more parameters associated with the portion of the session data 130 may be determined. For example, a human user or automated system may analyze the session data 130 or associated log data 128 and determine one or more parameters that may be indicative of an issue.

At 1212, one or more rules may be determined based on the one or more parameters. For example, a human operator or automated system may generate supplemental analysis rule data based on the determined parameters. For example, the supplemental analysis rule data may include new rules, modifications to existing rules, and so forth. The developer interface module 140 may receive the supplemental analysis rule data, and the analysis rule data 304 may be modified based on the supplemental analysis rule data. After receiving the supplemental analysis rule data, the log data 128 or session data 130 associated with the issue request data 144 may then be reprocessed using the analysis rule data 304 to potentially generate issue data 138.

At 1214, issue data 138 may be determined based on the session data 130 and the analysis rule data 304. In addition to applying the rules to the indicated portion of the session data 130 or associated log data 128, the system may apply the rules to subsequent session data 130 to determine issue data 138.

Figure 13:
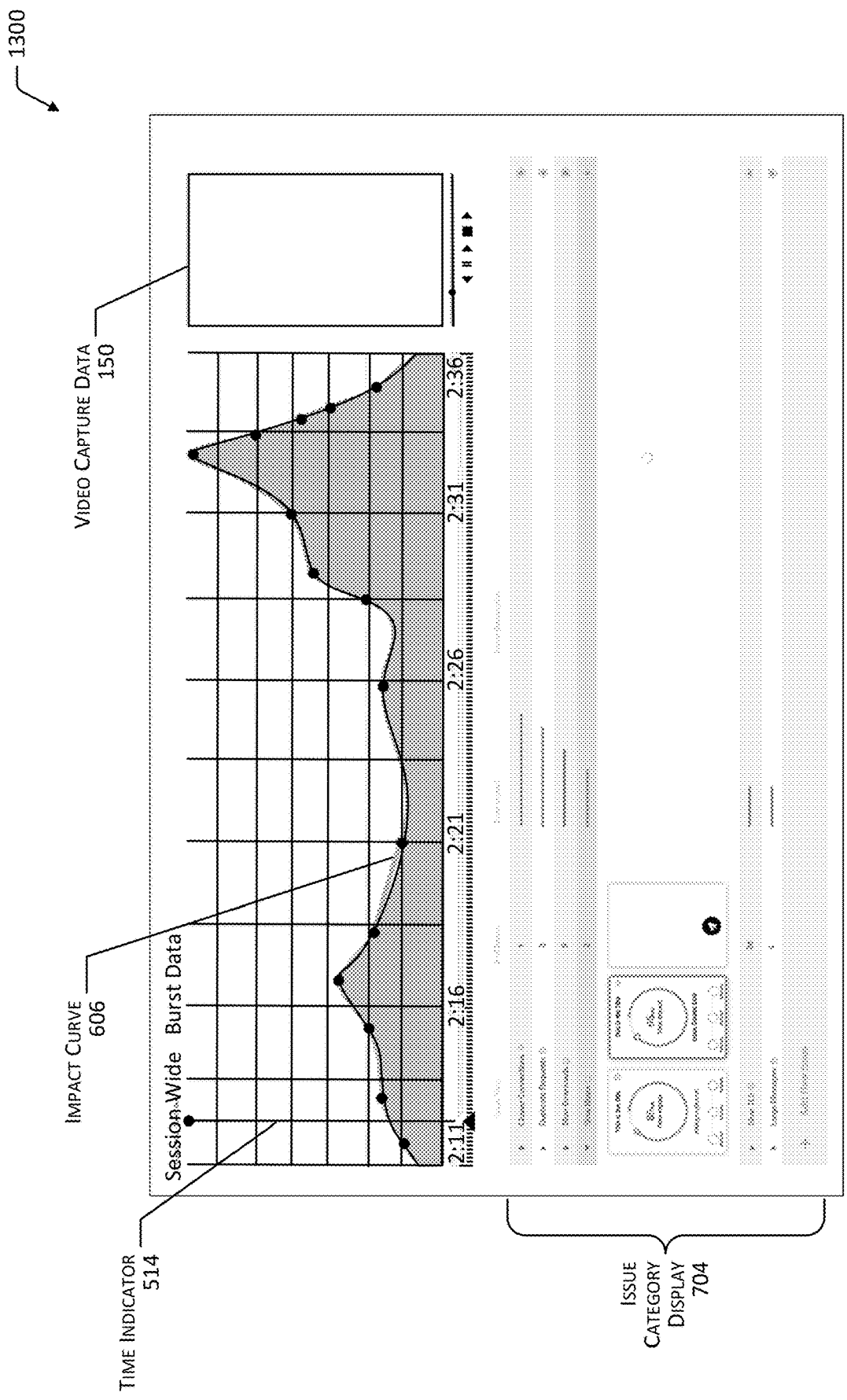
FIG. 13 illustrates a user interface depicting an impact curve for an issue, according to one implementation.

FIG. 13 illustrates an example 1300 of a user interface 110 depicting an impact curve 606, according to one implementation. Specifically, FIG. 13 illustrates a user input event that has occurred with respect to a "Slow hosts" issue category. For example, user input may select or otherwise indicate a particular category of issue. Responsive to the user input event, the issue category display 704 may present additional information about that category of issue, such as one or more charts that present metric values or other information. In other implementations, a waterfall display or other types and arrangements of information may be presented.

In the illustrated example, the user interface 110 presents a list of issue categories, such as "Closed Connections", "Duplicate Requests", "Slow Downloads", and "Slow Hosts". Each issue category is shown in association with a count of the number of issues that occurred for each category. Each issue category also includes a selectable control to expand the category to view associated data. For example, in FIG. 13, the "Slow Hosts" category is expanded to show two download events indicative of a slow access time.

The developer 102 or another user may interact with the impact curve 606, such as by clicking or otherwise selecting a portion of the impact curve 606. In response, the user interface 110 may present one or more issue categories and associated data corresponding to the selected portion. Subsequent interaction with the issue categories may be used to access additional information for each category, as shown in FIG. 13.

Figure 14:
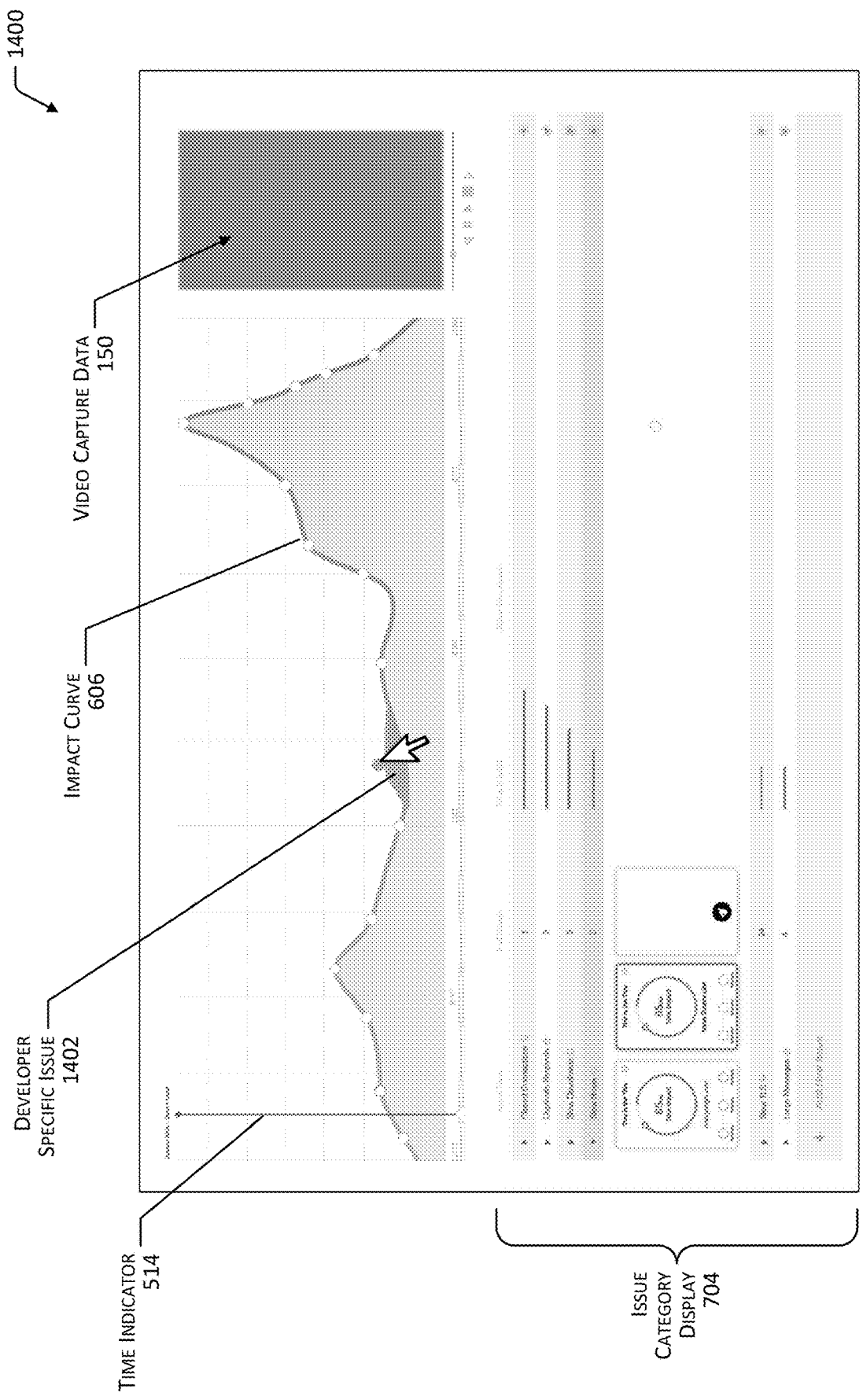
FIG. 14 illustrates a user interface for receiving user input indicating an issue, according to one implementation.

FIG. 14 illustrates an example 1400 of a user interface 110 in which a user may specify an issue, according to one implementation. Specifically, FIG. 14 illustrates the user interface 110 presenting an issue category display 704 that includes charts to provide information about one or more metrics associated with particular categories of issues.

In some implementations, the developer 102 or another user may position a cursor along the impact curve 606 at a particular point on the timeline. Responsive to a user input event such as keyboard entry, touch, mouse click, and so forth, issue request data 144 may be generated. At the point corresponding to the cursor, the impact curve 606 may show a graphical indicia, such as an indication representing a developer specific issue 1402. For example, the graphical indication of the developer specific issue 1402 may include a bulge or animated feature in which the impact curve 606 expands to include the point specified by the cursor. In some implementations, the height of this graphical indication may be predetermined. In other implementations, the height of the graphical indication may be specified by the user, allowing the user to provide an indication representing an importance of the issue. For example, the developer 102 may increase the height of the indication of the developer specific issue 1402 to indicate the relative severity of the issue. In some implementations, input to the impact curve 606, such as a right-click input, may enable access to one or more controls that may be used to indicate the relative importance of the issue.

Figure 15:
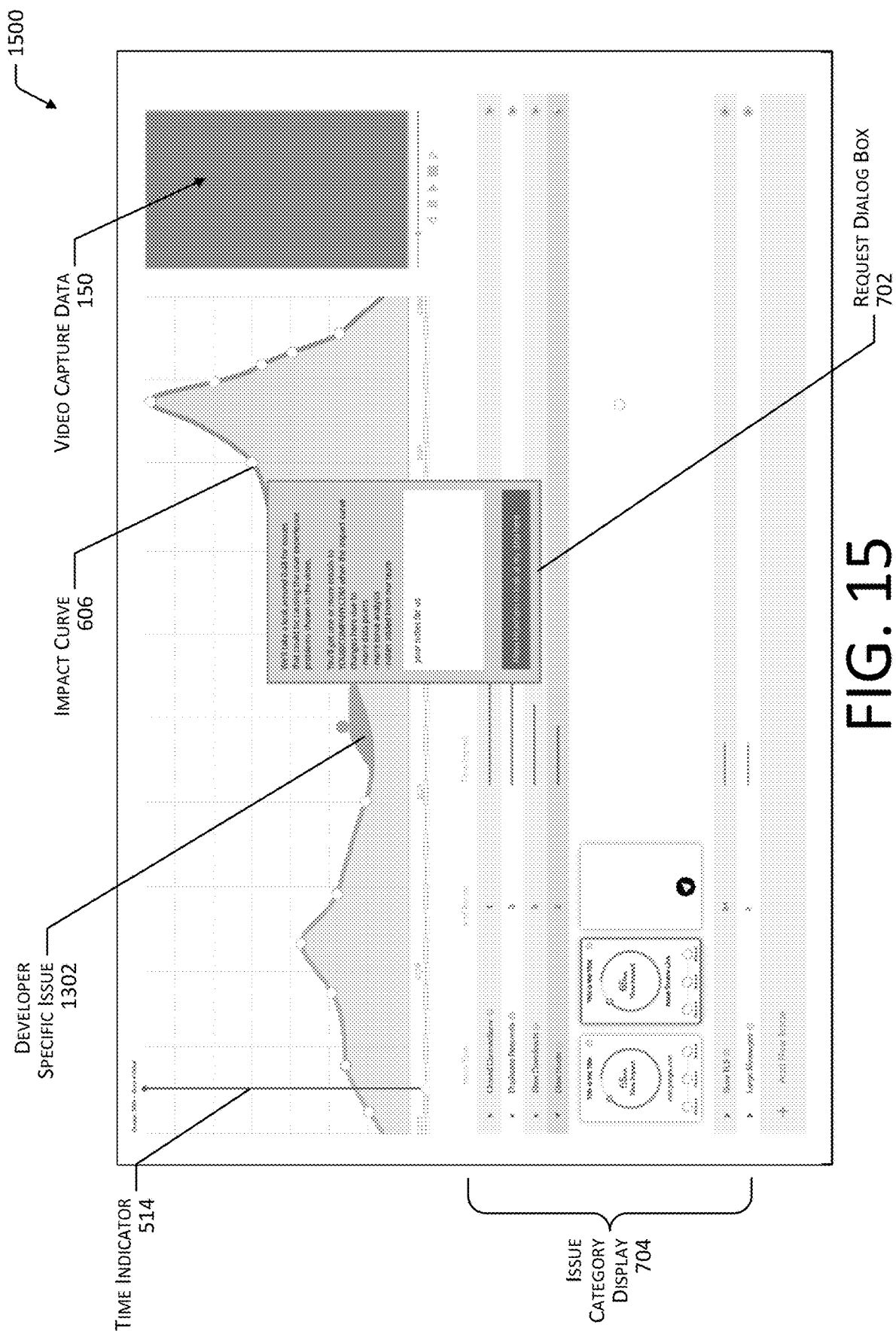
FIG. 15 illustrates a user interface in which a request dialog box is presented to acquire input from a user after indicating an issue on the impact curve, according to one implementation.

FIG. 15 illustrates an example 1500 of a user interface 110 in which a request dialog box 702 is presented to acquire additional input from a user after receiving user input indicating a portion of the impact curve 606, according to one implementation. For example, responsive to the input by the developer 102 to generate the developer specific issue 1402, as described with regard to FIG. 14, the request dialog box 702 may be presented.

Specifically, user input, such as input provided using a mouse, stylus, or touchscreen to select a point or area on the impact curve 606, may cause the user interface 110 to present the request dialog box 702. Subsequent input interacting with the request dialog box 702 may be used to initiate a request for analysis of a related portion of the session data 130 (e.g., the portion of the session data 130 that corresponds to the selected portion of the impact curve 606). In some implementations, the request may result in the creation or modification of one or more analysis rules, which may be used to analyze subsequent session data 130.

Figure 16:
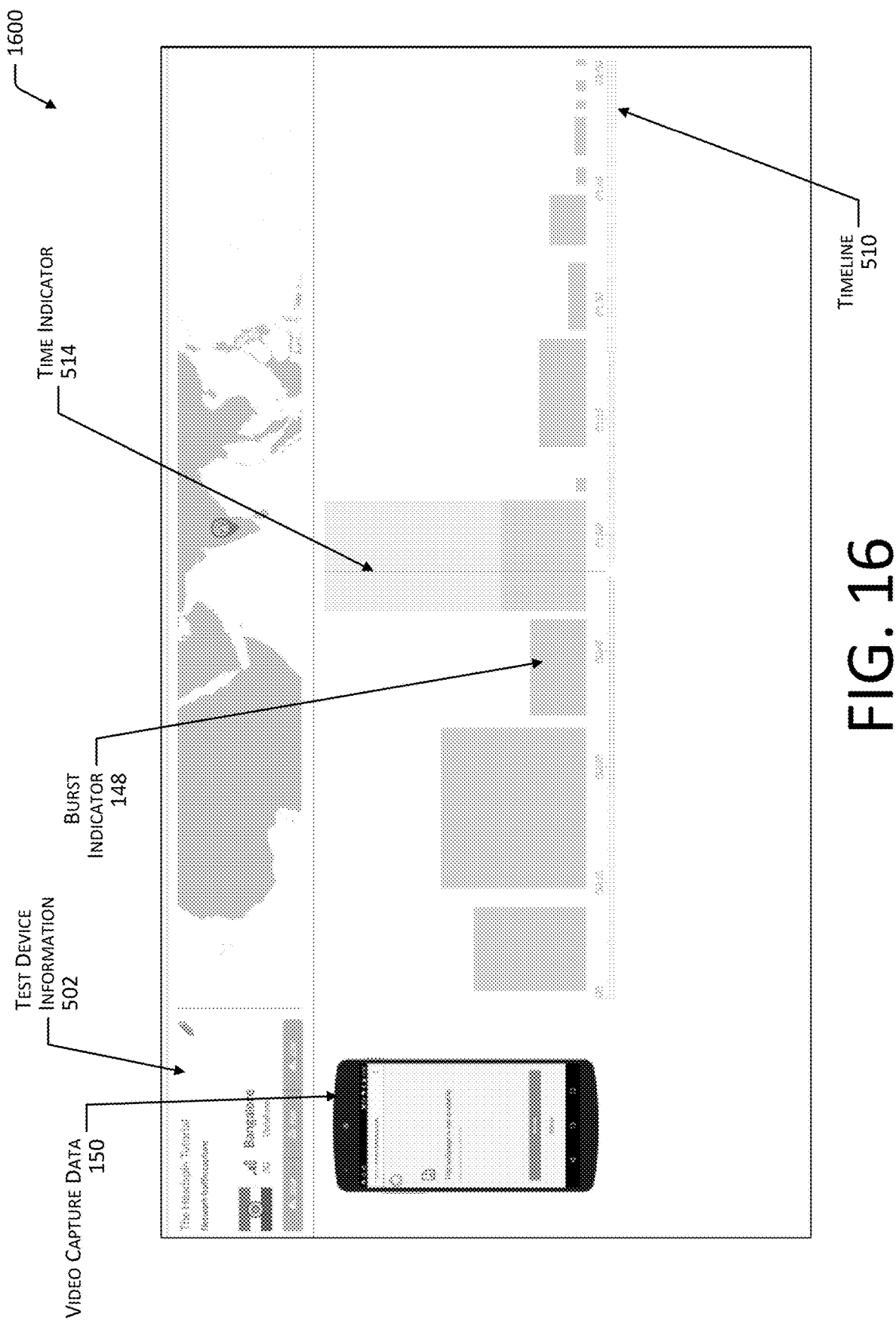
FIG. 16 illustrates a user interface depicting information based at least in part on burst data, according to one implementation.

FIG. 16 illustrates an example 1600 of a user interface 110 presenting information based at least in part on burst data 136, according to one implementation. As described with regard to FIG. 5, burst data 136 may be represented by burst indicators 148, each burst indicator 148 representing a group of related activities 204. In FIG. 16, the user interface 110 is shown presenting video capture data 150 alongside the burst indicators 148, test device information 502 above the video capture data 150, a timeline 510 below the burst indicators 148, and a time indicator 512 that may intersect the timeline 510 and one or more of the burst indicators 148. For example, the position at which the time indicator 512 intersects the timeline 510 may indicate a time that corresponds to the presented video capture data 150, while intersection between the time indicator 512 and a burst indicator 148 may indicate that at the indicated time, one or more activities 204 within the represented group of activities are being performed.

Figure 17:
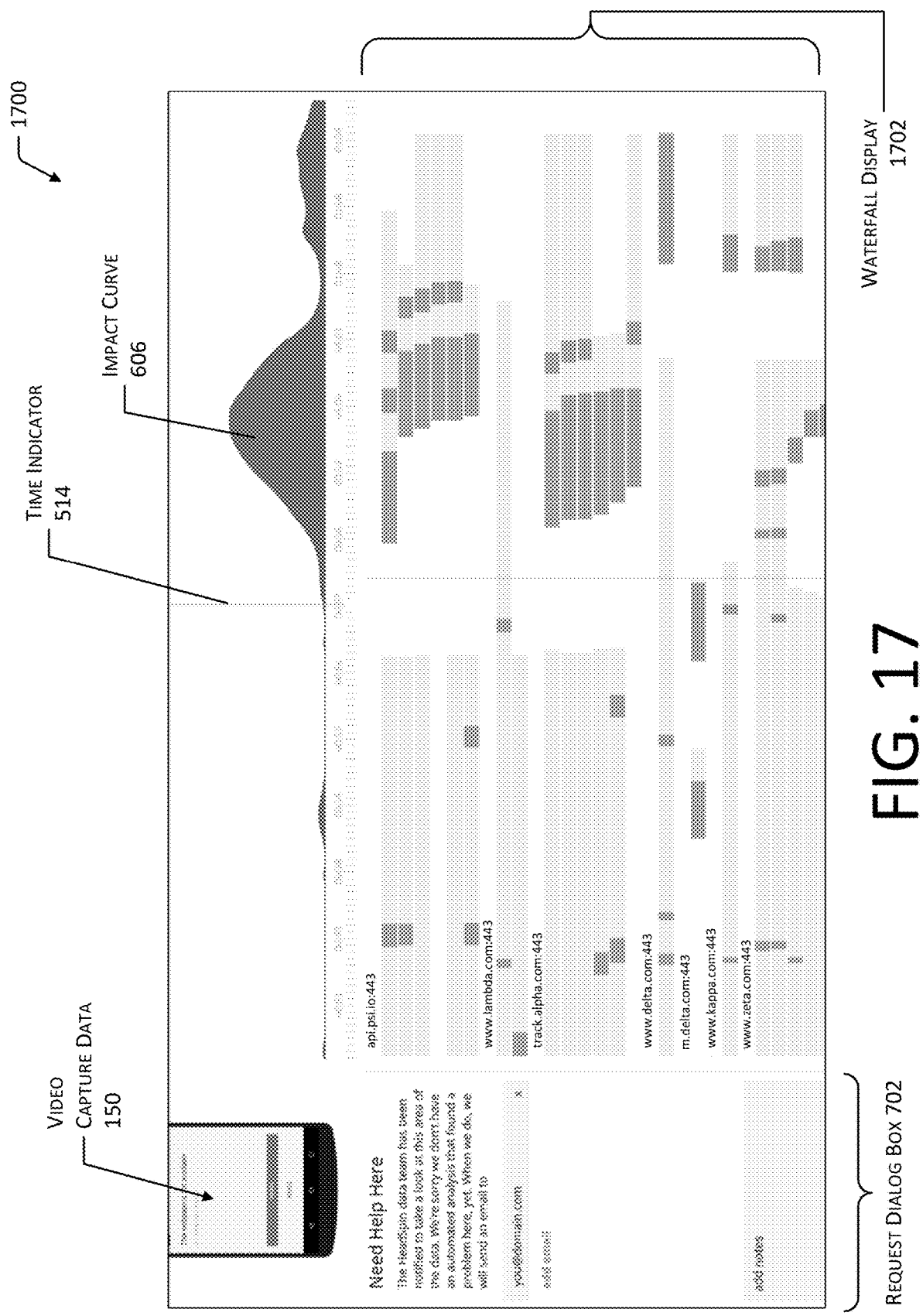
FIG. 17 illustrates a user interface depicting an impact curve and a waterfall display, according to one implementation.

FIG. 17 illustrates an example 1700 of a user interface 110 that presents the impact curve 606 and a waterfall display 1702, according to one implementation. The implementation shown in FIG. 17 includes a request dialog box 702. For example, subsequent to activation of the issue request control 612, the request dialog box 702 may be presented to obtain additional information for inclusion in the issue request data 144. Continuing the example, a developer 102 or other user may add contact information or notes to accompany a request for additional analysis.

The user interface 110 of FIG. 17 also presents a waterfall display 1702. The waterfall display 1702 may provide information such as the activities associated with a particular host, duration of those activities, and so forth.

Responsive to a touch or other type of user input indicating a portion of the impact curve 606, the waterfall display 1702 may change the color of or otherwise emphasize the presence of a particular issue or category of issue to more easily enable a user to visualize particular information within the waterfall display 1702.

In some implementations, a user input event, such as a touch input to a particular portion of the impact curve 606, may cause additional information to be presented. For example, a touch input may select a particular issue or category of issue, and information such as that presented in an issue category display 704 shown in FIGS. 13-15 may be presented.

Figure 18:
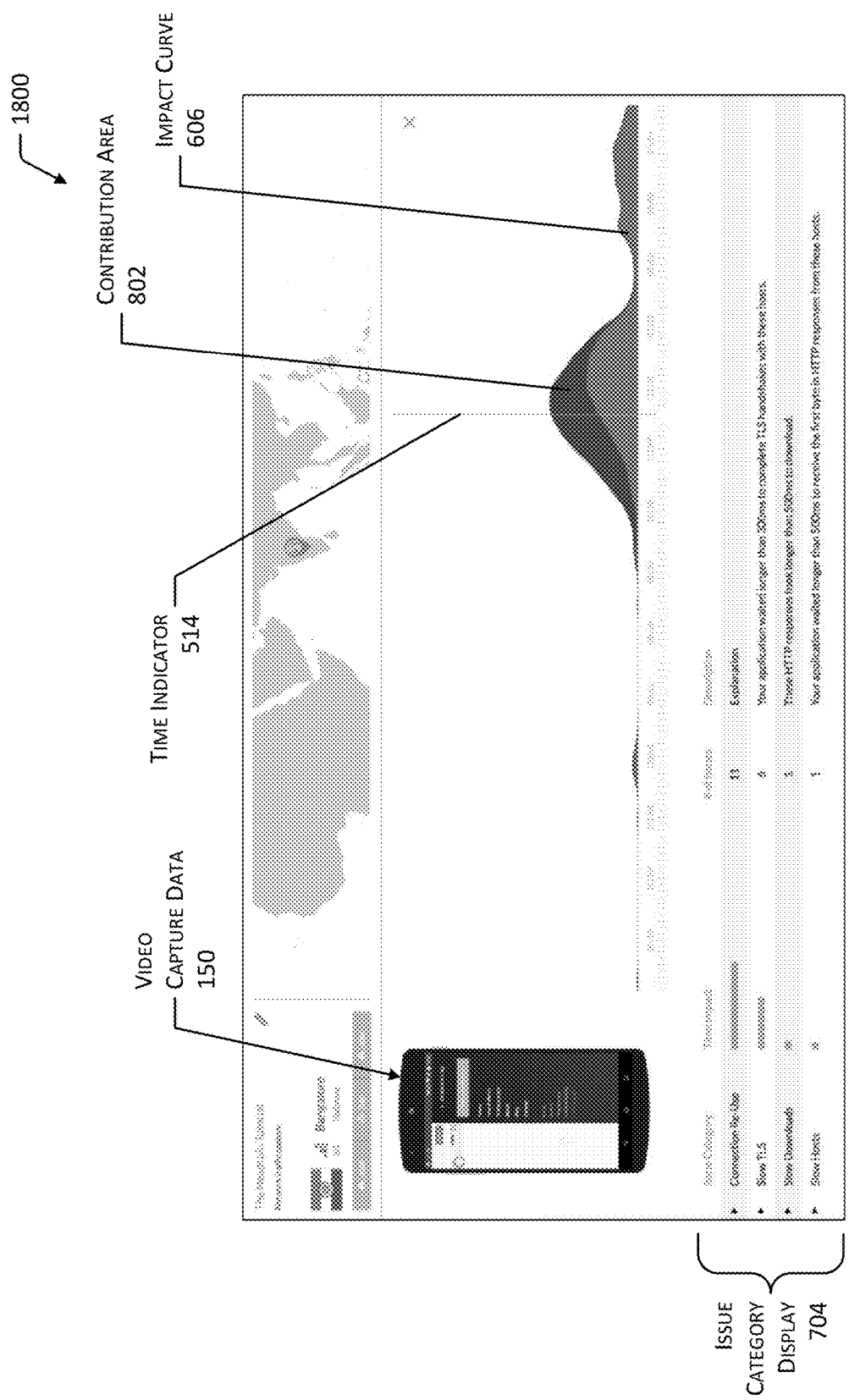
FIG. 18 illustrates a user interface depicting an impact curve and showing a contribution area associated with a particular issue, according to one implementation.

FIG. 18 illustrates an example 1800 of a user interface 110 that presents an impact curve 606 and shows a contribution area 802 associated with a particular issue, according to one implementation. The contribution area 802 may indicate the contribution of a particular issue or category of issue to the overall impact curve 606. For example, the contribution area 802 may represent a quantity of time for performance of an activity that was caused by a particular issue, a quantity of computational resources used, and so forth. The contribution area 802 may therefore represent an amount of time or computational resources that may be conserved if an issue is mitigated. In the user interface 110 of FIG. 18, the contribution area 802 occupies approximately one half of the area associated with a peak of the depicted impact curve 606. In such a case, if this particular issue is mitigated, this may result in a significant decrease in the amplitude of the impact curve 606, which may result in an improved user experience due to improved functionality of the application under test 104. By presenting the contribution area 802, the user interface 110 may enable a developer 102 or other user to quickly visualize particular issues that significantly impact operation of the AUT 104 and which issues may be mitigated to provide maximum improvement in the operation of the AUT 104.

The contribution area 802 may provide information associated with a particular occurrence of an issue or category of issue and the impact of that particular issue or category of issue. The contribution area 802 may be represented as an area that extends below the impact curve 606. For example, FIG. 18 depicts the contribution area 802 as a shaded area beneath the impact curve 606 that may represent the amount of time that one or more instances of the particular category of issue exceeded a threshold value.

Figure 19:
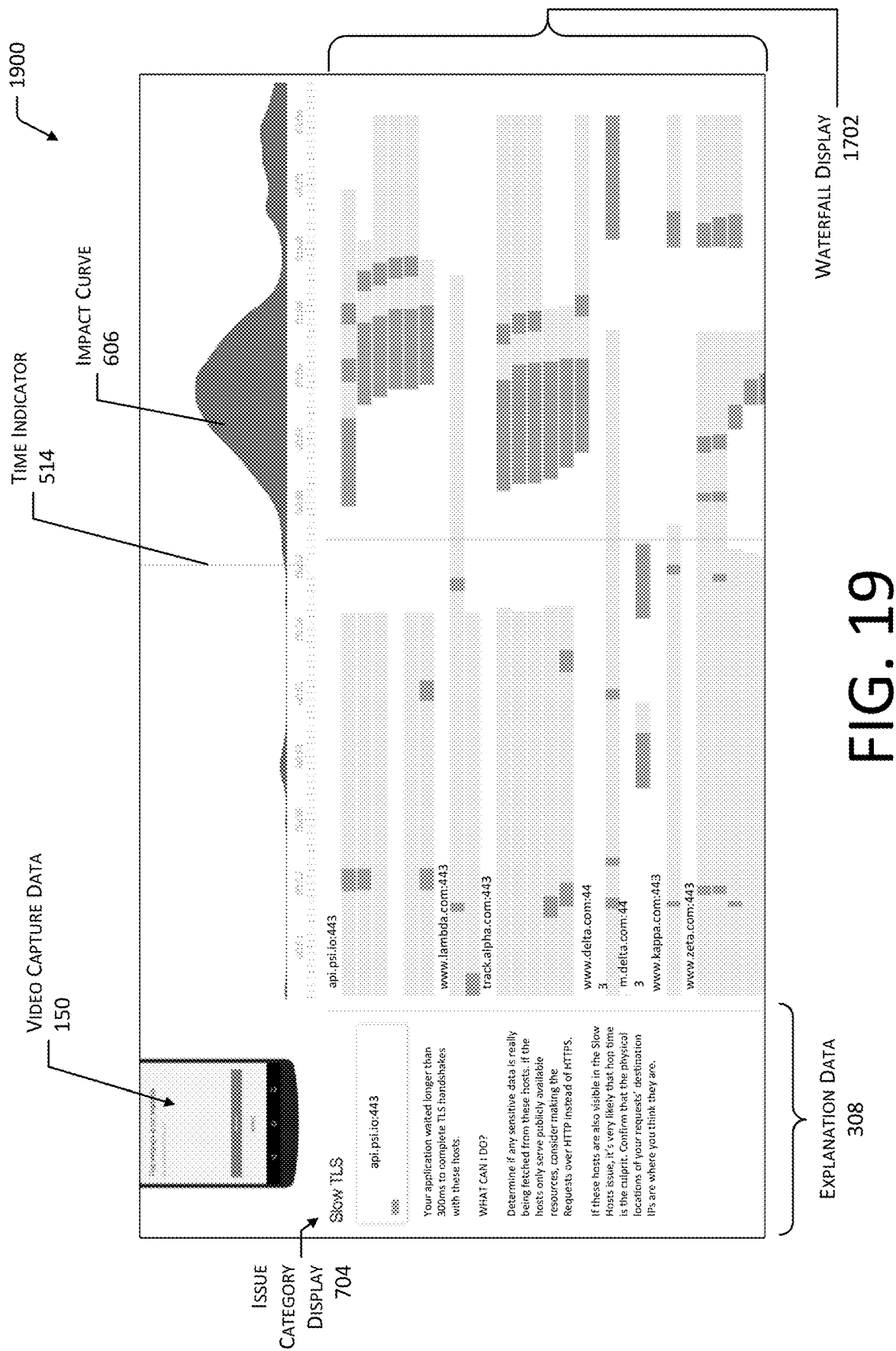
FIG. 19 illustrates a user interface depicting an impact curve and a waterfall display, according to one implementation.

FIG. 19 illustrates an example 1900 of a user interface 1100 that presents an impact curve 606 and a waterfall display 1702, according to one implementation. The waterfall display 1702 shown in FIG. 19 presents issue data 138 indicative of a data transfer issue that may be displayed for review by a developer 102 or other user. The issue data 138 may be indicative of a characteristic of the session data 130 for testing of an AUT 104 that exhibits one or more metrics that exceed a predetermined threshold value or that differ from a predetermined threshold range. For example, an issue may be present when the time to complete a data transfer of a particular file exceeds a predetermined length of time.

The amplitude of the impact curve 606 may represent an aggregation of values associated with issue data 138 for a particular length of time. The width of the impact curve 606 may represent a duration of the issue along a timeline.

Responsive to selection of the impact curve 606, the waterfall display 1702 may change the color of or otherwise emphasize the presence of features that represent the particular issue or category of issue to more easily enable a developer 102 or other user to visualize information in the waterfall display 1702 that is associated with the selected portion of the impact curve 606. In some implementations, a user input event such as a touch input to a particular portion of the impact curve 606 may cause the presentation of additional information. For example, additional information associated with a category of issue may be presented in response to selection of a region of the impact curve 606 associated with that category.

The user interface 110 may further include explanation data 308 associated with a particular issue or category of issue. In the user interface 110 of FIG. 19, the explanation data 308 includes an issue category display 704 indicating that "Slow TLS" (Transport Layer Security) may be an issue. The explanation data 308 may include a recommendation to mitigate the issue, such as:

"Determine if any sensitive data is really being fetched from these hosts. If the hosts only serve publicly available resources, consider making the requests over HTTP instead of HTTPS.

If these hosts are also visible in the Slow Hosts issue, it's very likely that hop time is the culprit. Confirm that the physical locations of your requests' destination IPs are where you think they are."

The explanation data 308 may vary based on the issue data 138. In some implementations, the explanation data 308 may include code or other data that may be used by the developer 102 to at least partially mitigate an issue or determine a strategy for improving performance.

Figure 20:
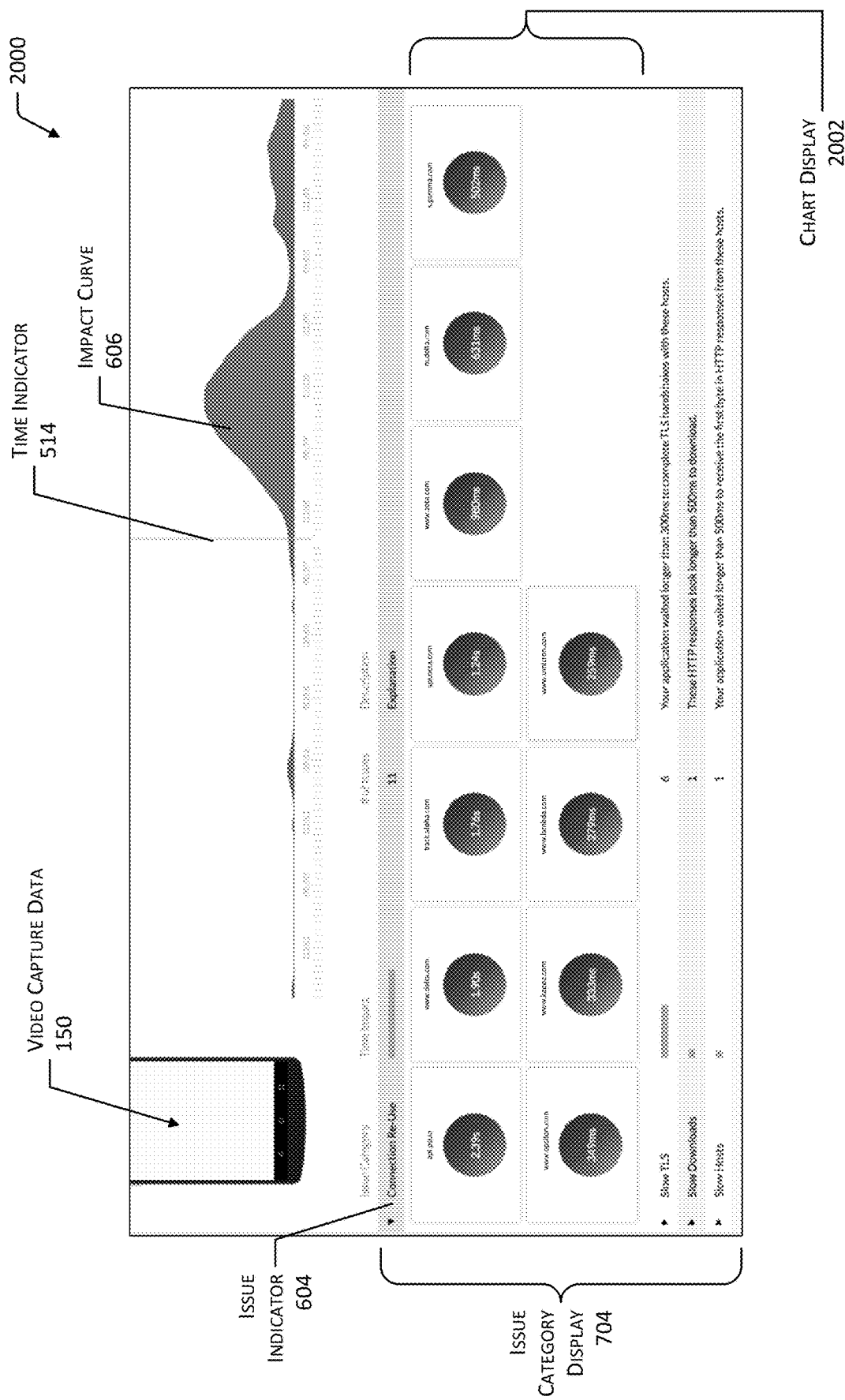
FIG. 20 illustrates a user interface depicting an impact curve and a chart display showing information about a particular category of issue, according to one implementation.

FIG. 20 illustrates an example 2000 of a user interface 110 that presents an impact curve 606 and a chart display 2002 showing information about a particular category of issue, according to one implementation. In some implementations, the user interface 110 may present video capture data 150. The user interface 110 of FIG. 20 also includes an issue category display 704 that presents one or more issue indicators 604. Each issue indicator 604 may represent a particular issue for which a value determined during testing of an AUT 104 exceeds a corresponding threshold value. In some implementations, in response to user input indicating a particular issue indicator 604, additional information, such as a chart display 2002 that presents information regarding the selected issue, may be presented. For example, FIG. 20 depicts an issue indicator 604 designated "Connection Re-Use". In response to user input to this issue indicator 604, information regarding the impact time to access connections to various hosts on the network may be presented. In other implementations, other information may be presented, such as total time, quantity of data transferred, and so forth.

A variety of different navigational pathways may be taken to access the various user interfaces 110 and elements described above. For example, the burst presentation 506 of FIG. 5 may be presented. Responsive to a user input event that selects a particular burst indicator 148 in FIG. 5, the user interface 110 may then present the issue presentation 602 display of FIG. 6 that includes the impact curve 606. Selection of a point on the impact curve 606 or a category of issue may then result in the presentation of one or more of the issue category display 704 of FIG. 7, 15, or 18-20, the issue presentation 902 and metric presentation 904 of FIG. 9, the waterfall display 1702 of FIGS. 17 and 19, and so forth. Use of one or more controls, such as an issue request control 612, to request additional analysis of log data 128 or session data 130 may result in presentation of a request dialog box 702, as shown in FIGS. 7, 15, and 17. Selection of various issues and issue categories may result in changes to the information presented. Manipulation of a time indicator 512 may change the particular video capture data 150 that is presented.

Figure 21:
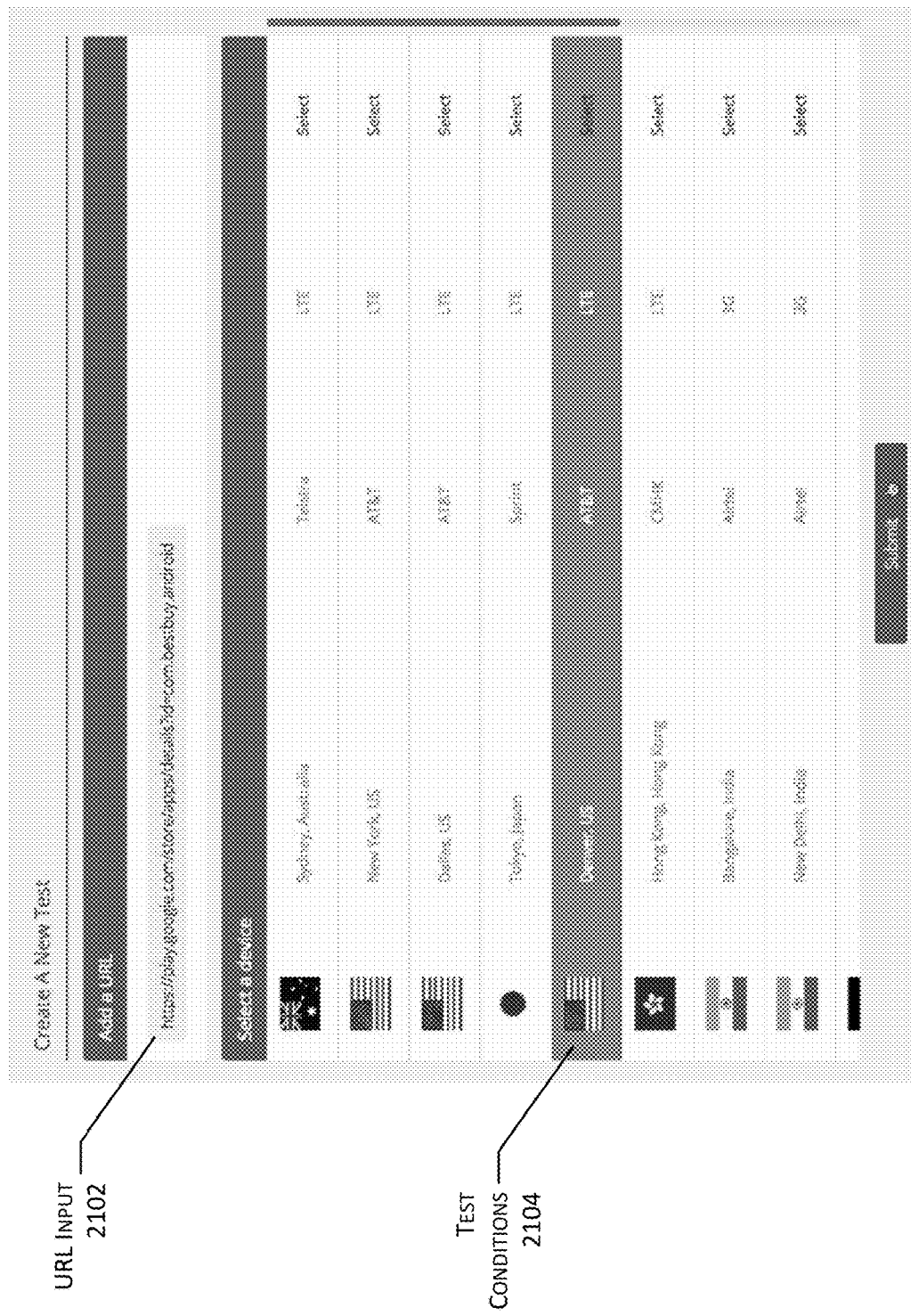
FIGS. 21-28 illustrate user interfaces that allow for installing and remote control of an application executing on a proxy access device while acquiring data about an application, according to one implementation.

FIGS. 21-28 illustrate user interfaces that allow for installing and remote controlling an application executing on a proxy access device 1010 while acquiring data about an application, according to one implementation. FIG. 21 depicts a user interface 2100 in which a uniform resource locator (URL) input 2102 may be received, such as from a developer 102, to cause installation of a particular AUT 104. For example, the URL input 2102 may include or refer to one or more files associated with installing the AUT 104 or a portion thereof. FIG. 21 also depicts test conditions 2104, which may be preexisting or selected via user input. For example, a developer 102 may select from one or more proxy access devices 1010 based on geolocation 1002, telecommunications carrier company, network connection type, and so forth. Continuing the example, FIG. 21 illustrates user input selecting a proxy access device 1010 associated with "Denver", "AT&T", and "LTE". In response to user input that includes the URL and selection of a set of test conditions 2104, the application associated with the URL input 2102 may be installed on the selected proxy access device 1010 that corresponds to the test conditions 2104.

Figure 22:
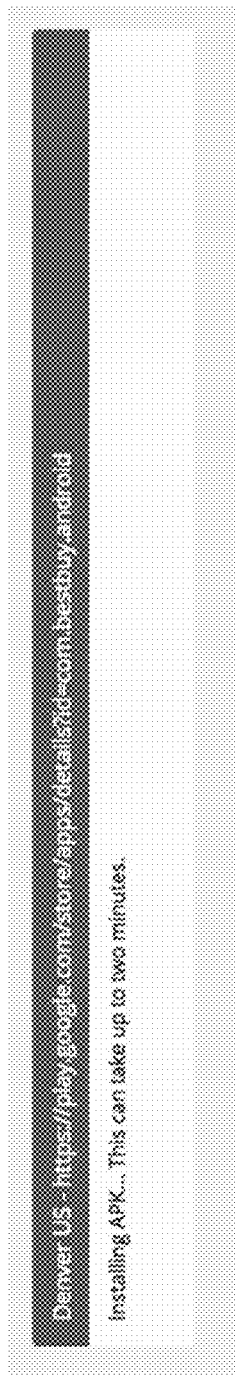

FIG. 22 depicts a user interface 2200 that may be presented while installation of the AUT 104 is taking place. In some implementations, the user interface 2200 may indicate a time associated with installation of an application, such as a statement that installation "can take up to two minutes." In other implementations, other data may also be provided.

Figure 23:
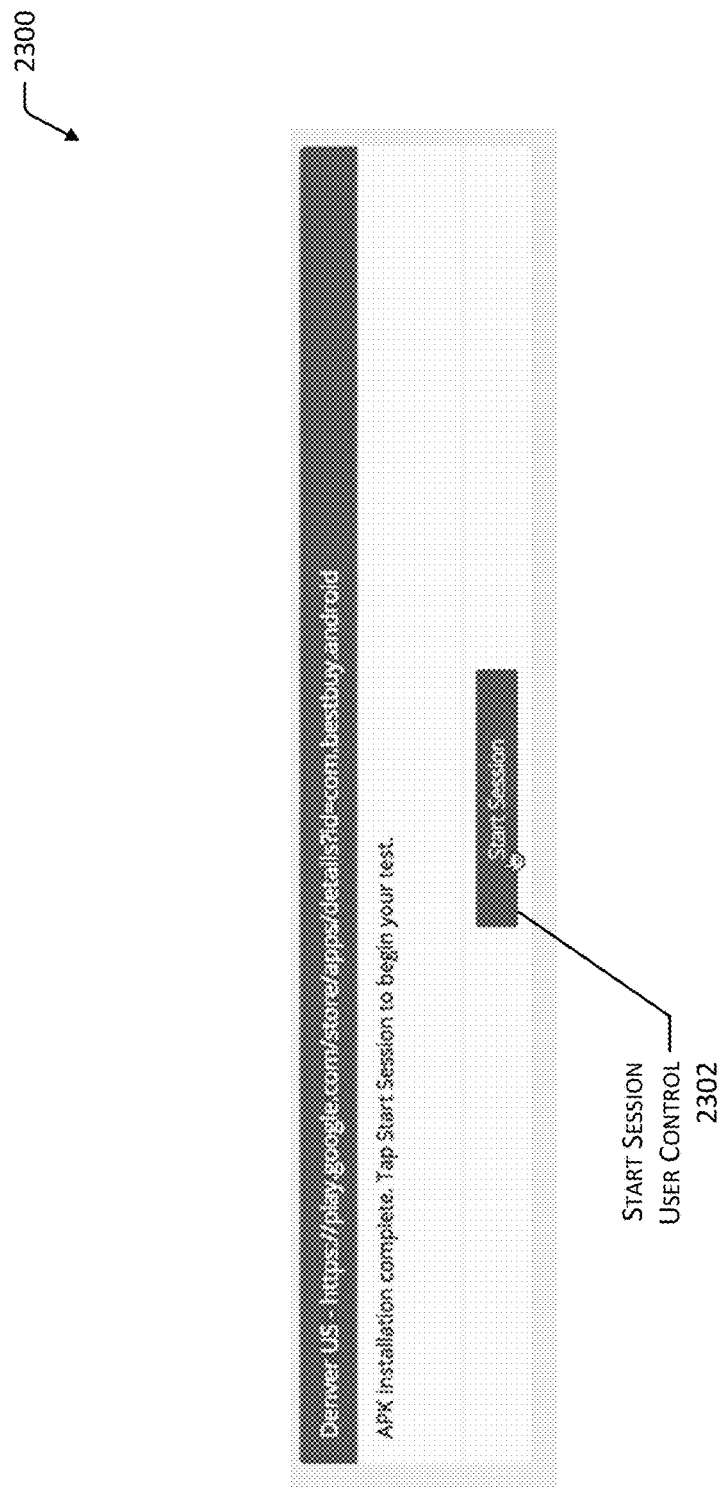

FIG. 23 depicts a user interface 2300 that may be presented when the installation of the AUT 104 is complete. The user interface 2300 may include a start session user control 2302. The start session user control 2302 may be activated to cause the system to begin capture of session data 130, and in some cases other data (e.g., ancillary data) while the AUT 104 is executed.

Figure 24:
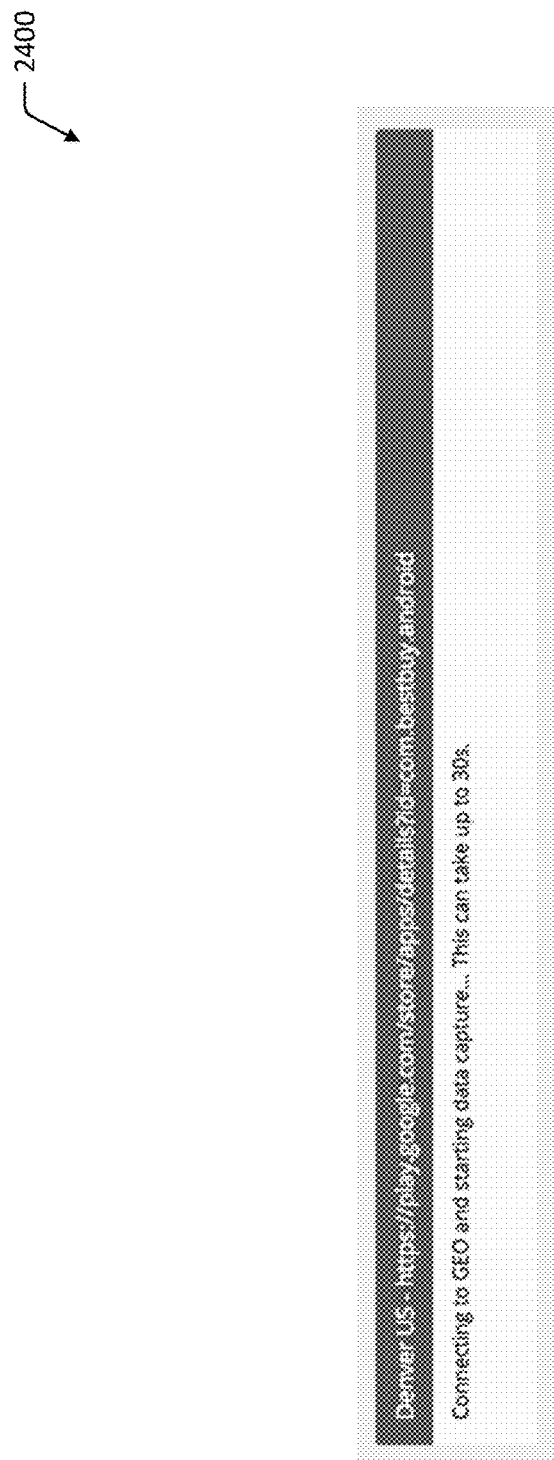

FIG. 24 depicts a user interface 2400 that may be presented after activation of the start session user control 2302, while a connection with the proxy access device 1010 is being established, and before a remote control user interface is presented.

Figure 25:
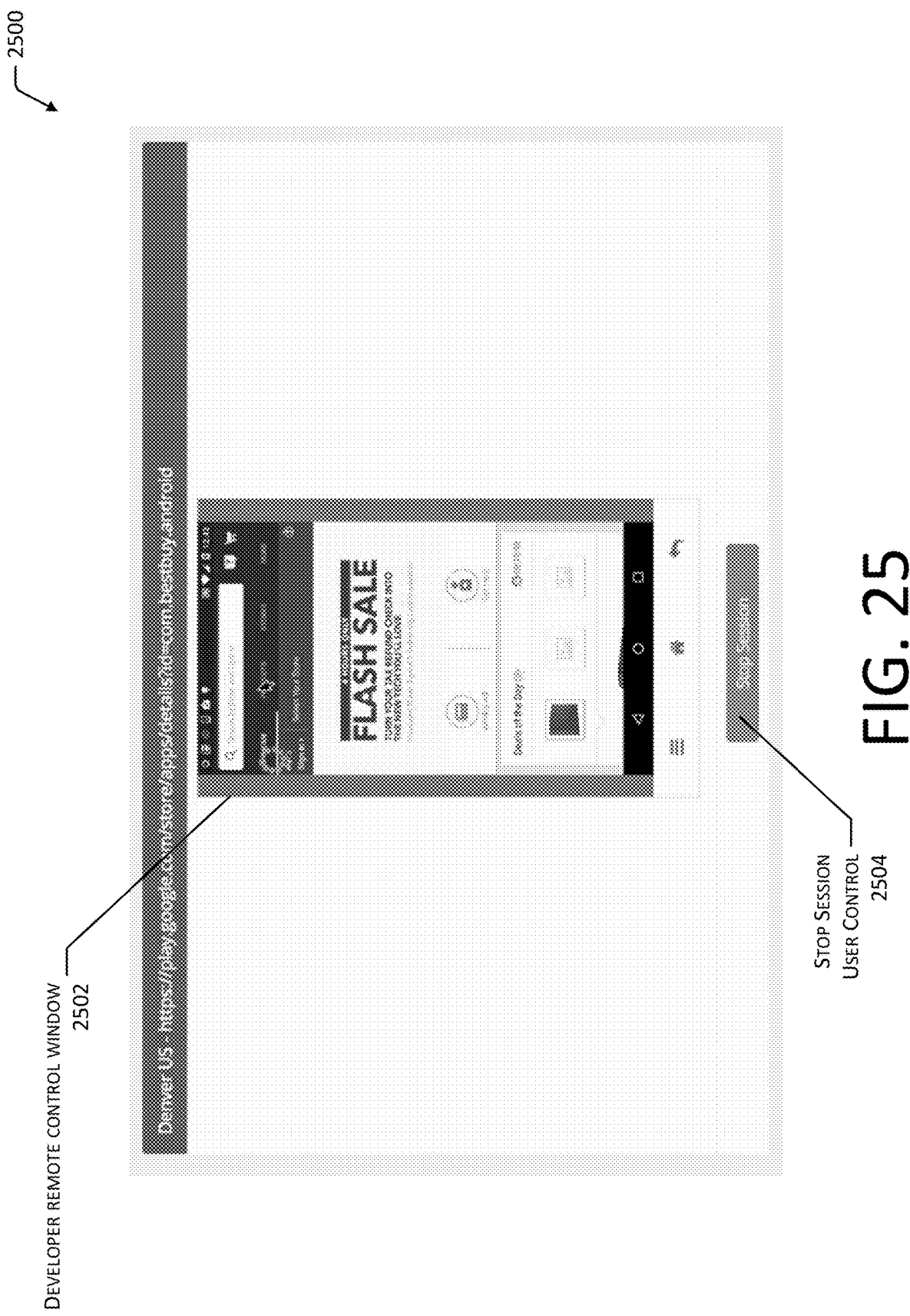

FIG. 25 depicts a user interface 2500 that includes a developer remote control window 2502. The developer remote control window 2502 may be used to provide user input from a test device 106, workstation 108, or other computing device to the proxy access device 1010 executing the AUT 104. Images presented on the display of the proxy access device 1010 may be presented in the developer remote control window 2502. Use of the developer remote control window 2502 may enable a developer 102 to see what is presented on the display of the proxy access device 1010 and interact with the AUT 104 or other applications executing on the proxy access device 1010. In some implementations the user inputs, click data, the view hierarchy, and other information received via the developer remote control window 2502 may be stored. These user inputs may be replayed, used to build automated testing scripts, and so forth. For example, a set of user input data may be stored and used to build a test script for later reuse.

The user interface 2500 may also include a stop session user control 2504, which may be activated to cease the capture of session data 130. In some implementations, activation of the stop session user control 2504 may cause a test of the AUT 104 to end. For example, after capture of the session data 130 ceases, the application may be removed from the proxy access device 1010. In some implementations, the AUT 104 may be closed before the session data 130 capture ceases, allowing for the capture of any final data transferred between the AUT 104 and other devices, such as the destination device 116.

Figure 26:
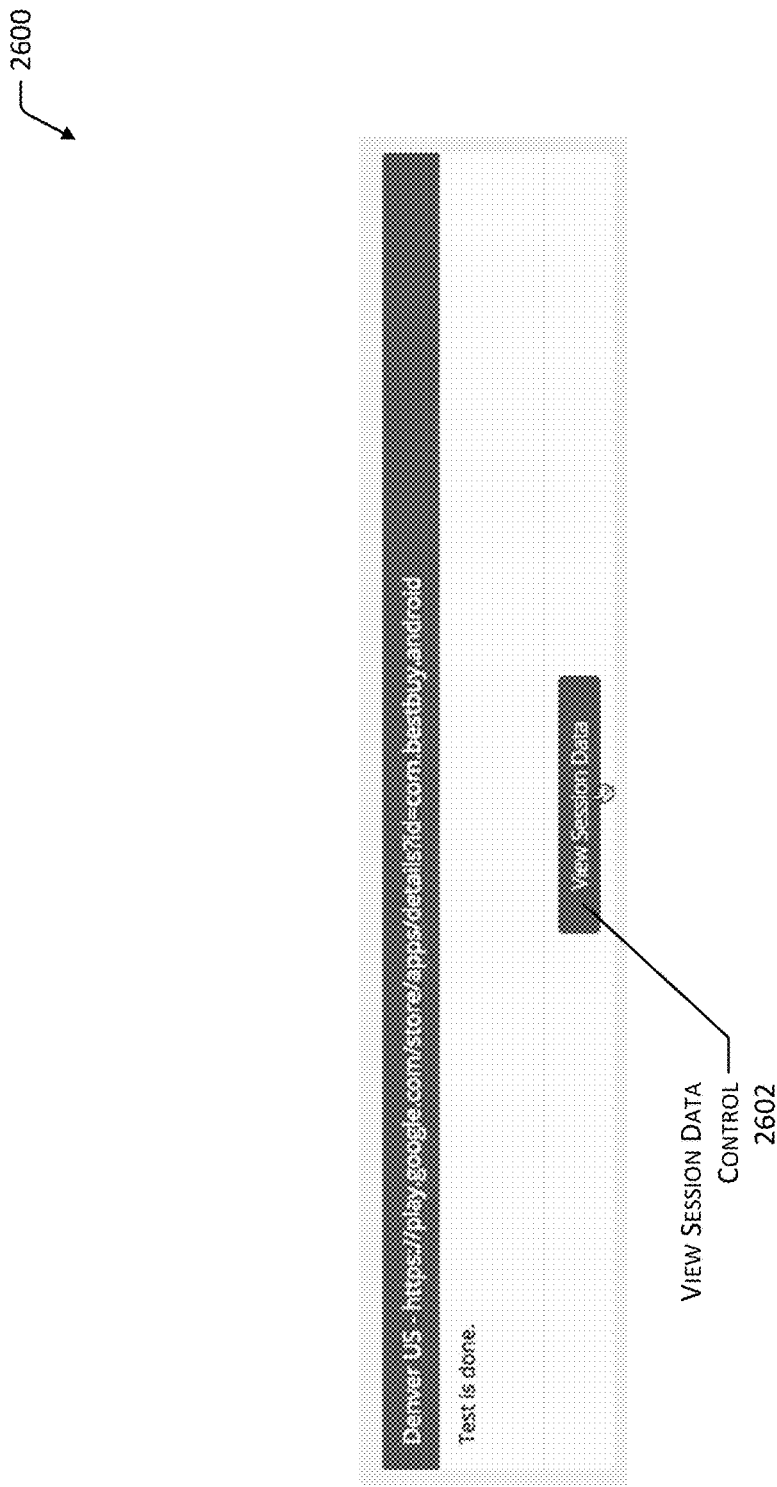

FIG. 26 depicts a user interface 2600 that may be presented after the testing of the AUT 104 has been completed. The user interface 2600 may include a view session data control 2602. During or after the remote control of the proxy access device 1010 has concluded, ancillary data may be obtained. The ancillary data may include information that relates to information in the session data 130. For example, the ancillary data may include domain name server (DNS) lookups, CNAME values, AAAA records, Internet Protocol (IP) versions such as IPv4 or IPv6, and so forth for the domain names referenced in the session data 130. The ancillary data may be incorporated into or appended to the session data 130. In some implementations ancillary data may be generated using another device. For example, DNS queries may be made using another proxy access device 1010 having equivalent settings, such as geolocation, telecommunication carrier, and network type. In this way, performance of the AUT 104 is not degraded by the acquisition of the ancillary data. In another example, the ancillary data may be gathered after the stop session user control 2504 is activated. For example, after the stop session user control 2504 is activated, the proxy access device 1010 may be instructed to gather the ancillary data. This ancillary data may then be incorporated into the session data 130. When the view session data control 2602 is activated, the session data 130 and in some cases the ancillary data, may be presented.

Figure 27:
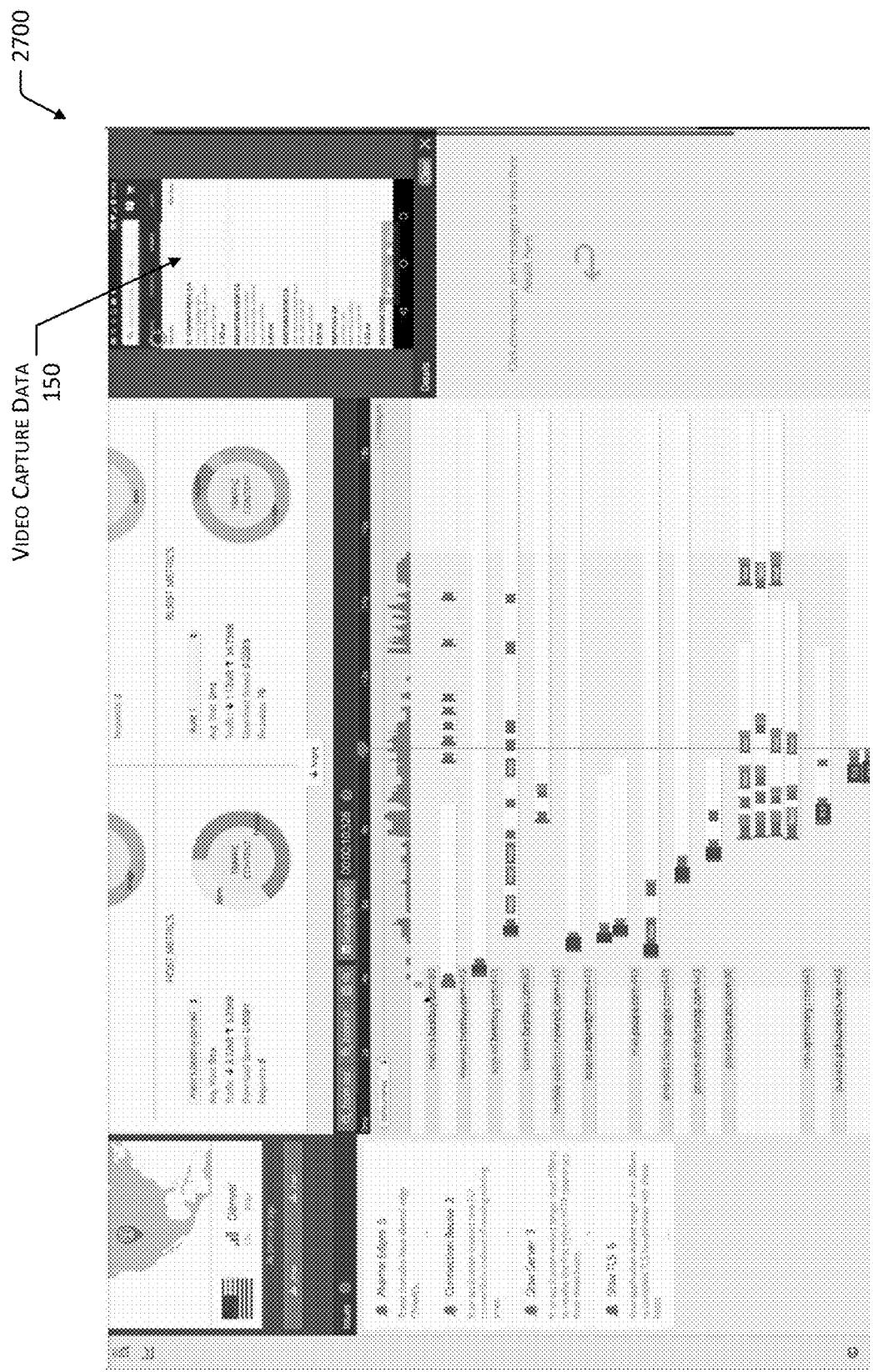

FIG. 27 depicts a user interface 2700 that may be presented after activation of the view session data control 2602. The user interface 2700 of FIG. 27 presents video capture data 150 alongside a representation of other session data 130, burst data 136, issue data 138, and so forth. For example, the user interface 2700 may present information regarding one or more issues determined using analysis rule data 304. In some implementations, analysis rule data 304 may include rules specific to the operation of particular domain name services, use of content delivery networks, and so forth. For example, issues may include determining whether the DNS entries for the domain contain A records (IPv4), AAAA records (IPv6), and flagging domains that contain AAAA records.

Figure 28:
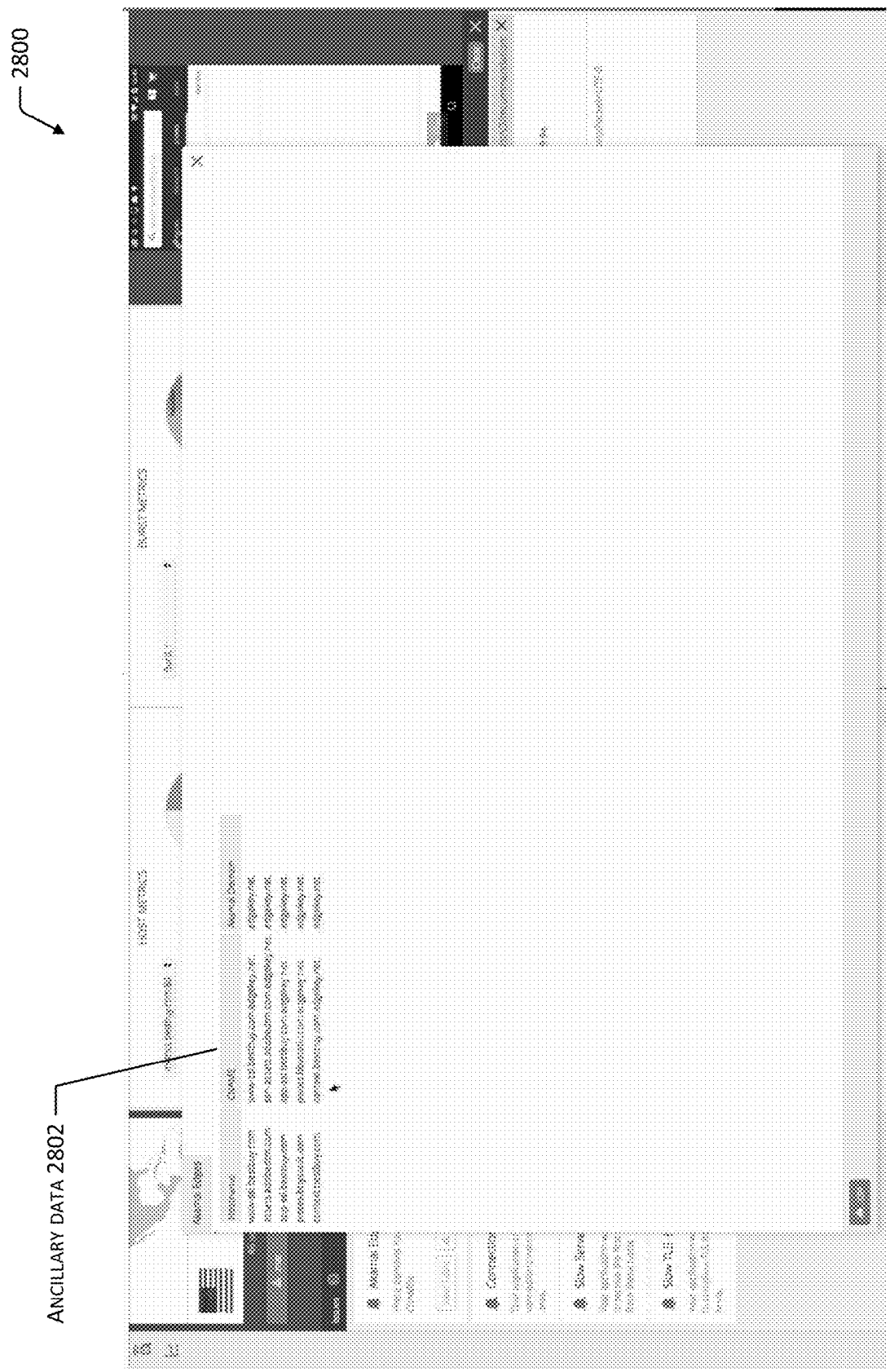

FIG. 28 depicts an additional user interface 2800 that presents ancillary data 2802 in the "View Table" selection for the "Akamai Edges 5" domains. For example, the user interface 2800 of FIG. 28 may be accessed by selecting information presented in the user interface 2700 of FIG. 27. The ancillary data 2802 of FIG. 28 depicts hostnames and CNAMEs associated with a particular set of domains. In other implementations, other ancillary data 2802 may be acquired and presented in the user interface.

Session data 130 acquired during capture may be combined with the ancillary data 2802 obtained at the same or different times. This allows ongoing issue analysis that may be used to determine changes over time during subsequent tests. For example, the ancillary data 2802 may be indicative of a trend for domains to migrate to AAAA records.

By using the system, techniques, and user interfaces described above, developers 102 and other users may better utilize information about the performance of an application. This information may be used to improve performance of the application, optimize usage of a network 112, improve user experiences, determine problems associated with the network 112, and so forth. For example, network usage may be optimized by detecting issues that could result in consolidated connections, reductions in the quantity of data transferred, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

The following code describes one implementation of at least a portion of the user interface described above.

```
/*
self-contained Processing sketch that demonstrates
the impact curve generation and interactions
*/
import java.util.List;
class Issue {
    float f = 1.0;
    float highlightf = 0.0; // if 1, the impact area is fully highlighted
    float ghostf = 0.0; // if 1, the impact area is fully ghosted
    ImpactActivity[ ] impactActivities;
    String label = "issue title";
    Issue(ImpactActivity . . . impactActivities) {
        this.impactActivities = impactActivities;
    }
}
class ImpactActivity {
    float start;
    float end;
    float mid;
    float len;
    float focusf = 0.0;
    ImpactActivity(float start, float end) {
        this.start = start;
        this.end = end;
        mid = (start + end) / 2.0;
        len = end − start;
    }
    void setMid(float mid) {
        this.mid = mid;
        start = mid − len / 2;
        end = mid + len / 2;
    }
    void setLen(float len) {
        this.len = len;
        start = mid − len / 2;
        end = mid + len / 2;
    }
}
/*
An impact activity is translated to a 2d gaussian curve.
The gaussian is used here because of its simple form,
but any curve could be used. The translation from
1d (start, end) to 2d gaussian is:
len = end − start
area under curve = len^2
len = 2 * deviations at boundary of impact activity * c
The choice of deviations at boundary of impact activity determines
the sharpness of the curve. A higher number will have a sharper peak.
We use 2 here.
Using the closed form expression of the gaussian and its area,
we solve the parameters c, a, d and substitute them
into the expression to determine the final curve
in terms of the impact activity.
gaussian(t) = a * e^(−(t−b)^2/ (2 * c^2))
area = a * sqrt(2 pi c^2)
*/
float curveImpactTime(ImpactActivity ia, float t) {
```

```
    float c = ia.len / 4.0;
    float a = 2 * ia.len / sqrt(2 * PI);
    float d = t - ia.mid;
    return a * exp(-(d * d) / (2 * c * c));
}
List<Issue> issues;
List<Issue> needIssues;
Issue ghost;
int sessionTime = 2000;
// random config
int issueCountMin = 4;
int issueCountMax = 6;
int impactIntervalCountMin = 1;
int impactIntervalCountMax = 5;
float impactTimeMin = 50;
float impactTimeMax = 300;
// render window
float rx0, rx1, ry0, ry1;
void setup( ) {
    size(1200, 600);
    rx0 = 30;
    rx1 = width - 30;
    ry0 = height - 30;
    ry1 = 30;
    issues = new ArrayList<Issue>(5);
    // randomly generate
    int ic = int(random(issueCountMin, issueCountMax));
    for (int i = 0; i < ic; ++i) {
        int iac = int(random(impactIntervalCountMin, impactIntervalCountMax));
        ImpactActivity[ ] ias = new ImpactActivity[iac];
        for (int j = 0; j < iac; ++j) {
            float len = random(impactTimeMin, impactTimeMax);
            float mid = random(0, sessionTime);
            ias[j] = new ImpactActivity(mid - len / 2, mid + len / 2);
        }
        issues.add(new Issue(ias));
    }
    needIssues = new ArrayList<Issue>(5);
    ghost = new Issue(new ImpactActivity(0, 100));
    ghost.label = "Get Help Here";
}
void mouseClicked( ) {
    float t = map(mouseX, rx0, rx1, 0, sessionTime);
    Issue hi = findIssue(t);
    if (null != hi) {
        // clicked on an issue
        return;
    }
    ImpactActivity ia = ghost.impactActivities[0];
    Issue needIssue = new Issue(new ImpactActivity(ia.start, ia.end));
    needIssues.add(needIssue);
}
Issue findIssue(float t) {
    float threshTime = map(FIND_THRESH_PX, 0, rx1 - rx0, 0, sessionTime);
    float mind = sessionTime;
    Issue mini = null;
    for (Issue issue : issues) {
        for (ImpactActivity ia : issue.impactActivities) {
            float d = abs(ia.mid - t);
            if (d <mind) {
                mind = d;
                mini = issue;
            }
        }
    }
    if (null != mini && mind <= threshTime) {
        return mini;
    } else {
        return null;
    }
}
ImpactActivity findImpactActivity(float t) {
    float threshTime = map(FIND_THRESH_PX, 0, rx1 - rx0, 0, sessionTime);
    float mind = sessionTime;
    ImpactActivity minia = null;
    for (Issue issue : issues) {
        for (ImpactActivity ia : issue.impactActivities) {
            float d = abs(ia.mid - t);
            if (d < mind) {
```

```
            mind = d;
            minia = ia;
          }
        }
      }
      if (null != minia && mind <= threshTime) {
        return minia;
      } else {
        return null;
      }
    }
  }
  float FIND_THRESH_PX = 20;
  float MELDF = 0.1;
  int impactTime = sessionTime;
  void draw( ) {
    {
      float t = map(mouseX, rx0, rx1, 0, sessionTime);
      ghost.impactActivities[0].setMid(t);
      Issue hi = findIssue(t);
      if (null == hi) {
        ghost.ghostf = lerp(ghost.ghostf, 1.0, MELDF);
        for (Issue issue : issues) {
          issue.highlightf = lerp(issue.highlightf, 0.0, MELDF);
          for (ImpactActivity ia : issue.impactActivities) {
            ia.focusf = lerp(ia.focusf, 0.0, MELDF);
          }
        }
      } else {
        ImpactActivity hia = findImpactActivity(t);
        ghost.ghostf = lerp(ghost.ghostf, 0.0, MELDF);
        for (Issue issue : issues) {
          if (issue == hi) {
            issue.highlightf = lerp(issue.highlightf, 1.0, MELDF);
          } else {
            issue.highlightf = lerp(issue.highlightf, 0.0, MELDF);
          }
          for (ImpactActivity ia : Issue.impactActivities) {
            if (ia == hia) {
              ia.focusf = lerp(ia.focusf, 1.0, MELDF);
            } else {
              ia.focusf = lerp(ia.focusf, 0.0, MELDF);
            }
          }
        }
      }
      for (Issue issue : needIssues) {
        issue.ghostf = lerp(issue.ghostf, 1.0, MELDF);
      }
    }
    background(color(255, 255, 255));
    // the rendering method draws the curve as layers
    // that occlude each other. The first layer is rendered,
    // then the next layer covers parts, leaving only a strips
    // of the previous layer and color.
    // draw ghost (orange) – f and ghostf applied (added)
    // draw highlight (red) – f applied
    // draw normal (grey) – f and highlightf applied (subtracted)
    noStroke( );
    fill(color(219, 142, 32));
    ghostCurve( );
    fill(color(219, 32, 49));
    normalCurve( );
    fill(color(200, 200, 200));
    highlightCurve( );
    stroke(color(64, 64, 64));
    noFill( );
    ghostCurve( );
    // render the dots and labels
    for (Issue issue : issues) {
      for (ImpactActivity ia : Issue.impactActivities) {
        float t = ia.mid;
        float net = normalCurveTime(t);
        float x = map(t, 0, sessionTime, rx0, rx1);
        float y = map(net, 0, ImpactTime, ry0, ry1);
        // dot
        float s = lerp(20, 30, issue.highlightf);
        stroke(lerpColor(color(200,   200,   200), color(64,   64,   64),
issue.highlightf));
        noFill( );
```

```
          ellipseMode(CENTER);
          ellipse(x, y, s, s);
          // line
          color c = lerpColor(color(64,   64,   64,   0), color(64,   64,   64),
ia.focusf);
          stroke(c);
          fill (c)
          line(x, ry0, x, y − 50);
          textAlign(CENTER, CENTER);
          textSize(24);
          text(issue.label, x, y − 75);
       }
    }
    if (0.01 < ghost.ghostf) {
       Issue Issue = ghost;
       for (ImpactActivity ia : Issue.impactActivities) {
          float t = ia.mid;
          float net = ghostCurveTime(t);
          float x = map(t, 0, sessionTime, rx0, rx1);
          float y = map(net, 0, ImpactTime, ry0, ry1);
          // dot
          float s = lerp(0, 10, issue.ghostf);
          stroke(lerpColor(color(200,   200,   200), color(64,   64,   64),
issue.ghostf));
          noFill( );
          ellipseMode(CENTER);
          ellipse(x, y, s, s);
          // line
          color c = lerpColor(color(64,   64,   64,   0), color(64,   64,   64),
issue.ghostf);
          stroke(c);
          fill (c)
          line(x, ry0, x, y − 50);
          textAlign(CENTER, CENTER);
          textSize(12);
          text(issue.label, x, y − 75);
       }
    }
}
void highlightCurve( ) {
   beginShape( );
   vertex(rx0, ry0);
   int sampleCount = sessionTime + 1;
   for (int 1 = 0; 1 < sampleCount; ++i) {
      float t = map(1, 0, sampleCount − 1, 0, sessionTime);
      float net = 0;
      for (Issue issue : issues) {
         float m = issue.f * (1.0 − issue.highlightf);
         for (ImpactActivity ia : issue.impactActivities) {
            net += m * curveImpactTime(ia, t);
         }
      }
      float x = map(t, 0, sessionTime, rx0, rx1);
      float y = map(net, 0, impactTime, ry0, ry1);
      vertex(x, y);
   }
   vertex(rx1, ry0);
   endShape(CLOSE);
}
void normalCurve( ) {
      beginShape( );
      vertex(rx0, ry0);
      int sampleCount = sessionTime + 1;
      for (int i = 0; i <sampleCount; ++i) {
         float t = map(i, 0, sampleCount − 1, 0, sessionTime);
         float net = normalCurveTime(t);
         float x = map(t, 0, sessionTime, rx0, rx1);
         float y = map(net, 0, impactTime, ry0, ry1);
         vertex(x, y);
      }
      vertex(rx1, ry0);
      endShape(CLOSE);
}
float normalCurveTime(float t) {
   float net = 0;
   for (Issue issue : issues) {
      float m = issue.f;
      for (ImpactActivity ia : issue.impactActivities) {
         net += m * curveImpactTime(ia, t);
```

-continued

```
    }
  }
  return net;
}
void ghostCurve( ) {
  beginShape( );
  vertex(rx0, ry0);
  int sampleCount = sessionTime + 1;
  for (int i = 0; i < sampleCount; ++i) {
    float t = map(i, 0, sampleCount - 1, 0, sessionTime);
    float net = ghostCurveTime(t);
    float x = map(t, 0, sessionTime, rx0, rx1);
    float y = map(net, 0, impactTime, ry0, ry1);
    vertex(x, y);
  }
  vertex(rx1, ry0);
  endShape(CLOSE);
}
float ghostCurveTime(float t) {
  float net = 0;
  for (Issue Issue : Issues) {
    float m = issue.f;
    for (ImpactActivity la : issue.impactActivities) {
      net += m * curveImpactlime(ia, t);
    }
  }
  for (Issue Issue : needIssues) {
    float m = issue.f * issue.ghostf;
    for (ImpactActivity la : issue.impactActivities) {
      net += m * curveImpactlime(ia, t);
    }
  }
  {
    Issue issue = ghost;
    float m = issue.f * issue.ghostf;
    for (ImpactActivity la : issue.impactActivities) {
      net += m * curveImpactTime(ia, t);
    }
  }
  return net;
}
```

What is claimed is:

1. A method comprising:

receiving session data from a computing device executing an application, wherein the session data includes an indication of data that is one or more of: sent to the computing device or sent by the computing device during execution of the application;

determining, based on the session data, a first activity and a second activity performed by the computing device;

determining a first value for a first parameter of the first activity;

determining a second value for a second parameter of the second activity;

determining that the first value deviates from a first threshold value by a first quantity;

determining that the second value deviates from a second threshold value by a second quantity;

generating issue data indicative of the first activity and the second activity; and presenting a first user interface that includes:
  a first indicator that represents the first activity and includes a first visual characteristic at a first position based on the first value for the first parameter;
  a second indicator that represents the second activity and includes a second visual characteristic at a second position based on the second value for the second parameter; and
  an impact curve having a third position based at least in part on the first position and the second position, wherein the impact curve includes:
    a first region having a first size based on one or more of the first threshold value or the second threshold value; and a second region having a second size based on the first quantity and the second quantity.

2. The method of claim 1, further comprising determining one or more of a causal relationship or a temporal relationship between the first activity and the second activity by one or more of:

determining that performance of the first activity causes performance of the second activity;

determining that at least a portion of the first activity is performed concurrently with at least a portion of the second activity; or determining that the second activity is initiated within a threshold length of time subsequent to an end of the first activity.

3. The method of claim 2, wherein the determining the one or more of the causal relationship or the temporal relationship further includes:

determining that a first frequency of occurrence of the first activity is less than a threshold frequency of occurrence; and determining that a second frequency of occurrence of the second activity is less than the threshold frequency of occurrence.

4. The method of claim 1, wherein the first parameter includes one or more of:

a length of time associated with performance of the first activity; or a quantity of data associated with performance of the first activity; and the first region includes a physical dimension based on the first value.

5. The method of claim 1, further comprising:
determining that the first value for the first parameter exceeds the first threshold value by the first quantity; and
providing a first portion of the first region with one or more of a color or a pattern that differs from a second portion of the first region, wherein a size of the first portion is based on the first quantity by which the first value for the first parameter exceeds the first threshold value.

6. The method of claim 1, wherein the issue data is further indicative of the first parameter exceeding the first threshold value, the method further comprising:
receiving user input selecting the first region; and
in response to the user input, presenting at least a portion of the issue data in one or more of the first user interface or a second user interface accessed by the user input selecting the first region, wherein the at least a portion of the issue data indicates one or more of: the first value for the first parameter or a third quantity by which the first value deviates from the first threshold value, and further indicates one or more of: a category associated with an issue represented by the issue data, a description of the issue, or a recommended action to at least partially mitigate the issue.

7. The method of claim 1, further comprising:
determining that the first value for the first parameter is less than the first threshold value;
receiving first user input to a portion of the first user interface that is associated with the first value;
in response to the first user input, determining at least a portion of the session data that corresponds to the first value;
in response to the first user input and based on the at least a portion of the session data, determining a third threshold value that differs from the first threshold value;
determining that the first value for the first parameter is greater than the third threshold value, wherein the issue data is further indicative of the first parameter exceeding the third threshold value; and
presenting at least a portion of the issue data in one or more of the first user interface or a second user interface accessed by second user input selecting the first region.

8. A system comprising:
one or more memories storing computer-executable instructions; and
one or more hardware processors to execute the computer-executable instructions to:
receive session data from a computing device executing an application, wherein the session data is indicative of activities performed by the computing device during execution of the application;
determine, based on the session data, a first activity performed by the computing device;
determine a first value for a first parameter of the first activity, wherein the first value is associated with a first time;
determine a second value for the first parameter, wherein the second value is associated with a second time;
determine that the first value for the first parameter deviates from a first threshold value;
generate issue data indicative of the first value deviating from the first threshold value;
present a first user interface that includes a first region representing the first value and a second region representing the second value, wherein the first region includes a first issue indicator representative of at least a portion of the issue data, and the first issue indicator includes a characteristic based on the first value for the first parameter;
receive user input indicative of the second region of the first user interface;
in response to the user input, determine a portion of the session data that corresponds to the second region of the first user interface;
determine a second threshold value based on the portion of the session data that corresponds to the second region;
determine correspondence between the second value and the second threshold value; and
include an indication of the correspondence between the second value and the second threshold value in the first user interface.

9. The system of claim 8, further comprising computer-executable instructions to:
position the first issue indicator at a first position along a first axis of the first user interface based on the first time;
wherein the characteristic of the first issue indicator includes a second position of the first issue indicator along a second axis of the first user interface.

10. The system of claim 9, wherein the first parameter includes one or more of: a length of time during which the first activity occurred, or a quantity of data that is associated with the application and that is transferred during the first activity.

11. The system of claim 8, further comprising computer-executable instructions to:
determine a quantity by which the first value of the first parameter deviates from the first threshold value;
provide a first portion of the first region of the first user interface with one or more of a first color or first pattern; and
provide a second portion of the first region with one or more of a second color or second pattern;
wherein a size of the second portion corresponds to the quantity by which the first value deviates from the first threshold value.

12. The system of claim 8, wherein the characteristic of the first issue indicator includes a first position of the first issue indicator along a first axis based on the first value of the first parameter, the system further comprising computer-executable instructions to:
determine, based on the session data, a second activity performed by the computing device;
determine that the second activity is related to the first activity by one or more of:
determining that performance of the first activity causes performance of the second activity;
determining that at least a portion of the first activity is performed concurrently with at least a portion of the second activity; or
determining that the second activity is initiated within a threshold length of time subsequent to an end of the first activity;
determine that a second value for a second parameter of the second activity deviates from the first threshold value;

include a second issue indicator in the first user interface, at a second position along the first axis, wherein the second position is based on the second value for the second parameter; and based on determining that the second activity is related to the first activity, present an impact curve in the first user interface, wherein the impact curve intersects the first position and the second position.

13. The system of claim 12, further comprising computer-executable instructions to:
receive user input indicating a third position of the impact curve, wherein the third position differs from the first position and the second position;
determine a portion of the session data that corresponds to the third position of the impact curve;
in response to the user input, determine a second threshold value that differs from the first threshold value;
determine a third activity represented by the portion of the session data that corresponds to the third position; and
determine a relationship between a third value for a third parameter of the third activity and the second threshold value.

14. The system of claim 8, further comprising computer-executable instructions to:
receive user input indicating the first issue indicator; and
in response to the user input, presenting one or more of:
the first value for the first parameter;
a quantity by which the first value deviates from the first threshold value;
a category associated with an issue represented by the first issue indicator;
a description of the issue; or
a recommended action to at least partially mitigate the issue.

15. A system comprising:
one or more memories storing computer-executable instructions; and
one or more hardware processors to execute the computer-executable instructions to:
receive session data from a computing device executing an application, wherein the session data is indicative of activities performed by the computing device during execution of the application;
determine, based on the session data, a first activity and a second activity performed by the computing device;
determine a first value for a first parameter of the first activity;
determine a second value for a second parameter of the second activity;
determine that the first value deviates from a first threshold value by a first quantity;
determine that the second value deviates from one of more of the first threshold value or a second threshold value by a second quantity;
generate issue data indicative of the first activity and the second activity;
present a first user interface that includes a first issue indicator representative of the first activity and a second issue indicator representative of the second activity, wherein the first issue indicator is at a first position in the first user interface based on the first value and the second issue indicator is at a second position in the first user interface based on the second value; and
present an impact curve in the first user interface, wherein a position of the impact curve is based at least in part on the first position and the second position, and wherein the impact curve includes:
a first region having a first size based on the one or more of the first threshold value or the second threshold value; and
a second region having a second size based on the first quantity and the second quantity.

16. The system of claim 15, further comprising computer-executable instructions to:
receive user input indicating a third position on the impact curve;
determine a portion of the session data that corresponds to the third position on the impact curve;
determine, based on the portion of the session data, a third activity performed by the computing device;
in response to the user input, determine a third threshold value that differs from the one or more of the first threshold value or the second threshold value; and
determine a relationship between the third threshold value and a third value for a third parameter of the third activity.

17. The system of claim 15, further comprising computer-executable instructions to:
provide the first region with one or more of:
a first color that differs from a second color of the second region; or
a first pattern that differs from a second pattern of the second region.

18. The system of claim 17, further comprising computer-executable instructions to:
receive user input indicating the second region;
in response to the user input, present one or more of:
the first value;
the second value;
at least one of the first quantity or the second quantity;
a category associated with an issue represented by one or more of the first issue indicator or the second issue indicator;
a description of the issue; or
a recommended action to at least partially mitigate the issue.

19. The system of claim 15, further comprising computer-executable instructions to:
determine that the second activity is related to the first activity by one or more of:
determining that performance of the first activity causes performance of the second activity;
determining that at least a portion of the first activity is performed concurrently with at least a portion of the second activity; or
determining that the second activity is initiated within a threshold length of time subsequent to an end of the first activity;
wherein the impact curve is presented in response to the relationship between the first activity and the second activity.

20. The system of claim 19, further comprising computer-executable instructions to:
determine that a first frequency of occurrence of the first activity is less than a threshold frequency of occurrence; and
determine that a second frequency of occurrence of the second activity is less than the threshold frequency of occurrence.

* * * * *